INVENTOR
STANLEY R. SHELMIRE

INVENTOR.
STANLEY R. SHELMIRE

INVENTOR.
STANLEY R. SHELMIRE

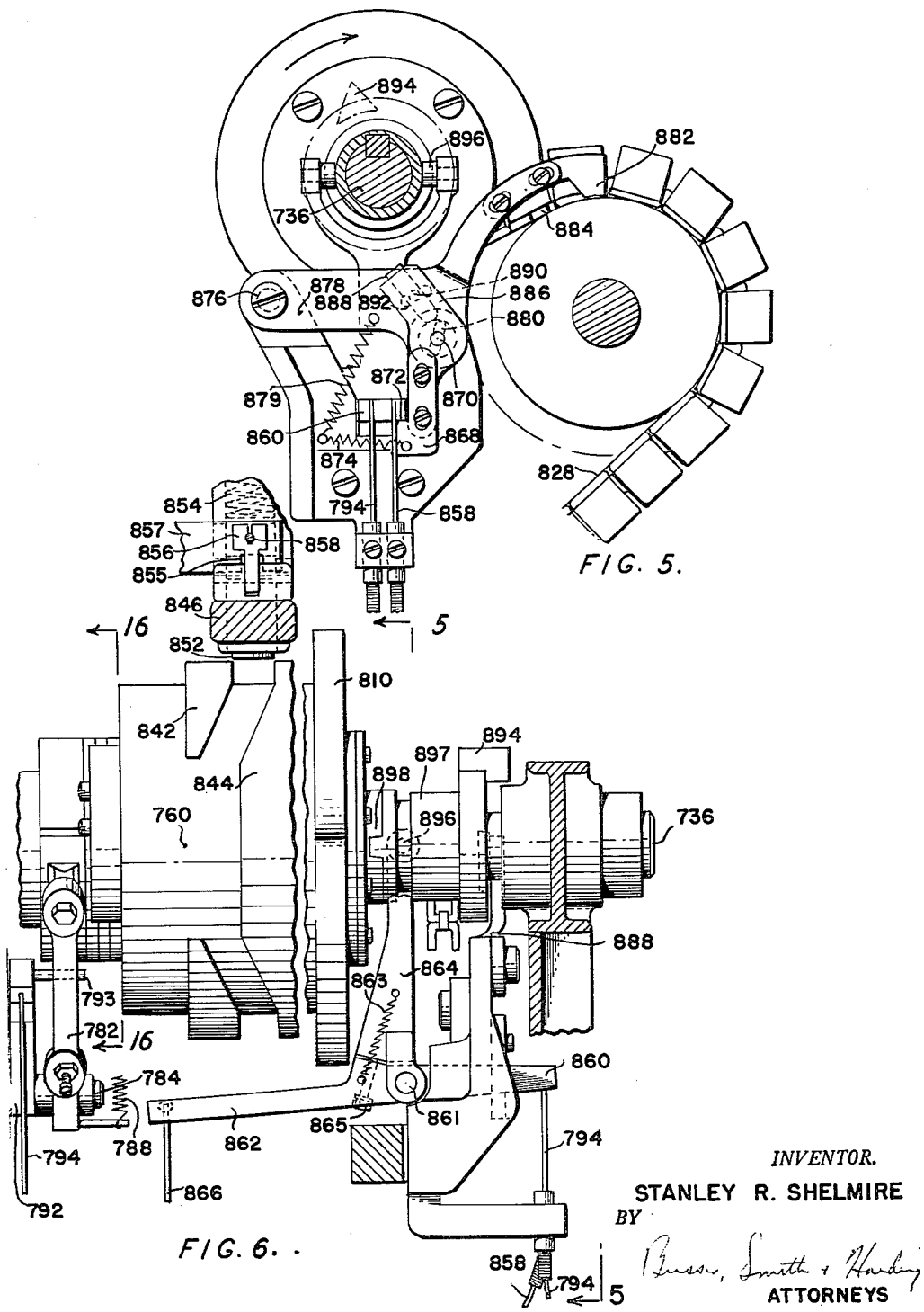

INVENTOR.
STANLEY R. SHELMIRE
BY
ATTORNEYS

INVENTOR
STANLEY R. SHELMIRE
BY

ATTORNEYS

July 31, 1962  S. R. SHELMIRE  3,046,762
KNITTING METHOD AND MACHINE

Filed April 2, 1952  30 Sheets-Sheet 13

INVENTOR
STANLEY R. SHELMIRE
BY

ATTORNEYS

July 31, 1962 S. R. SHELMIRE 3,046,762
KNITTING METHOD AND MACHINE
Filed April 2, 1952 30 Sheets-Sheet 14

INVENTOR.
STANLEY R. SHELMIRE
BY
ATTORNEYS

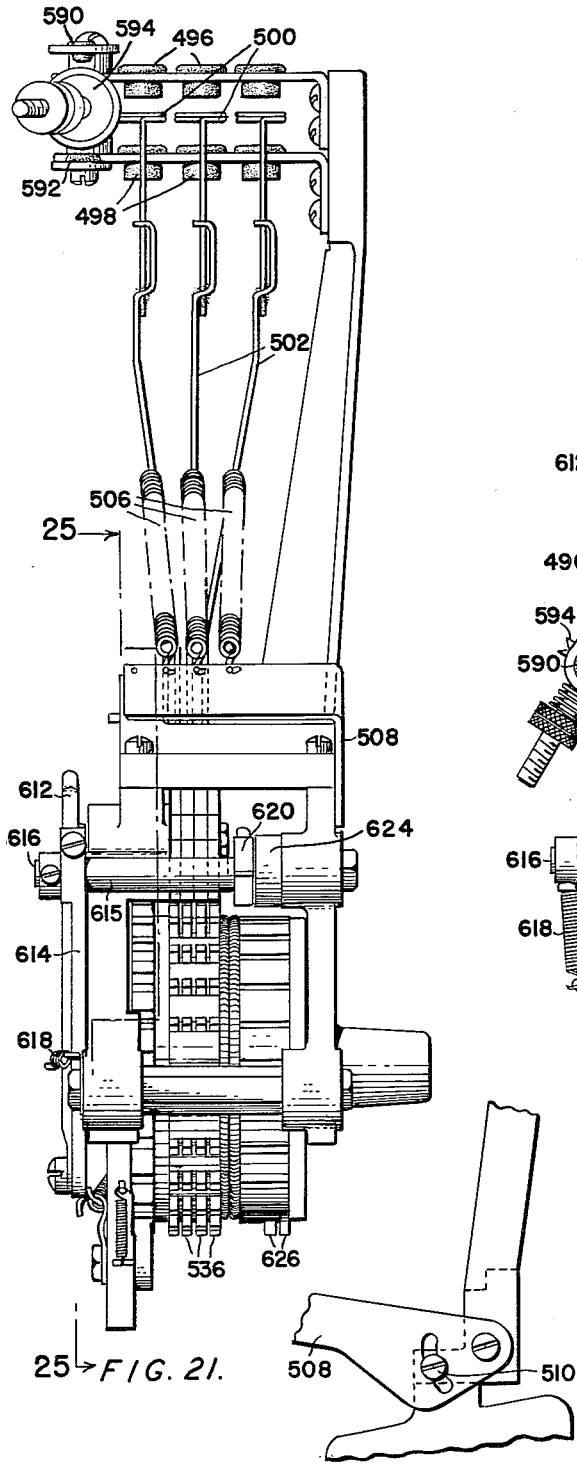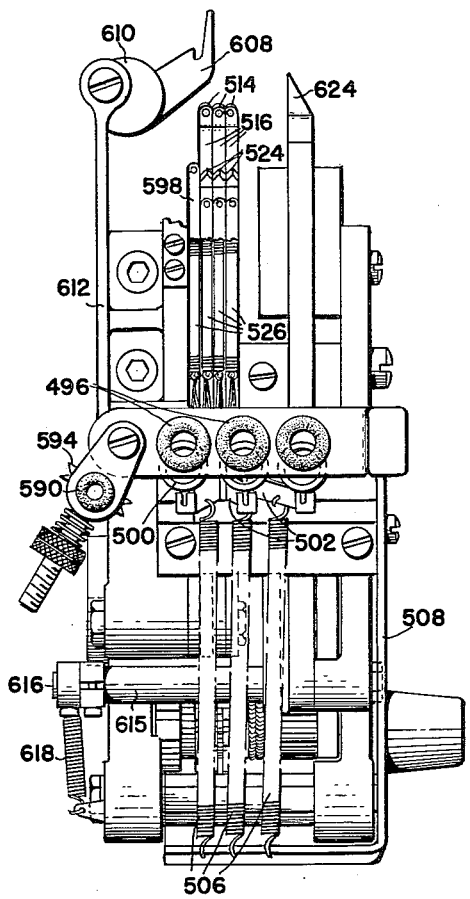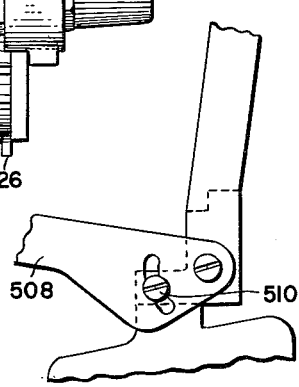
FIG. 20.
FIG. 21.
FIG. 24.
INVENTOR.
STANLEY R. SHELMIRE
BY
ATTORNEYS July 31, 1962  S. R. SHELMIRE  3,046,762
KNITTING METHOD AND MACHINE
Filed April 2, 1952  30 Sheets-Sheet 16

INVENTOR.
STANLEY R. SHELMIRE
BY
ATTORNEYS

July 31, 1962 S. R. SHELMIRE 3,046,762
KNITTING METHOD AND MACHINE
Filed April 2, 1952 30 Sheets-Sheet 17

INVENTOR.
STANLEY R. SHELMIRE
BY
ATTORNEYS

July 31, 1962  S. R. SHELMIRE  3,046,762
KNITTING METHOD AND MACHINE
Filed April 2, 1952  30 Sheets-Sheet 18

INVENTOR
STANLEY R. SHELMIRE
BY
ATTORNEYS

INVENTOR
STANLEY R. SHELMIRE
BY
ATTORNEYS

INVENTOR
STANLEY R. SHELMIRE
BY
ATTORNEYS

July 31, 1962　　　S. R. SHELMIRE　　　3,046,762
KNITTING METHOD AND MACHINE

Filed April 2, 1952　　　　　　　　　30 Sheets-Sheet 21

INVENTOR
STANLEY R. SHELMIRE
BY

ATTORNEYS

INVENTOR
STANLEY R. SHELMIRE
BY
ATTORNEYS

July 31, 1962  S. R. SHELMIRE  3,046,762
KNITTING METHOD AND MACHINE
Filed April 2, 1952  30 Sheets-Sheet 23

INVENTOR.
STANLEY R. SHELMIRE
BY
ATTORNEYS

| Number of Links | Type of Links | Main Drum Moves | Trick Wheel Moves | Active Yarn Fingers Feeds #1 | #2 | #3 | #4 | Event |
|---|---|---|---|---|---|---|---|---|
| 1 | P,L | 1 | 1 | (1) | (1) | 1 | 4R | Makeup |
| 1 | P,L | 2 | 2 | (1) | (1) | 1 | 4R | Idle move except for removal of latch openers |
| 14 | O | | | | | | | |
| 1 | L | 3 | | | | | | Idle move |
| 1 | P,L | 4 | 3 | 1 | 1 | 1 | 3 | Reciprocation; pattern drum starts |
| 1 | P | | 4 | 1 | 2 | 1 | 2 | Start of front and back diamonds |
| 9 | O | | | | | | | |
| 1 | P | | 5 | 2 | 2 | 2 | 2 | Start of side diamonds |
| 4 | O | | | | | | | |
| 1 | P | | 6 | 2 | 2 | 2 | 2 | |
| 4 | O | | | | | | | |
| 1 | P | | 7 | 2 | 3 | 2 | 1 | Start of lower front and back diamonds |
| 4 | O | | | | | | | |
| 1 | P | | 8 | 2 | 3 | 2 | 1 | |
| 4 | O | | | | | | | |
| 1 | P | | 9 | 1 | 3 | 1 | 1 | End of side diamond |
| 4 | O | | | | | | | |
| 1 | P | | 10 | 1 | 3 | 1 | 1 | |
| 1 | L | 5 | | | | | | Idle move |
| 1 | L | 6 | | | | | | Idle move |
| 2 | O | | | | | | | |
| 1 | P,L | 7 | 11 | 4 | 4 | (1) | (3) | Start of heel |
| 1 | P | | 12 | 4 | 4 | (1) | (3) | |
| 1 | P | | 13 | 4 | 4 | (1) | (3) | |
| 1 | P | | 14 | 4 | 4 | (1) | (3) | |
| 1 | P | | 15 | 4 | 4 | (1) | (3) | |
| 1 | P | | 16 | 4 | 4 | (1) | (3) | |
| 1 | L(Low) | 8 | | | | | | Widening of heel |
| 1 | P | | 17 | 4 | 4 | (1) | (3) | |
| 3 | O | | | | | | | |
| 1 | P,L | 9 | 18 | 1 | 1 | 1 | 3 | Rotation; foot |
| 1 | P,L | 10 | 19 | 1 | 1 | 1 | 3 | Idle move |
| 1 | P,L | 11 | 20 | 1 | 1 | 1 | 3 | Idle move |
| 2 | O | | | | | | | |
| 1 | P,L | 12 | 21 | 4 | 4 | 0 | 0 | Ring toe |
| 1 | P | | 22 | 4 | 4 | 0 | 0 | |
| 1 | L | 13 | | | | | | Start of toe; reciprocation |
| 5 | O | | | | | | | |
| 1 | P,L | 14 | 23 | 4 | 4 | 0 | 0 | Widening of toe |
| 4 | O | | | | | | | |
| 1 | L | 15 | | | | | | Rotation; loopers rounds |
| | O | | | | | | | |
| 1 | P | | 24 | 0 | 0 | 0 | 0 | Press-off |
| 1 | L | 16 | | | | | | End |

FIG. 50.

INVENTOR.
STANLEY R. SHELMIRE
BY
ATTORNEYS

July 31, 1962 S. R. SHELMIRE 3,046,762
KNITTING METHOD AND MACHINE
Filed April 2, 1952 30 Sheets-Sheet 28

INVENTOR.
STANLEY R. SHELMIRE
BY
ATTORNEYS

July 31, 1962  S. R. SHELMIRE  3,046,762
KNITTING METHOD AND MACHINE
Filed April 2, 1952  30 Sheets-Sheet 29

INVENTOR.
STANLEY R. SHELMIRE
BY
ATTORNEYS

| | | | | | | | | |
|---|---|---|---|---|---|---|---|---|
| 1 | P, L | 7 | 11 | 4 | 4 | (1) | (2) | Start of heel |
| 1 | P | | 12 | 4 | 4 | (1) | (2) | |
| 1 | P | | 13 | 4 | 4 | (1) | (2) | |
| 1 | P | | 14 | 4 | 4 | (1) | (2) | |
| 1 | P | | 15 | 4 | 4 | (1) | (2) | |
| 1 | P | | 16 | 4 | 4 | (1) | (2) | |
| 1 3 | L(low) P O | 8 | 17 | 4 | 4 | (1) | (2) | Widening of heel |
| 1 9 | P, L O | 9 | 18 | 1 | 1 | 1 | 2 | Foot, pattern drum starts |
| 1 9 | P, L O | 10 | 19 | 1 | 1 | 1 | 2 | Idle move |
| 1 1 | P, L O | 11 | 20 | 1 | 1 | 1 | 3 | Rotation; End of pattern |

United States Patent Office 3,046,762
Patented July 31, 1962

3,046,762
KNITTING METHOD AND MACHINE
Stanley R. Shelmire, Laconia, N.H., assignor to Scott & Williams, Incorporated, Laconia, N.H., a corporation of Massachusetts
Filed Apr. 2, 1952, Ser. No. 280,050
68 Claims. (Cl. 66—43)

This invention relates to knitting methods and machines and has particular reference to methods and machines for the formation of solid color patterned areas joined by interlocking loops, as exemplified by diamonds in the leg portions of hosiery.

Since fabric of the type described requires reciprocatory knitting, if floats are to be avoided, production of a patterned portion of a stocking or the like is relatively slow. However, in accordance with the present invention four feeds are used for pattern formation, a single feed being used for each color area, and, these feeds being available, heels, toes, ring toes and loopers rounds may be knit two-feed and the foot (and ring toes, if desired) of a stocking may be knit four-feed thereby speeding up production. Multiple feed knitting of a top may also be accomplished.

In accordance with the invention, during patterning yarn feeding fingers are continuously in action throughout the formation of groups of courses until yarn changes are required, as for example, between diamonds. The patterning is accordingly accomplished solely by needle selection under the control of jacks. The invention includes provision for jack selection and control in novel fashion and incorporates, further, retiming mechanism so that proper identical patterns will be produced automatically in successive knitted articles. Consistent provisions are made in accordance with the invention to form complete stockings and, in particular, to carry out the formation of multiple-feed knit portions for the speeding up of production.

In connection with the patterning, provision is made to avoid the possible production of stitches which may later result in holes where yarn changes occur during patterning. This end is achieved by knitting outgoing and ingoing yarns together in one or more loops during a single stroke of the needle cylinder. This is in contrast with prior practices in which such yarns were not knit together so that ends had to be tied to prevent them from pulling out and forming holes or starting runs.

In accordance with the invention provision is made for knitting elastic tops for hosiery consistent with the other aspects of the invention.

Provision is made for proper control of the yarns being fed to the needles to insure the desired knitting during reciprocation irrespective of which of a number of yarn fingers is used. In accordance with this aspect of the invention, the yarn feeding fingers are provided with movable ends which may take proper positions to insure the desired approach of the yarns to the needles.

Certain matters disclosed herein are claimed in the application of Robert H. Lawson, Serial Number 280,057, filed of even date herewith.

The objects of the invention relate to the attainment of the foregoing ends and to details of construction and operation whereby these ends are secured. The objects of the invention will be better understood after consideration of the following description read in conjunction with the accompanying drawings, in which:

FIGURE 5 is a fragmentary vertical sectional view taken on the broken surface indicated at 5—5 in FIGURE 6;

FIGURE 6 is a fragmentary vertical section taken on the plane indicated at 6—6 in FIGURE 12;

FIGURE 20 is a plan view showing the yarn and rubber feeding and controlling devices at one of the feeds hereinafter referred to as the fourth feed;

FIGURE 21 is an outside elevation of the same;

FIGURE 24 is a fragmentary elevation showing a tension adjustment and looking at the right-hand side of FIGURES 20 and 21;

Figure 43:
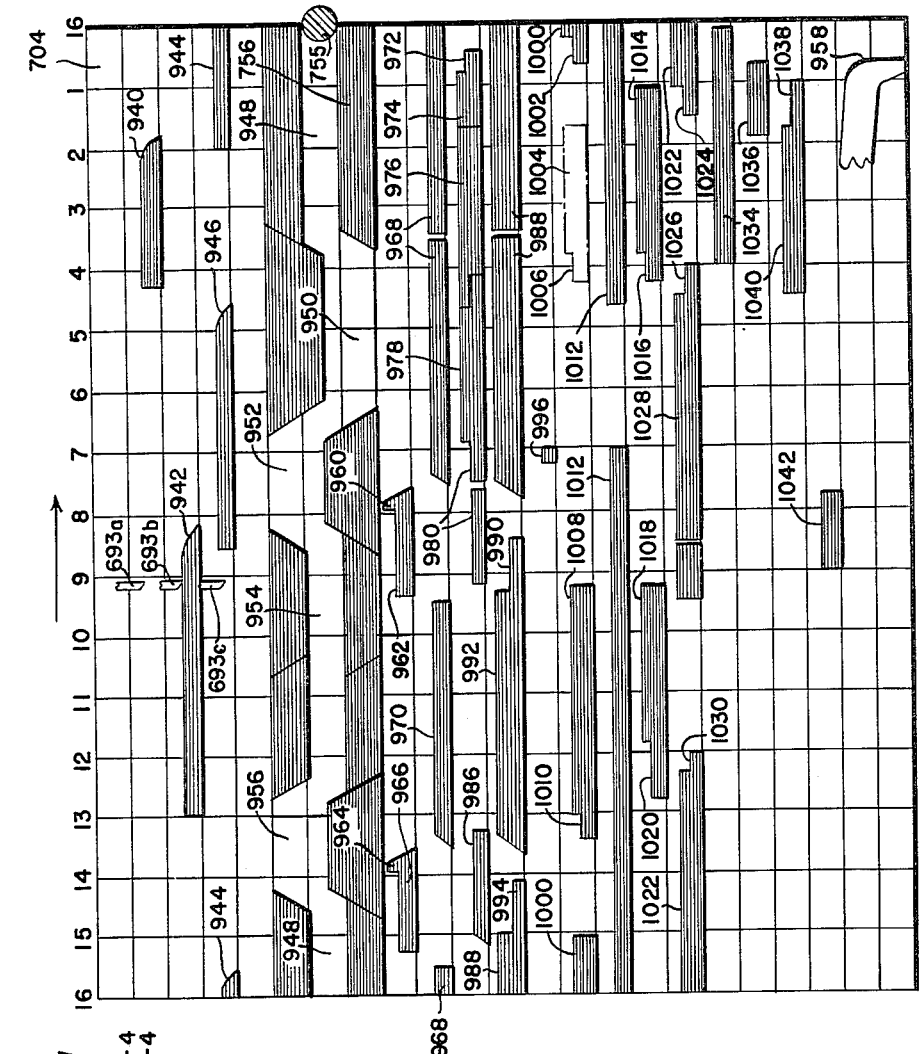
FIGURE 43 is a diagrammatic layout of cams carried by the main cam drum of the machine.
Figure 51:
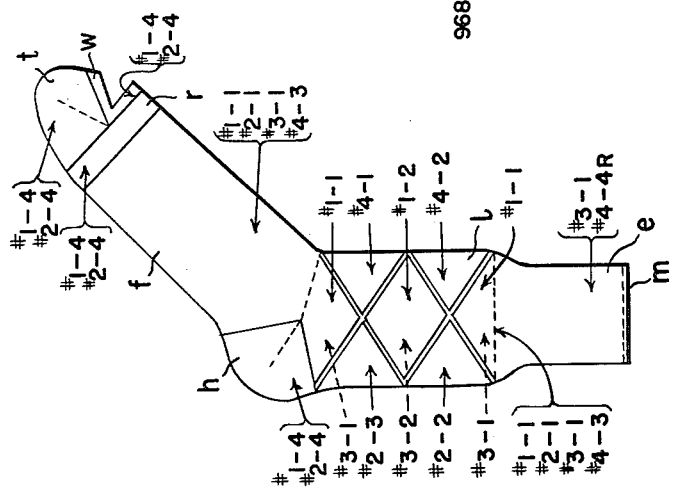
Figure 44:
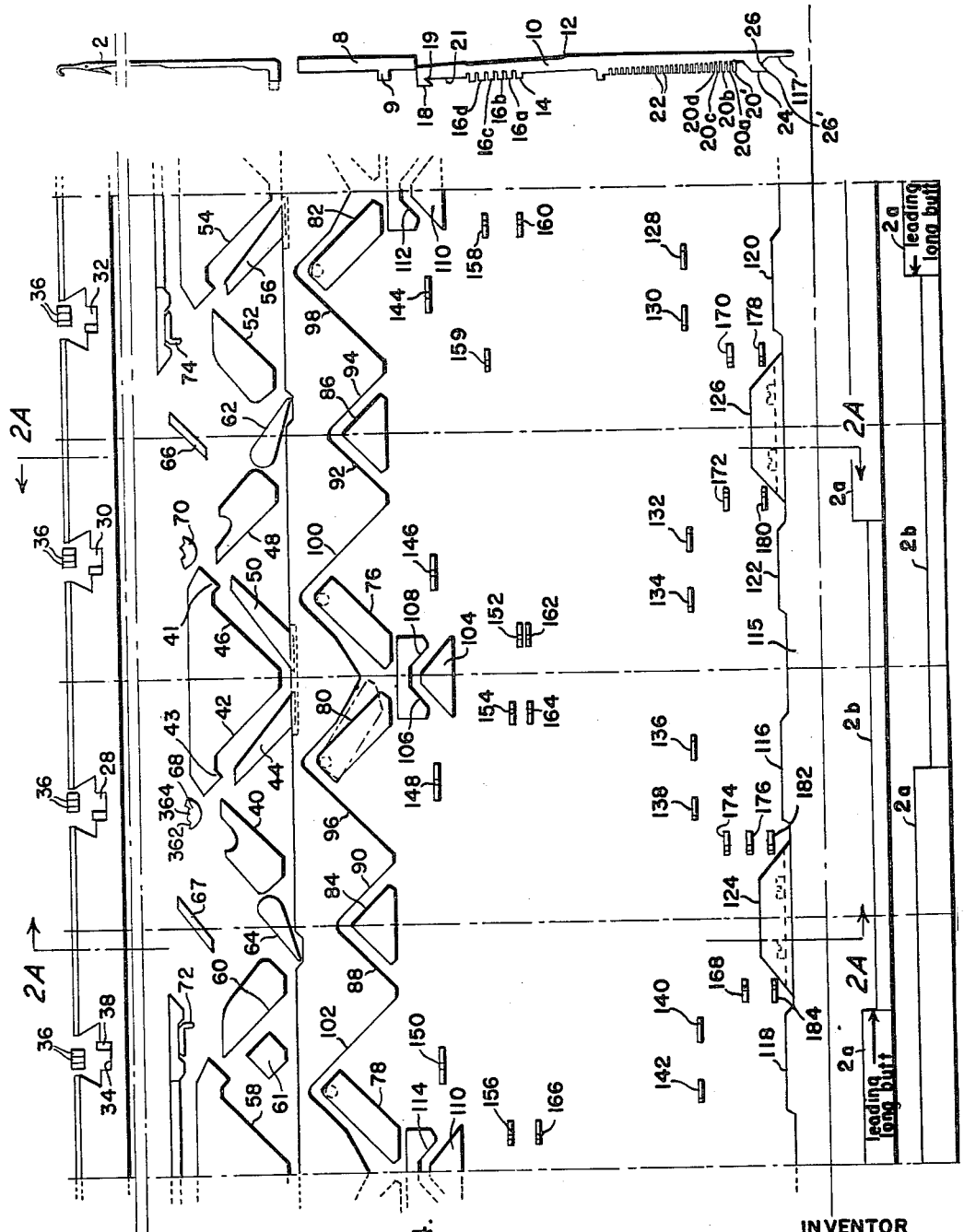
Figure 45:
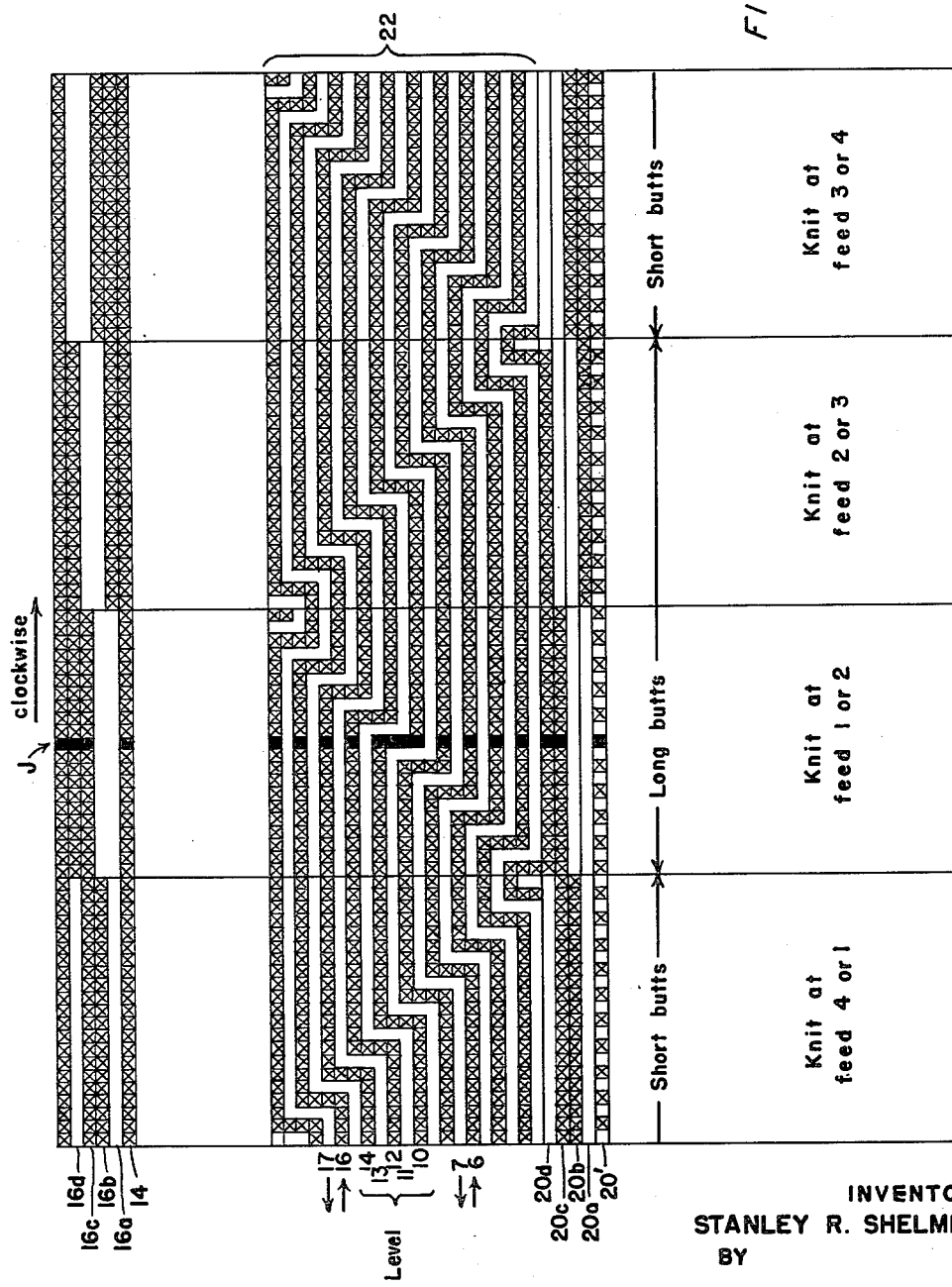
Figure 46:
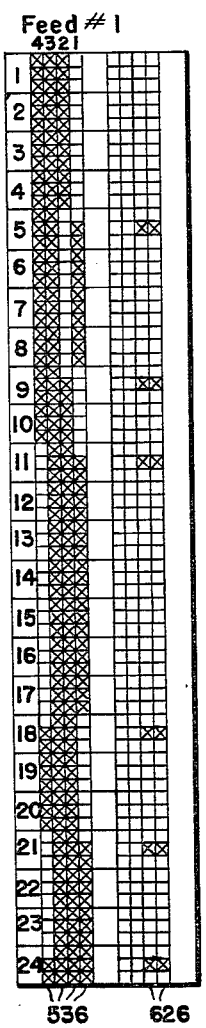
Figure 47:
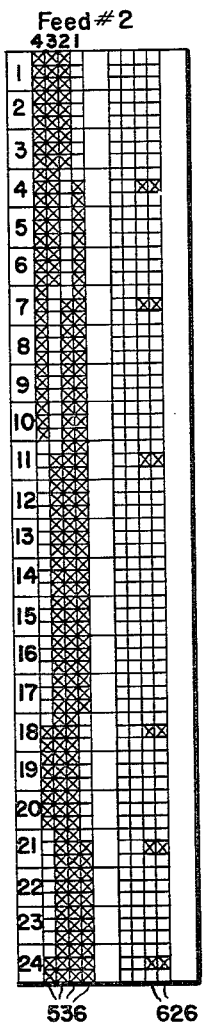
Figure 48:
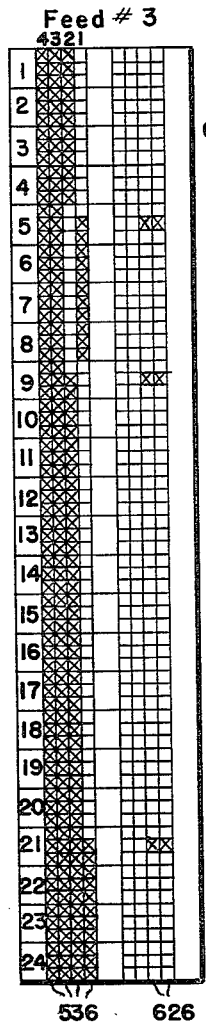
Figure 49:
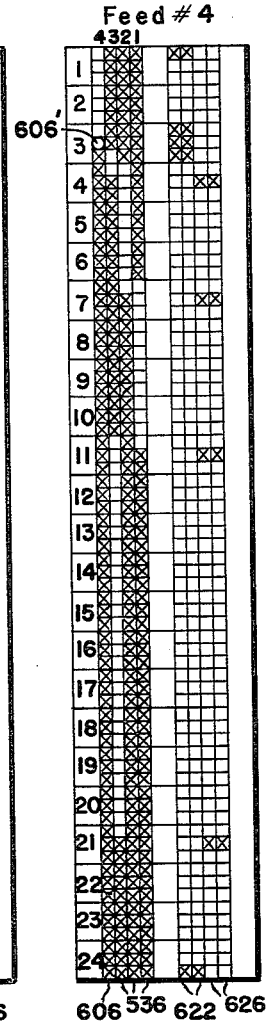
Figure 52:
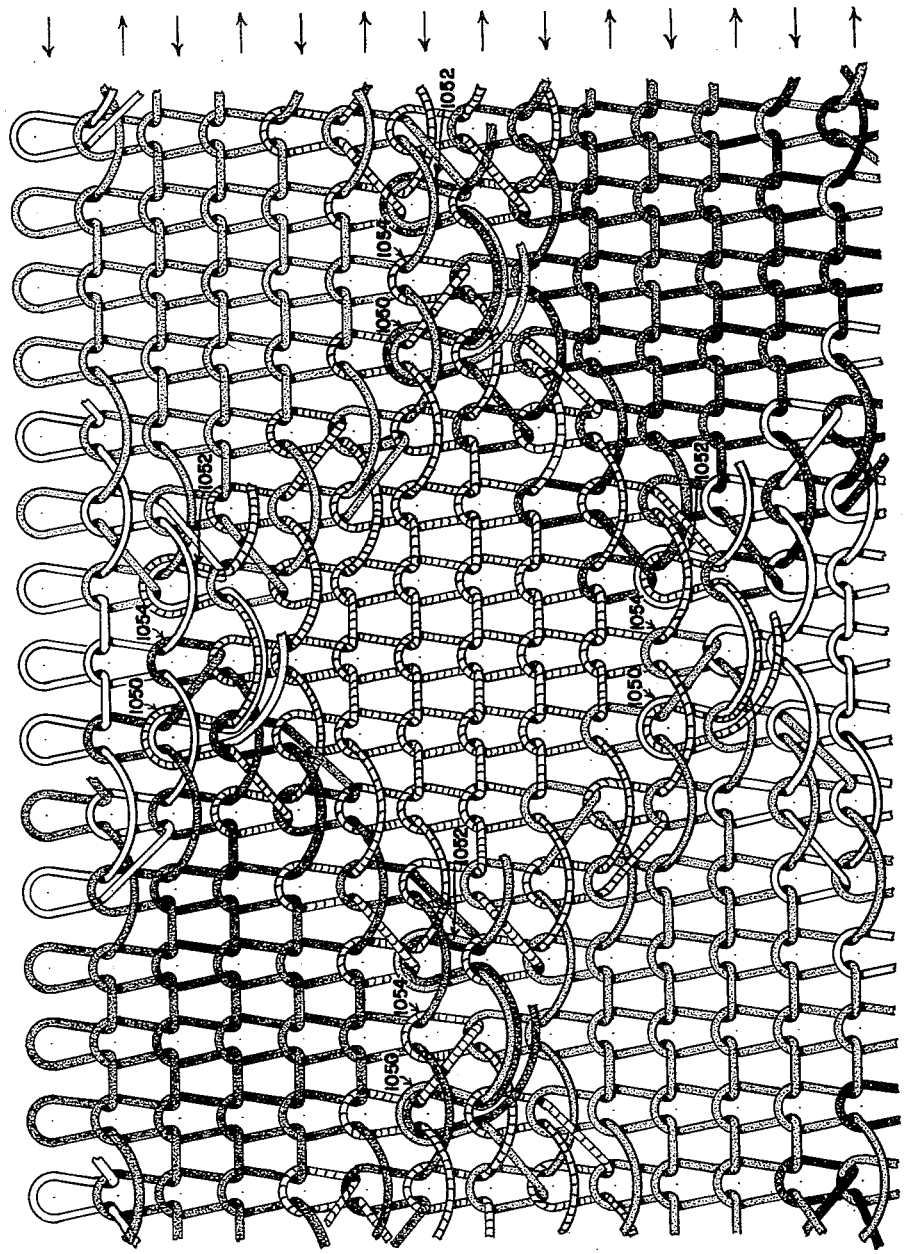
Figure 53:
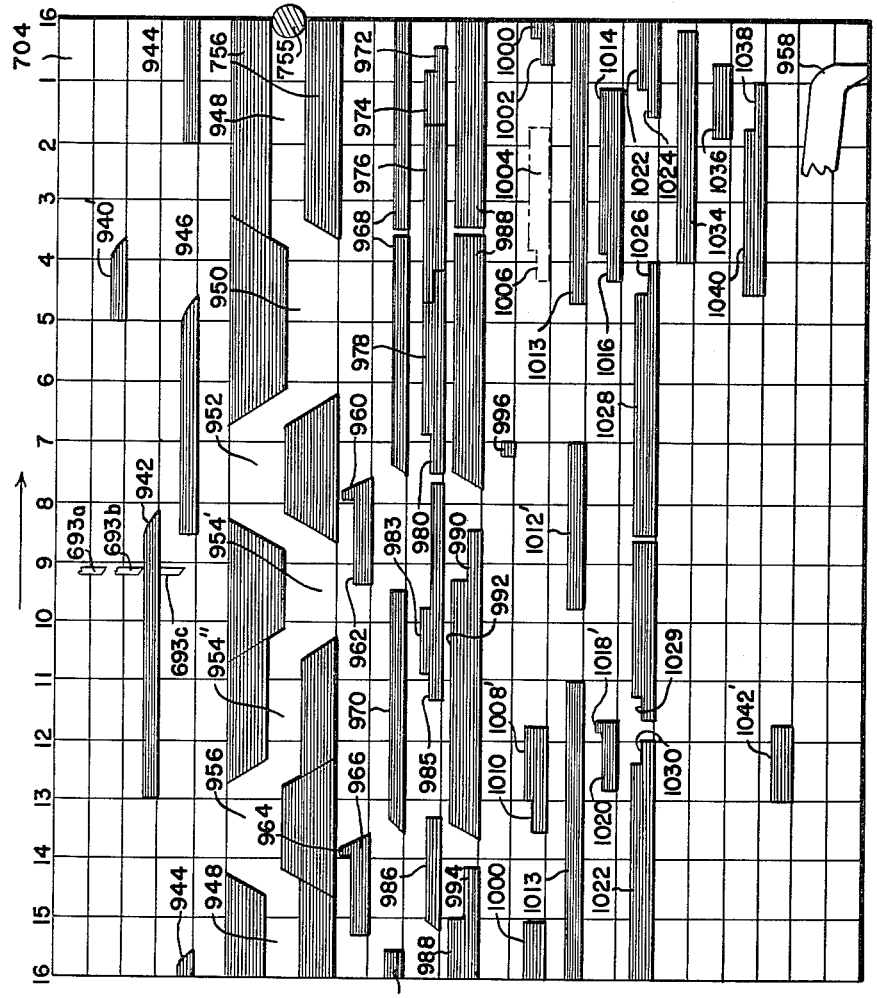
Figure 54:
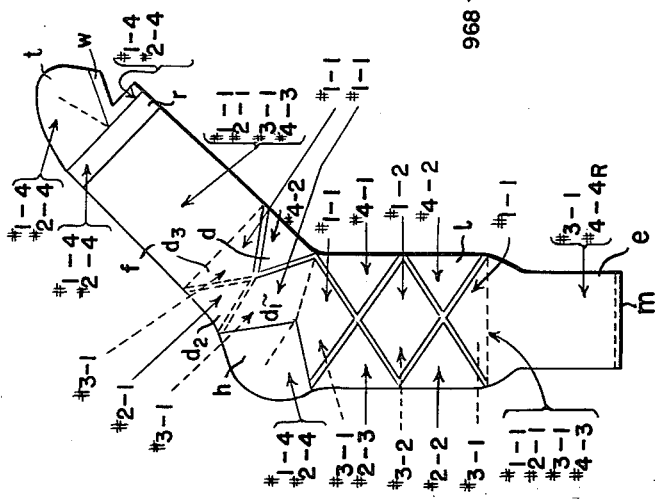
Figures 55, 56:
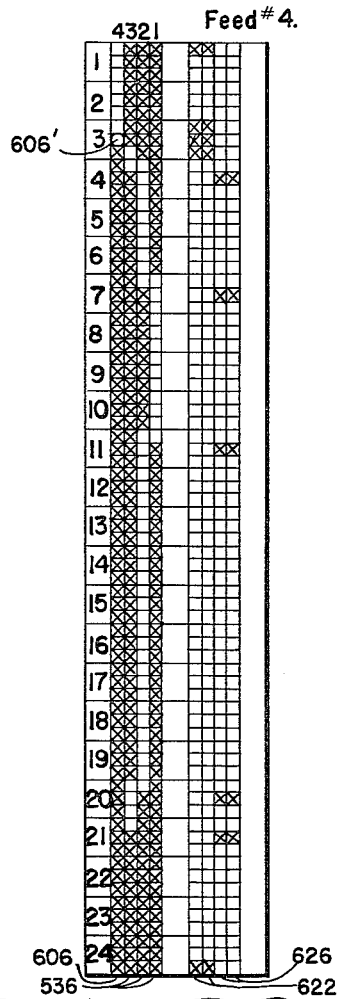

FIGURE 44 is an inside development showing cams for acting upon needles, pattern jacks and intermediate jacks and yarn and rubber feeding fingers, there being indicated at the right of the cams a needle, an intermediate jack and a pattern jack of the types used and at the bottom of the figure the positions assumed by long and short butt needles at the beginning of clockwise and counterclockwise strokes of the needle cylinder;

FIGURE 45 is a diagram showing the layout of pattern jack butts for a typical operation of the machine, the layout being as it would appear from the inside of the cylinder looking outwardly;

FIGURES 46 to 49 are diagrams showing butt arrangements on the feeding finger-controlling trick wheels at respective feeds one to four;

FIGURE 50 is a chart showing a sequence of main pattern chain links, main pattern drum moves and trick wheel moves for a typical operation of the machine;

FIGURE 51 is a diagrammatic representation of a stocking produced by the machine consistently with the butt layouts of FIGURES 45 to 49, the main cam drum layout of FIGURE 43 and the chart of FIGURE 50;

FIGURE 52 is a diagram of the type of stitch formation involved in the production of the diamonds of FIGURE 51, the diagram showing the fabric as viewed from the inside, the progress of the knitting being upwardly and the diamonds being of less extent than those of the actual stocking, the figure being particularly illustrative of the connecting loop arrangements between diamonds and the yarn change structure insuring against production of open holes;

FIGURE 53 is a diagram similar to FIGURE 43 but showing the layout of cams on the main cam drum for producing a stocking having an alternative arrangement of colored areas;

FIGURE 54 is a diagrammatic representation of the last mentioned stocking;

FIGURE 55 is a portion of a chart which substitutes for a portion of FIGURE 50 in the matter of production of the last mentioned stocking; and FIGURE 56 is a butt diagram of a trick wheel to be substituted for FIGURE 49 in the matter of production of the last mentioned stocking.

Figure 2A:
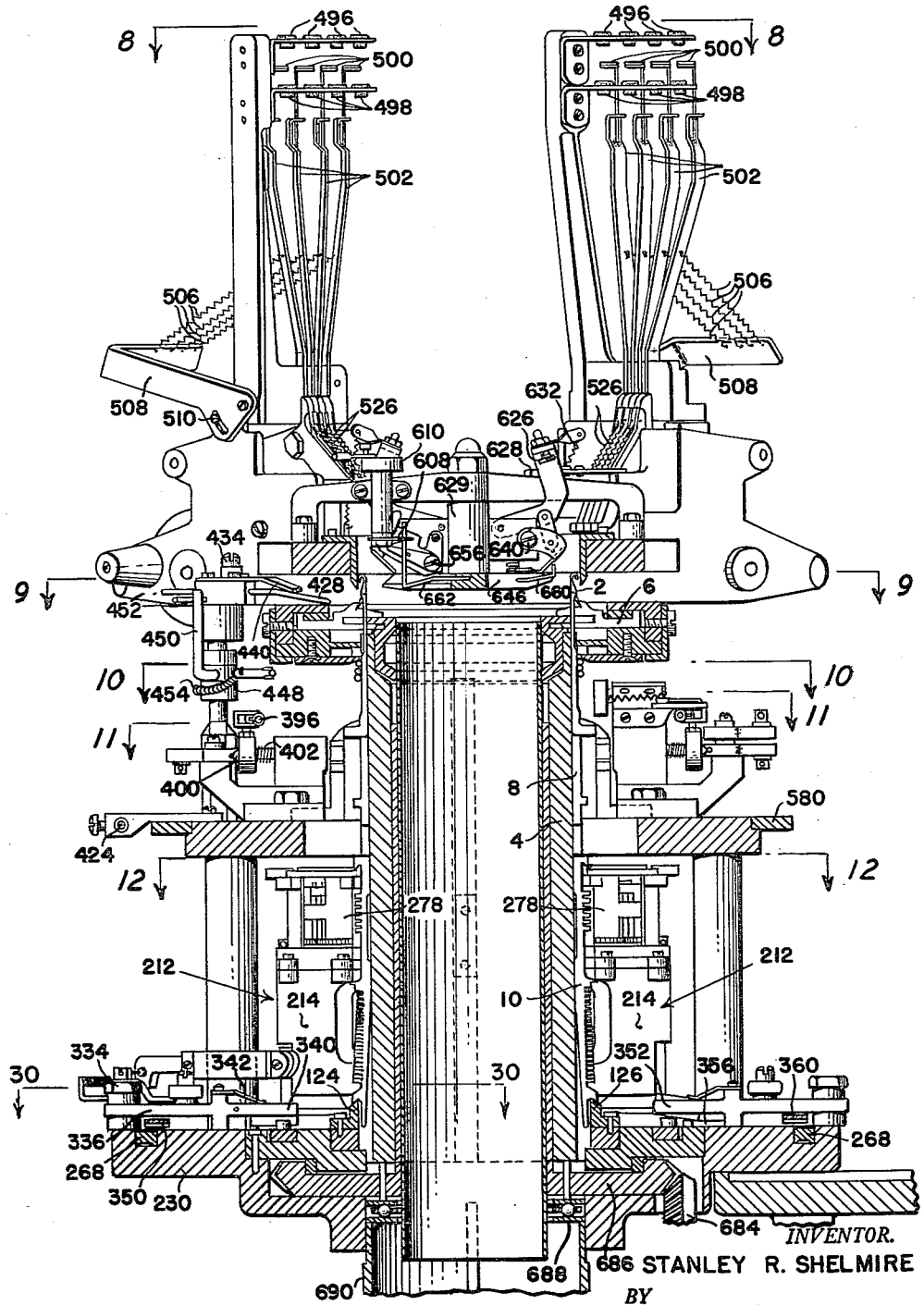
FIGURE 2A is a vertical section through the upper portion of the machine taken on a plane parallel to the front of the machine, the position of this plane being indicated by the traces 2A—2A in the cam development constituting FIGURE 44.
Figure 2B:
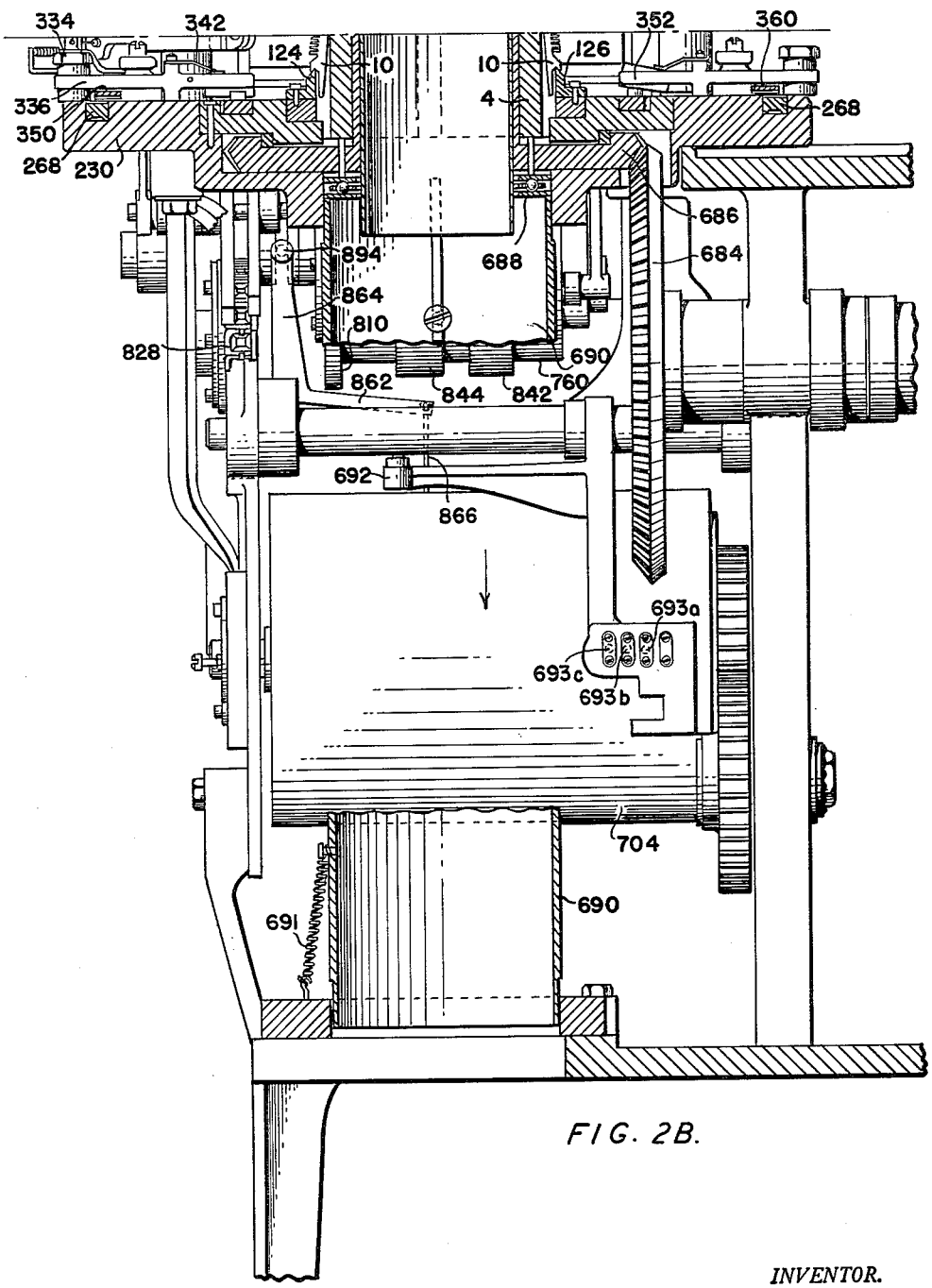
FIGURE 2B is a vertical section continuing FIGURE 2A for a lower portion of the machine.
Figure 3:
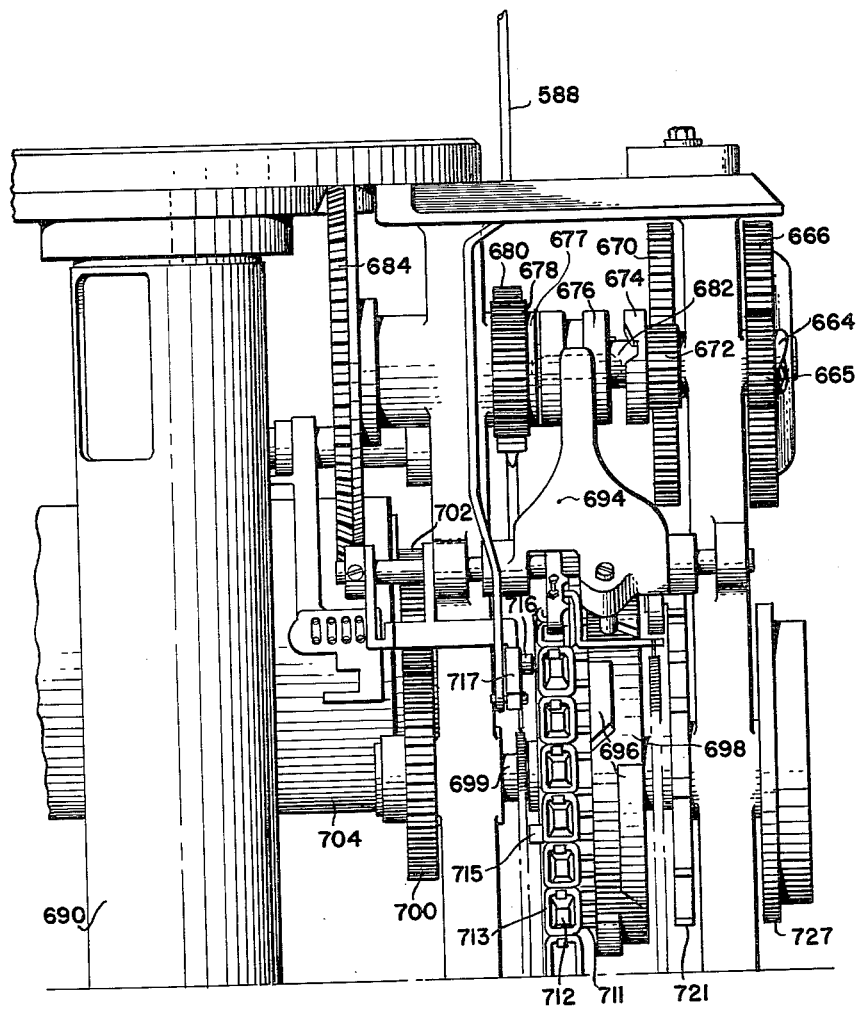
FIGURE 3 is an elevation of a portion of the front of the machine showing particularly drive and control elements.

Referring first particularly to FIGURES 2A and 44, the machine comprises latch needles 2 arranged in two series with long butts and short butts respectively designated at the bottom of FIGURE 44 as 2a and 2b. As will appear hereafter the needles provided with long butts knit heels and toes while the short butt needles knit the insteps of stockings. These needles are mounted in usual fashion in the slots of a needle cylinder 4 and cooperating with the needles are the usual sinkers 6 mounted in a sinker dial and controlled by cams. Below the needles in the cylinder slots are intermediate jacks 8 provided with butts 9, all of the same length. Below these intermediate jacks there are located in the cylinder slots tiltable pattern jacks 10 each of which is of the construction particularly illustrated at the right of FIGURE 44. Each jack is provided with a fulcrum point 12. Above this fulcrum point there are butts at various levels, the lowermost of these butts being indicated at 14 while above this butt 14 there are in order butts 16a, 16b, 16c and 16d. A sixth butt may be provided but is not used in the present machine.

At the upper end of the jack there is a butt 18 which at its underside is provided with an angular notch indicated at 19. The edge 21 of the jack below butt 18 is parallel to the back of the jack below fulcrum 12. Engagement of the edge 21 by the face of a cam raising butt 18 prevents rocking outwardly of the lower end of the jack as it is thus raised.

Below the fulcrum point 12 there are a number of butts which include various groups.

The lowermost butt 20' is provided to furnish a differentiation of the needles during makeup. Above this butt are four butts 20a, 20b, 20c and 20d. As will appear hereafter butts at these levels have functions generally corresponding to those of the butts at the levels 16a to 16d inclusive.

Above the lower butts just mentioned are butts 22 which are used for selection of jacks by cooperation with reading cams hereafter described. Any desired number of such butts 22 may be provided to secure the desired patterns.

Below the butt 20' there is a butt 24 the lower edge of which is provided with an angular notch 26 adapted to ride over certain cams. At its lowermost end the jack is provided with a tail portion 117. The outside edge of notch 26 defines with the outer edge of butt 24 a point 26' which, as will apepar, establishes a definite jack level for selection.

In the jack illustrated in FIGURE 44 all of the butts mentioned are shown. It will be understood, however, that various butts of the groups 16a to 16d inclusive, 20', 20a to 20d inclusive and 22 are removed to provide differentiation of jacks for patterning and other purposes. The arrangements of these butts to secure various results will be later described in detail.

The present machine is provided with four yarn feeding stations which are defined essentially by the respective throats 28, 30, 32 and 34 in the latch ring of the machine. These respective throats will be hereafter referred to as defining feed number 1, feed number 2, feed number 3 and feed number 4. At these various feeding stations there are provided yarn feeding fingers indicated in FIGURE 44 at 36, there being additionally provided at feed number 4 a finger 38 arranged to feed elastic yarn to the needles, this elastic yarn being, generally, covered rubber yarn.

The various cams acting upon the needle butts may now be described. At feed number 1 the forward and reverse stitch cams are indicated at 40 and 42 respectively, there being provided between them a cam point 43 which acts similarly to the conventional center cam. A needle raising cam 44 which is withdrawable radially is provided beneath the stitch cam 42. At feed number 2 there are provided the respective forward and reverse stitch cams 46 and 48 along with the cam point 41, similar to 43, there being also provided the needle raising cam 50 which like cam 44 is adapted to be radially withdrawn from action. At feed number 3 there are provided the forward stitch cam 52, the reverse stitch cam 54 and the radially withdrawable needle raising cam 56. At feed number 4 there are provided the forward stitch cam 58 and the reverse stitch cam 60. Between these is a fixed cam 61 having a special function hereafter described. Radially movable and pivotable cams 62 and 64 are provided for purposes hereafter described. Above the cam 62 there is provided the radially movable cam 66 which is arranged to lower needles at the completion of heels and toes. A radially movable cam 67 is positioned above cam 64. Raising pickers are provided at 68 and 70 and will be described in further detail hereafter. Lowering pickers are provided at 72 and 74.

To summarize the conditions or adjustments of the needle cams it may be noted that cams 58, 61, 40, 52, 46, 48, 52 and 54 are fixed and engage both long and short needle butts, cams 60, 67, 44, 50, 66 and 56 are radially movable and cams 64 and 62 are both radially movable and pivotable.

The butts 9 of the intermediate jacks 8 are arranged to be acted upon by various cams which will now be described. Among these are cams 76, 78, 80 and 82 which are arranged to be pivoted about their upper ends, being spring-held in the full line positions shown in FIGURE 44. Cams 76 and 78 are adapted to raise intermediate jacks 8, the butts of which are at their level, when these jacks move from left to right during a clockwise reciprocation, but yield to permit the butts of these intermediate jacks to pass during counterclockwise reciprocations. In similar fashion the cams 80 and 82 are adapted to raise intermediate jacks 8 during counterclockwise reciprocations but yield to permit passage of their butts 9 during clockwise reciprocations. Cams 84 and 86 are provided to raise intermediate jacks under certain conditions during both clockwise and counterclockwise reciprocations. Cams 88, 90, 92 and 94 adjacent to these cams 84 and 86 are arranged to lower the intermediate jacks by engagement with their butts 9. Cams 96, 98, 100 and 102 are also adapted to act upon the butts 9 of the intermediate jacks to lower these jacks. All of the cams acting on the intermediate jacks are fixed except the pivotal cams 76, 78, 80 and 82.

Various cams are also provided to act upon the jacks 10. A cam 104 between feed number 1 and feed number 2 is arranged with a wedge-shaped upper edge to engage within the notch 19 below a butt 18 of a pattern jack to raise it in both directions of reciprocation whenever the jack reaches it with its upper end in an outer position, lowering of the jack after its rise being effected by cams 106 or 108. Raising cam 110 and lowering cams 112 and 114 have similar functions between feed number 3 and feed number 4. The blocks providing cams 106, 108, 112 and 114 are sufficiently far out radially to permit butts 9 of intermediate jacks 8 to pass them without engagement though they will engage the upper ends of pattern jacks 10 which project radially outwardly to a considerable extent whenever engagement should occur.

Cooperating with the point 26' at the outer end of the lower notch 26 of each of the jacks there are the cams 116, 118, 120 and 122 which serve to position the jacks at proper level for tilting selection. These cams are provided with bevelled upper edges tangent to the arc of tilting so as to define the lowered positions of the jacks but not to interfere with their tilting, the points 26' riding on these upper edges.

Cams 124 and 126 are provided respectively between feed number 4 and feed number 1 and between feed number 2 and feed number 3 to engage within the notches 26 of jacks the lower ends of which are projected outwardly. For this purpose the cams 124 and 126 have sharp upper edges for reception by the notches 26. If, however, the jacks are rocked inwardly these cams are passed by the butts 24 without action thereon. All of cams 116, 118, 120, 122, 124 and 126 are fixed.

Reading cams which are moved upwardly and downwardly in unison step by step and also have radial movements are provided to engage butts of the group 22. Of these cams 130, 134, 138 and 142 are adapted to engage butts during counterclockwise reciprocations of the needle cylinder while cams 128, 132, 136 and 140 engage butts during clockwise reciprocations. The arrangements for controlling these cams will be hereafter detailed.

Fixed cams 144, 146, 148 and 150 are arranged at the respective feed stations to act upon the butts 18 of the pattern jacks to rock their upper ends inwardly and their lower ends outwardly. Cams 152, 154, 156 and 158, which will be hereinafter referred to as upper key cams, are provided at the various feeds for selective actions upon the butts at the levels 16a, 16b, 16c and 16d respectively. A cam 159 at the same level as cam 158 is provided for special action on butts at the level 16d when going on the heel, as described hereafter. Cams 160, 162, 164 and 166, all at the same level, are arranged to act upon butts at the level 14 and will be hereinafter referred to as blanking cams.

Lower key cams 168, 170, 172 and 174 are provided at the several feeds to act respectively upon butts at the levels 20a, 20b, 20c and 20d. A cam 176 is specially provided at the location of feed number 1 for acting upon butts at the level 20'. As will hereafter appear this cam acts during counterclockwise rotation of the needle cylinder to provide selection of needles during makeup and the elastic top. Lower blanking cams are provided at 178, 180, 182 and 184 to act upon the butts of the jacks at 24. The various key cams and blanking cams which have been mentioned are radially movable in relationship to the various reading cams as will be hereafter described in detail. Cams 159 and 176 are controlled for radial movements from the main cam drum of the machine.

Of the key and blanking cams, cams 152, 156, 162, 166, 170, 174, 178 and 182 operate during counterclockwise reciprocations of the needle cylinder. The remainder of these cams act on jacks during clockwise reciprocations. Cams 159 and 176 are active during counterclockwise movements of the needle cylinder.

Figure 9:
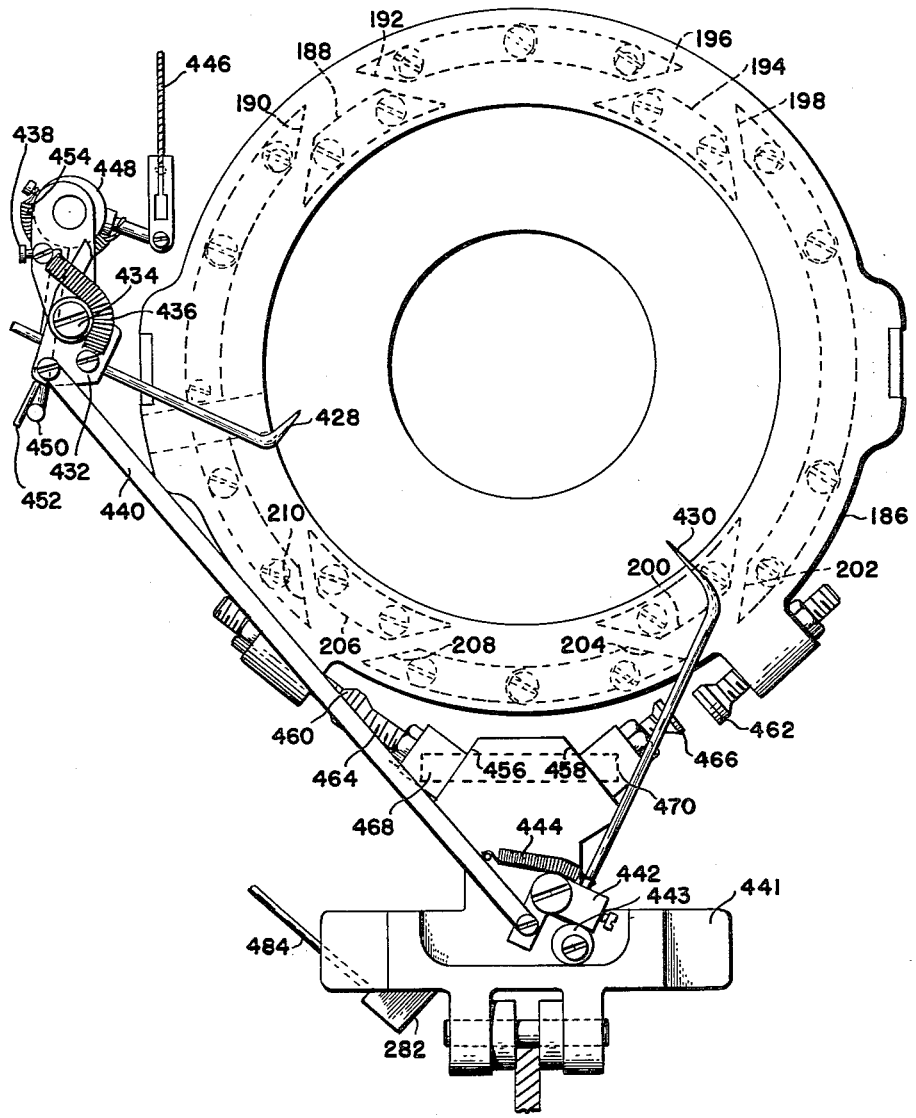
FIGURE 9 is a horizontal section taken on the plane indicated at 9—9 in FIGURE 2A.

The sinker cam arrangement is particularly illustrated in FIGURE 9. The cam ring 186 carries the sinker withdrawing cams 188, 194, 200 and 206 at the respective feeds. These are flanked by the sinker projecting cams 190, 192, 196, 198, 202, 204, 208 and 210. The sinker cam ring is arranged to oscillate to controlled extents as will be hereafter described.

Reference may now be made to the reading cam assemblies indicated generally by the numeral 212. One of these is provided in association with each of the feeds and their construction will become clear from consideration of FIGURES 30 to 41, inclusive, which specifically illustrate the assembly located at feed number 4.

Each of these assemblies is the same except for the position of the key cams and the additional cams 159 and 176 and consequently a detailed description of one will suffice for the others.

A frame 214 provides support for the various parts. A carrier 216 embraces an elongated pinion 218 which is vertically mounted in the frame and the carrier 216 also embraces a vertically mounted screw 220 which at its lower end carries a pinion 224 meshing with the teeth 226 of an annular gear 228 which is mounted for rotation in the circular slot 231 in plate 232 of the machine frame. Studs 234 projecting upwardly from the top of the gear 228 are arranged to be acted upon by pawls as hereafter described.

A pair of members 236 and 238 are pivoted at 240 to the carrier 216 and have partial threads to provide a split nut arrangement embracing the screw 220 under the action of a spring 242. Fixed conical points 244 and 246 are provided as shown most clearly in FIGURE 40 which are arranged to be engaged by, and to spread, the split nut members 236 and 238 if the carriage 216 exceeds uppermost and lowermost limits of its travel. The purpose of these is to effect disengagement of the split nut from the screw by spreading the split nut members against the action of spring 242 thus preventing accidental overrun of the carrier 216 which might result in damage.

A vertical shaft 248 mounted in suitable bearings has secured to it at 250 a collar which is slotted to receive an ear 254 carried by a second collar 252 which is mounted for free angular adjustment on the shaft. Adjustable screws 256 threaded in the collar 250 and engaging the ear 254 serve to set the angular position of the collar 252 relative to the shaft. A collar 258 is fixed to the shaft 248 and is provided with a cam follower extension 262 which is arranged to be acted upon by a cam 266. The collar 252 is provided with a cam follower extension 260 arranged to be operated on by the cam 264. The two cam follower extensions 260 and 262 are thus relatively adjustable but, once adjusted, are effectively rigidly connected to shaft 248 and by cooperation with cams 264 and 266, respectively, serve to provide positive rocking movements of the shaft in both directions. The cams 264 and 266 together with an additional cam 296 which will be mentioned hereafter are carried by a block 267' mounted on a ring 268 which is arranged for annular movement in a slot in the lower bed plate 230.

Cams 265 and 267 provide the initial moves of respective followers 260 and 262 and when block 267' is in its mid position, serve to hold key cams 156 and 168, as well as reading cams 140 and 142, in an inactive position.

Pinned to the shaft 248 is a collar 270 which is slotted for the reception of an ear 271 formed on a collar 272 which is mounted for adjustment relative to the shaft. Adjustment is afforded by screws 276 threaded into the collar 270 and bearing against the ear of the collar 272. The collar 272 is provided with a gear segment 274 which meshes with an idler 278 which in turn meshes with a pinion 280 secured to the shaft of the elongated pinion 218. The arrangement is such that the rocking of the shaft 248 effected by the cams 265, 264, 267 and 266 results in the imparting of a rocking motion to the elongated pinion 218 thus to project alternately the reading cams which are mounted to slide in carrier 216 and are provided with teeth 282 meshing with pinion 218. In the particular reading cam assembly illustrated in the figures now under consideration the reading cams are 140 and 142.

At its upper end the shaft 248 carries an arm 284 which is provided with a downwardly extending pin 286 engaging an opening in the outer end of the upper key cam 156 which, along with other key and blanking cams, is slidable in the frame structure 214. Due to this arrangement the key cam 156 is moved into and out of action concurrently with the reading cam 142 on the corresponding side. It may be here noted that while the various reading, key and blanking cam assemblies are similar in construction, pairs of them have right-hand and left-hand configurations, i.e. at the first and third feeds it will be noted that the key cams 154 and 158 are on the opposite side as compared with the key cams 156 and 152 at the fourth and second feeds. Similar right-hand and left-hand arrangements occur in the case of other elements as will be apparent from FIGURE 44 but these need not be specifically referred to in the present general description of the reading cam assembly.

The cam following extension 262 is provided with a downwardly extending pin 288 engaging in an opening in the outer end of the slide of key cam 168. This arrangement is such that the key cam 168 is movable into and out of its active position concurrently with the corresponding reading cam 140.

A sleeve 290 is journalled on the shaft 248. Clamped to its lower end is an arm 292 supporting a downwardly extending pin 294 which is arranged to be acted upon by cam 296 which is secured to the assembly including cams 264 and 266. An arm 298 is secured to the upper end of the sleeve 290 and is provided with an upwardly extending pin 300 which engages an opening in the outer end of the slide constituting blanking cam 166. The arm 298 is urged outwardly by the arrangement of the plunger 302 and spring 304, outward movement being limited by the stop hook 306 which is in position to be engaged by the pin 300.

A lever 308 is pivoted on a stud 310 and is provided with a cam follower portion 312. It is also provided with an extension 314 entering an opening in the outer end of the slide constituting blanking cam 184. Lever 308 is pulled by spring 316 to engage a cam 318 which is mounted to be circumferentially slidable with respect to the ring 268. The nature of this mounting arrangement will be evident from FIGURE 38 in which it will be observed that a space 320 is provided in the lower portion of the block which carries cams 264, 266 and 296 and in this space the cam 318 is movable between limits defined by an end wall 326 and an undercut end wall 328. These end walls are provided by members secured with the block to the ring 268. A spring 324 attached to the cam 318 at 319 serves to pull it clockwise as viewed in FIGURE 38. An adjustable eccentric member 322 is secured to cam 318 and serves to prevent the cam from moving radially inwardly and is engageable by lever 321 to effect at desired times a sliding movement of the cam against the action of spring 324 when the ring 268, during rotary knitting or at the ends of reciprocating strokes while patterning, occupies a mid or neutral position.

The cam 150 is mounted adjustably in the upper end of the reading cam assembly, being urged outwardly by a spring 330 against an adjustable stop screw 332. Cam 150 is normally fixed during operation of the machine.

Figure 32:
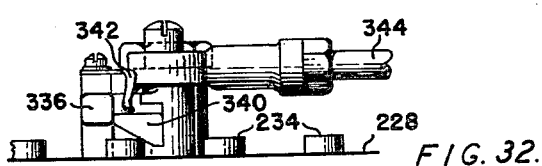
FIGURE 32 is a fragmentary elevation looking from the plane indicated at 32—32 in FIGURE 30.
Figure 33:
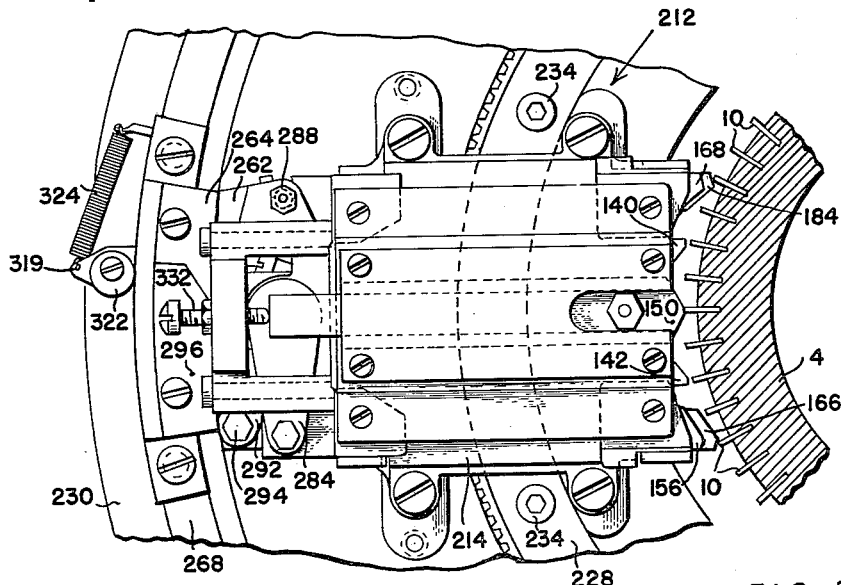
FIGURE 33 is a plan view of an assembly containing cams for control of jacks, the needle cylinder being shown in horizontal section.
Figure 34:
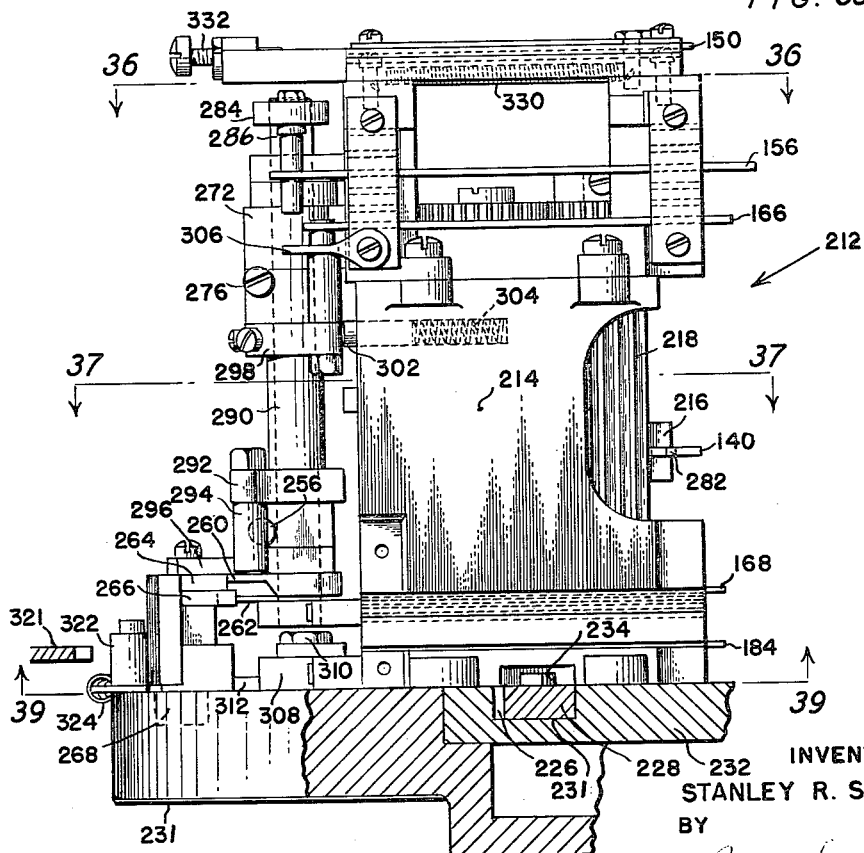
FIGURE 34 is an elevation of the same, certain parts of the machine being shown in section.
Figure 38:
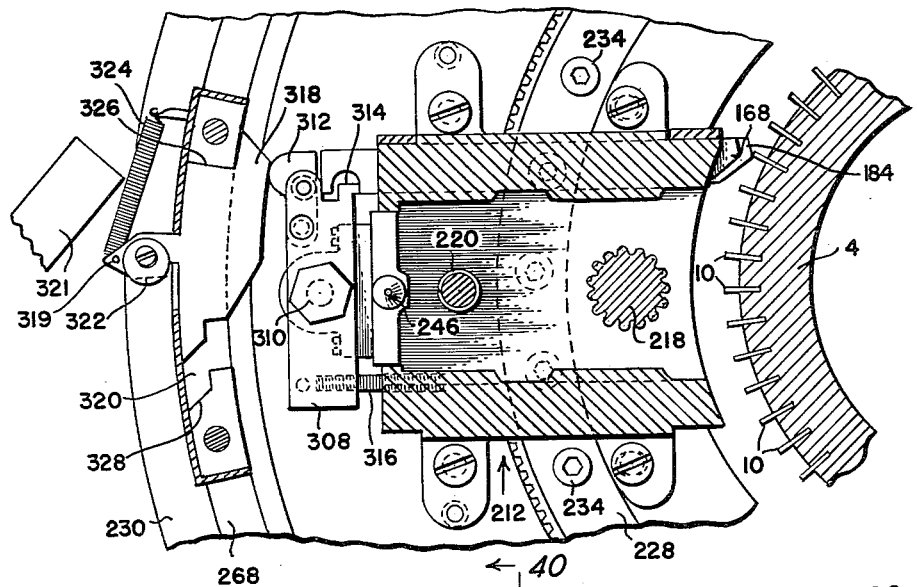
FIGURE 38 is a horizontal section taken on the broken surface indicated at 38—38 in FIGURE 40.
Figure 35:
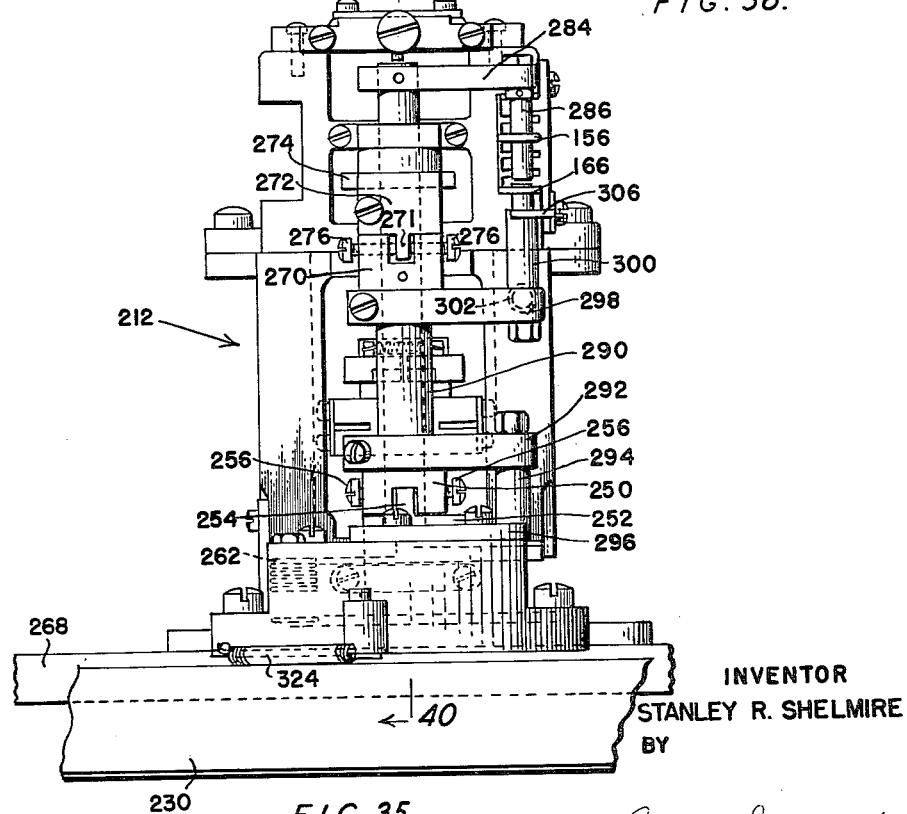
FIGURE 35 is an outside elevation of the same.
Figure 36:
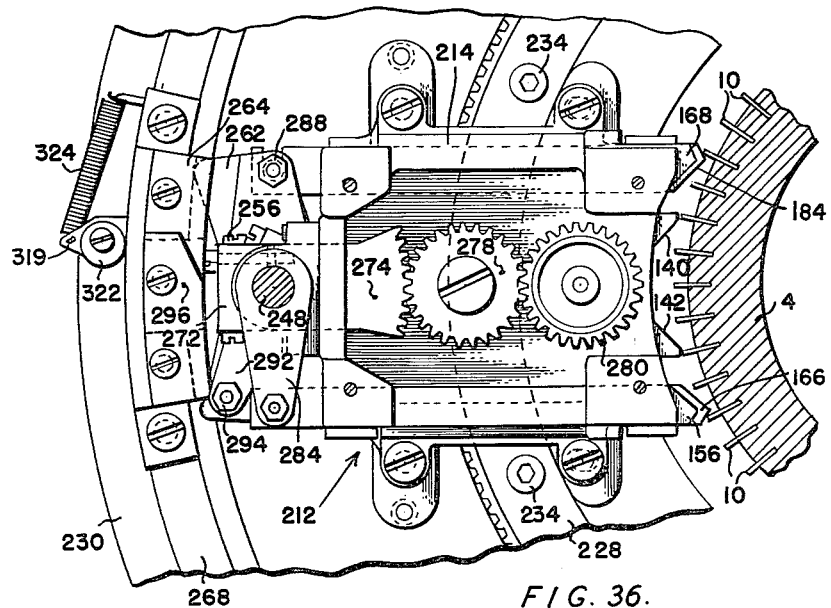
FIGURE 36 is a horizontal section taken on the plane indicated at 36—36 in FIGURE 34.
Figure 37:
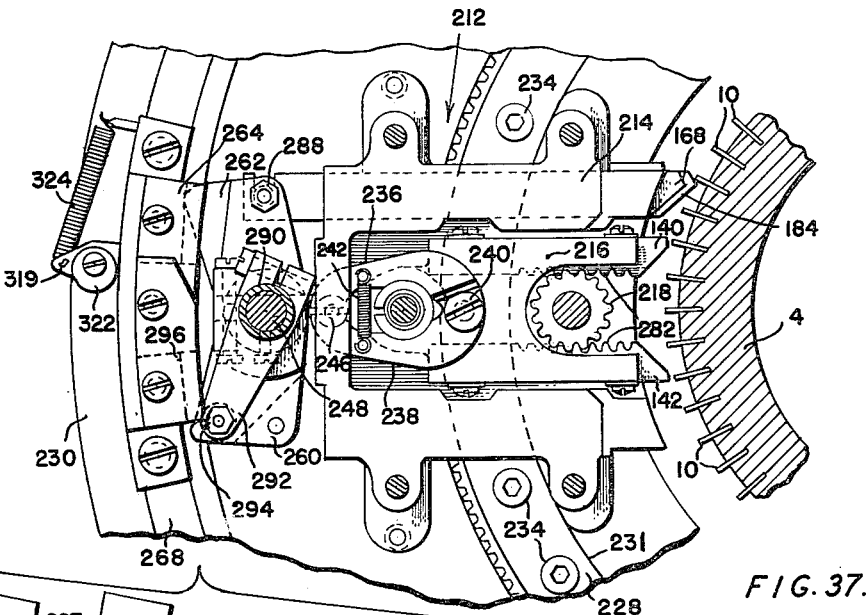
FIGURE 37 is a horizontal section taken on the plane indicated at 37—37 in FIGURE 34.
Figure 41:
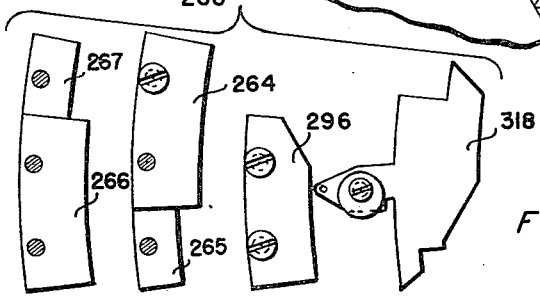
FIGURE 41 is an exploded plan view showing certain stacked cams illustrated in FIGURES 33 to 40.
Figure 39:
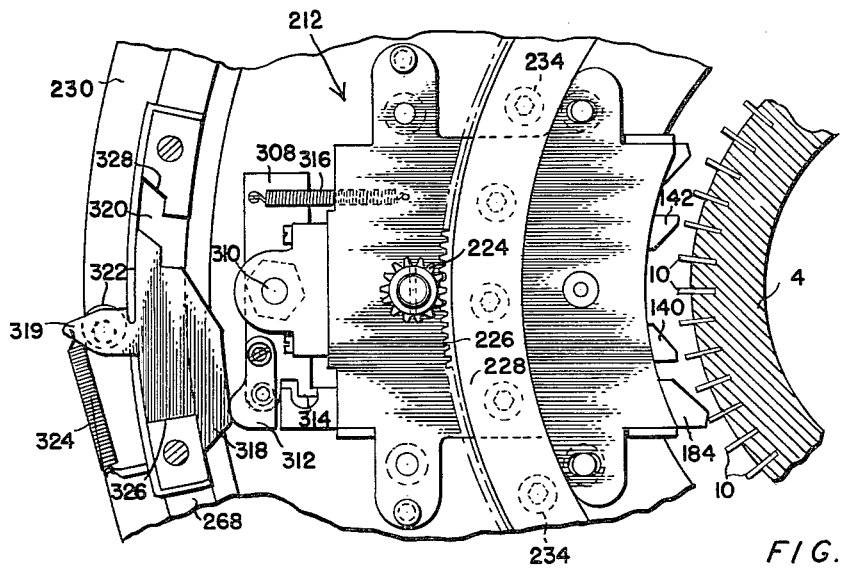
FIGURE 39 is a section taken on the plane indicated at 39—39 in FIGURE 34, looking upwardly.
Figure 40:
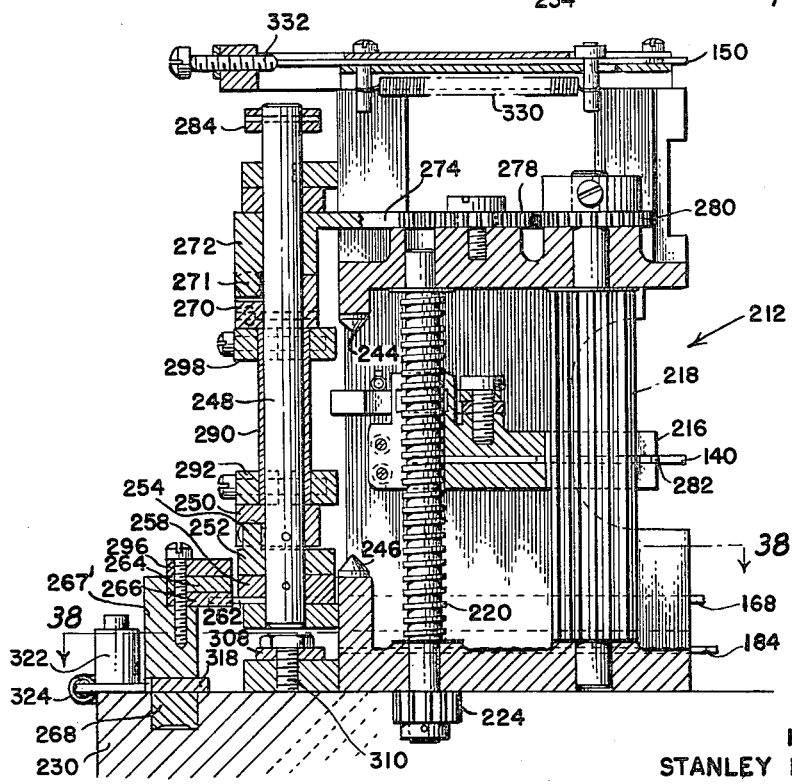
FIGURE 40 is a vertical section taken on the radial plane extending centrally through the assembly of FIGURES 33 to 38.

On a stud 334 carried by the plate 230 there is mounted a lever 336 to which is pivoted on a horizontal screw 338 a pawl 340 the shape of which is best illustrated in FIGURE 32. A spring 342 urges this pawl downwardly in position to engage the studs 234 on the ring 228. A rod 344 operated as hereafter described produces oscillation of the arm 336 about pivot 334 and in the assembly illustrated in FIGURE 30 produces on each stroke a clockwise movement of the ring 228. The pawl 340, however, may be rendered inoperative by an arm 348 of a bell crank movable beneath the pawl 340 to raise the same to clear studs 234. For this purpose the bell crank is mounted on a post 346 below a fixed collar 347 and has movements imparted to it from a link 350 connected to the other arm 353 of the bell crank. Movement of the bell crank is limited by a stop screw 351 carried by collar 347 and extending within a slot in a block 349 secured to the bell crank.

Figure 12:
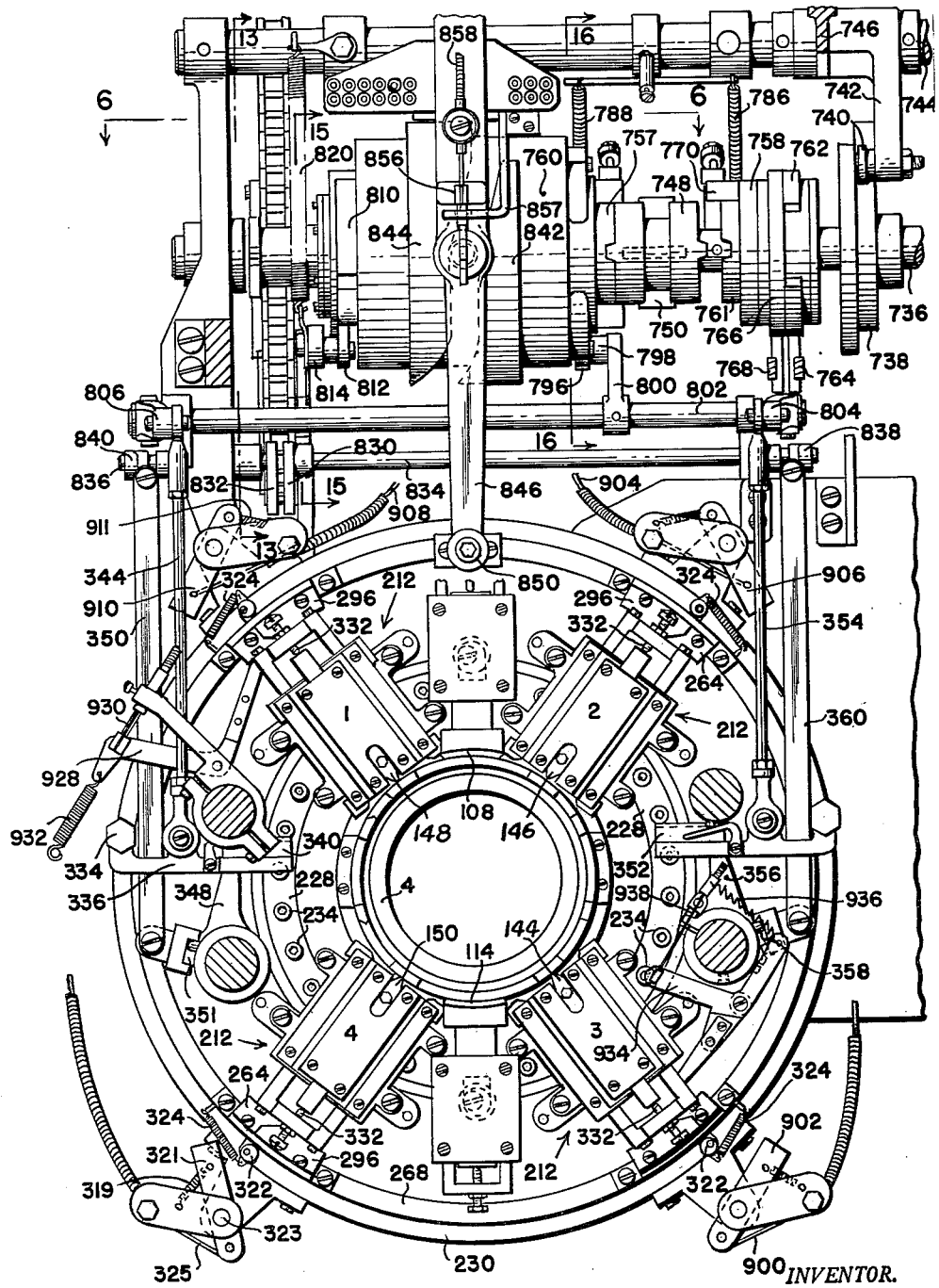
FIGURE 12 is a horizontal section taken on the plane indicated at 12—12 in FIGURE 2A.
Figure 15:
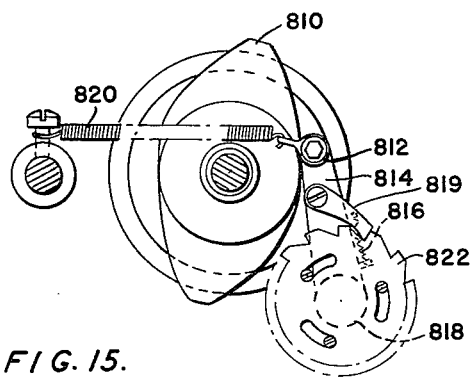
FIGURE 15 is a vertical section taken on the plane indicated at 15—15 in FIGURE 12.

The arrangement just described of pawl 340 is duplicated on the other side of the machine as illustrated in FIGURE 12, there being provided the pawl 352 actuated through the link 354 and controlled by the bell crank 356 connected to the link 360, motion being limited by stop 358. The oscillation of pawl 352 effects counterclockwise steps of the ring 228. As will appear hereafter these pawls 340 and 352 are alternately operable and provide first upward and then downward movements of the various reading cams in unison.

The raising pickers 68 and 70 are similar though, of course, designed to operate in opposite directions. The details and control of the picker 68 are illustrated particularly in FIGURES 17 and 18 and it will be understood that the construction and control of the picker 70 are similar. The picker 68 is provided with lower and upper steps 362 and 364 respectively, the active end of the picker being carried by a lever 366 pivoted to the cam block and normally urged in a clockwise direction as viewed in FIGURE 18 by a spring 368. As will be evident hereafter the pickers occupy three different positions during different phases of operation of the machine. One of these positions is an uppermost position corresponding to extreme counterclockwise position of the picker 68 as viewed in FIGURE 17. In this position the picker 68 overlies needle butts as they pass over cam 40 and consequently butts are not engaged to be raised by the picker. In an intermediate position, illustrated in FIGURE 18, the picker is so positioned as to engage only a single butt which reaches the picker at a level just above the step 362 but at a level insufficient to passover the step 364. The step 362 is narrow and as the movement of the needle cylinder proceeds after engagement of a butt over the step 362 this butt only is raised, the picker moving to a height under the action of this butt such that the next butt moves thereunder. In its lowermost position the picker is at a level such that the leading butt engages above the step 364 and serves to move the picker upwardly and in the direction of needle travel. The arrangement is such that when this occurs the step 362 engages the next following needle butt with the result that two needles are picked upwardly, the butts of succeeding needles then passing under the picker.

Figures 17, 18:
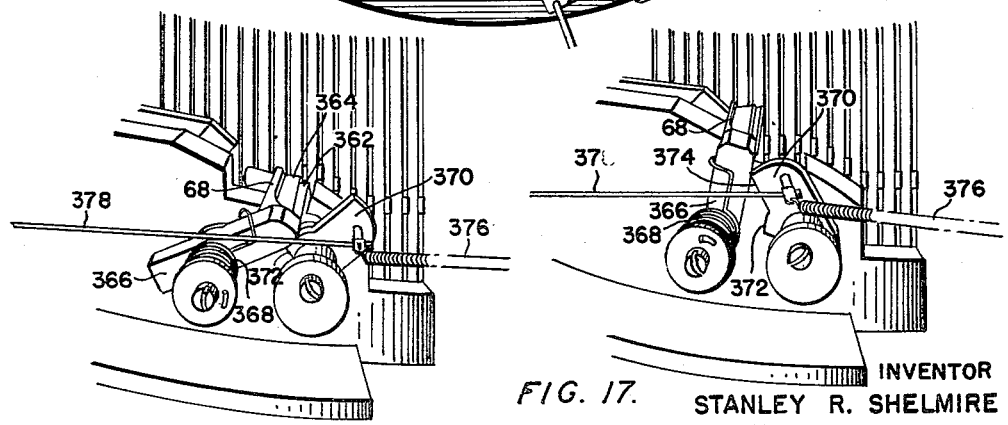
FIGURE 17 is a fragmentary perspective view showing a raising picker and its control in inactive position.
FIGURE 18 is a view similar to FIGURE 17 but showing the same elements when the picker is in position to pick single needles.

To achieve these three positions of the picker there is provided the cam 370, urged in a right-hand direction by a spring 376 and pulled in a left-hand direction by a Bowden wire 378, all as view in FIGURES 17 and 18. The portion 374 of cam 370 when the cam is in its counterclockwise or left-hand position causes the picker to assume its uppermost position to be missed by all butts reaching it. If, however, the cam 370 is in an intermediate position as illustrated in FIGURE 18 the picker lever 366 rests on the portion 372 of cam 370 so that the picker is in a position to raise only single needles at each stroke in the direction in which the picker is active. The third position involves extreme clockwise position of the cam 370 so that the picker lever drops off the cam ledge 372. In this condition the picker is at its lowermost position to engage two needles during each stroke. The Bowden wires 378 for the two cam controls are actuated from the main cam drum of the machine.

Figure 19:
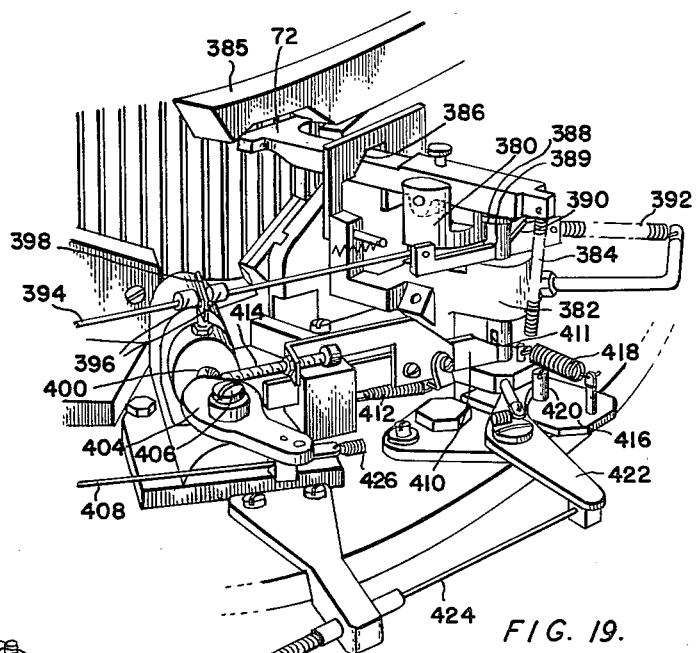
FIGURE 19 is a perspective view of various elements particularly associated with a dropping picker.

The lowering pickers 72 and 74 are similar in their construction and operation, except for reversal of hand, and the description of the details with respect to picker 72 will suffice for picker 74. The details with respect to picker 72 are illustrated in FIGURE 19. The picker 72 is in the form of a lever pivoted about a horizontal axis which in turn is carried by the usual swivel 380 pivoted on a vertical axis in the bracket 382. A spring 384 pulling downwardly on the outer end of the picker lever normally urges its operating end into a recess in the cam 385. A fixed cam 386 is provided in the usual fashion to serve, when the picker is engaged by a needle butt, to lower the picker as it swings in a direction which is toward the left in FIGURE 19. After the picker is released by the needle it is free, after the segment of butts have cleared its upper surface, to move back to its original position under the action of spring 384. For indication of its operation the picker is shown in FIGURE 19 in the position which it would assume after engagement by a needle butt.

Figure 11:
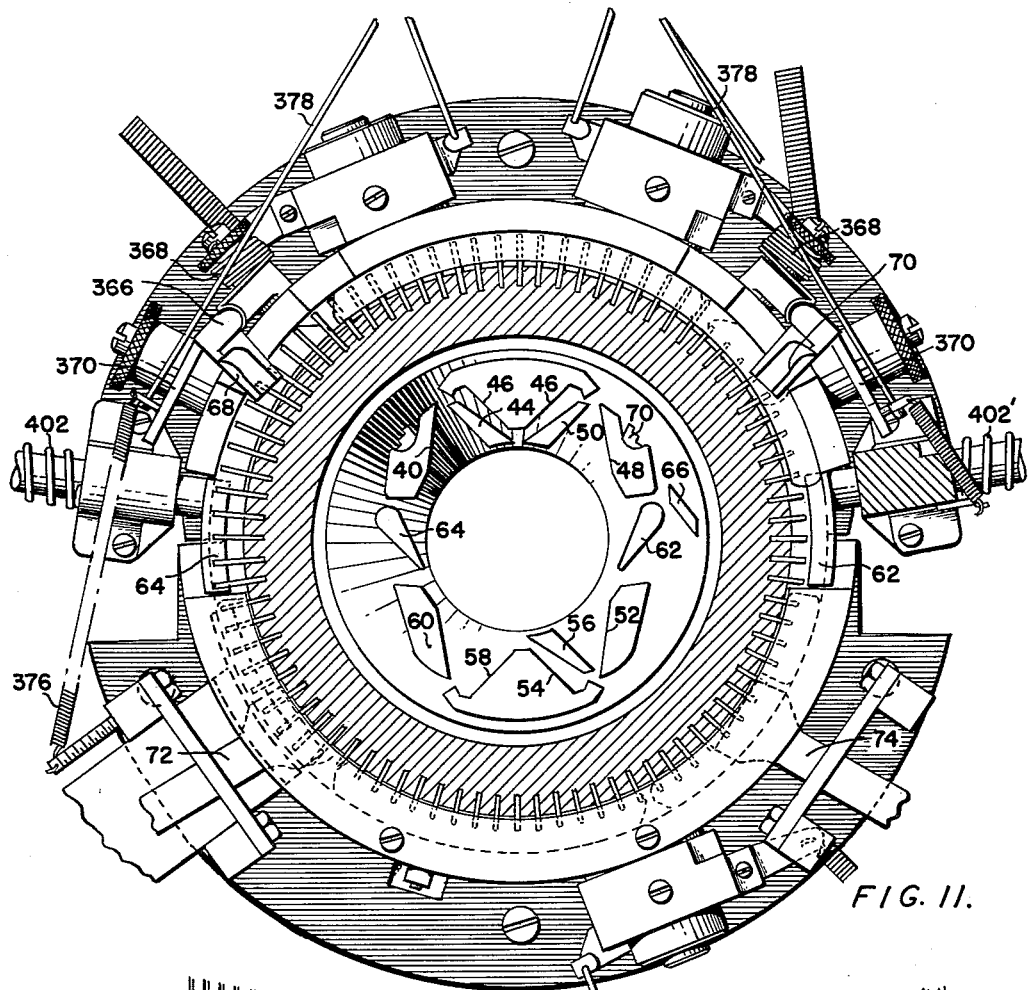
FIGURE 11 is a horizontal section taken on the plane indicated at 11—11 in FIGURE 2A, there being diagrammatically indicated in the center of this figure various needle cams to indicate their angular relationships to the elements particularly shown in the section.

Underlying the outer end of the picker lever is a pin 388 vertically guided in the bracket 382. This pin is provided with a slot 389 through which extends a slide provided with a cam surface 390, the slide being urged toward the right in FIGURE 19 by spring 392 and being operable toward the left as viewed in that figure by a pull wire 394 controlled from an auxiliary cam drum of the machine, hereafter described, and provided with a pair of collars 396 engaging an upstanding arm 398, through which the pull wire passes, carried by the shaft of the switch cam 64 which shaft is arranged to oscillate about its axis and also to be moved inwardly against the action of a spring 402 (FIGURE 11). The outer end of the shaft of switch cam 64 is pointed and is indicated at 400. This is arranged to be acted upon by a cam 404 pivoted at 406 and actuated by a Bowden wire 408 from the main cam drum of the machine against the action of a spring 426. A slide 410 is guided in a suitable fixed bracket and enters a slot in the pin 388, being provided with a cam surface indicated at 411. A spring 412 normally urges this slide toward the left in FIGURE 19 and the slide is provided with an adjustable screw 414 arranged to be acted upon by the cam 404. The described arrangements will have their functions set forth more fully hereafter but at the present time it will suffice to say that the picker 72 may be rendered inactive by the movement of cam surface 390 to the left or by movement of cam surface 411 to the right as viewed in FIGURE 19. The movement of cam 390 to the left is effected by pull wire 394 and is concurrent with the rocking of the cam 64 to an upper inactive position, i.e. clockwise as viewed in FIGURE 44. The action of cam 411 to render picker 72 inactive is associated with positioning of cam 404 to move inwardly the cam 64, this action taking place by reason of engagement of adjustable screw 414 by cam 404. The action, however, is not concurrent, the cam 404 being so arranged as to move the cam 64 into action, at a halfway position under the action of Bowden wire 408 without rendering the picker 72 inactive. Further movement of the cam 404 to its fully displaced position under the action of Bowden wire 408 will render the picker 72 inactive while at the same maintaining cam 64 in its inner position.

FIGURE 19 also shows the control for radial movements of the stitch cam 60. This cam is carried by a slide 416 normally urged inwardly by the action of spring 418. The slide is provided with an upstanding pin 420 engageable by the end of a lever 422 which is movable by a Bowden wire 424, through connections to the main cam drum, against the action of a spring 418.

Referring now to FIGURE 9 there are shown therein a pair of latch openers 428 and 430, the former of which is arranged to open latches during makeup as the needles approach stitch cam 58, while the latter opens latches as the needles approach stitch cam 52. As will be evident hereafter the two latch openers are required since only alternate needles are selected to take rubber at feed number 4. Latch opener 428 is mounted in a carrier 432 pivoted at 434 and urged in a counterclockwise direction by a light spring 436 to a position limited by a stop screw 438. A link 440 connects the carrier 432 to a bell crank 442 which mounts the second latch opener 430. A light spring 444 also urges this latch opener in a counterclockwise direction. A Bowden wire 446 actuated from a cam on the main cam drum connects to a lever 448 provided with an arm 450, the outer end of which extends upwardly to engage a pin 452 secured to the carrier 432. A strong spring 454 urges the lever 448 in a clockwise direction so that through its arm 450 and link 440 the latch openers are normally held in outer inactive position. When, however, they are to be active, a pull is exerted on Bowden wire 446 to overcome spring 454, whereupon the springs 436 and 444 move the latch openers into engagement with the needle latches.

Figure 10:
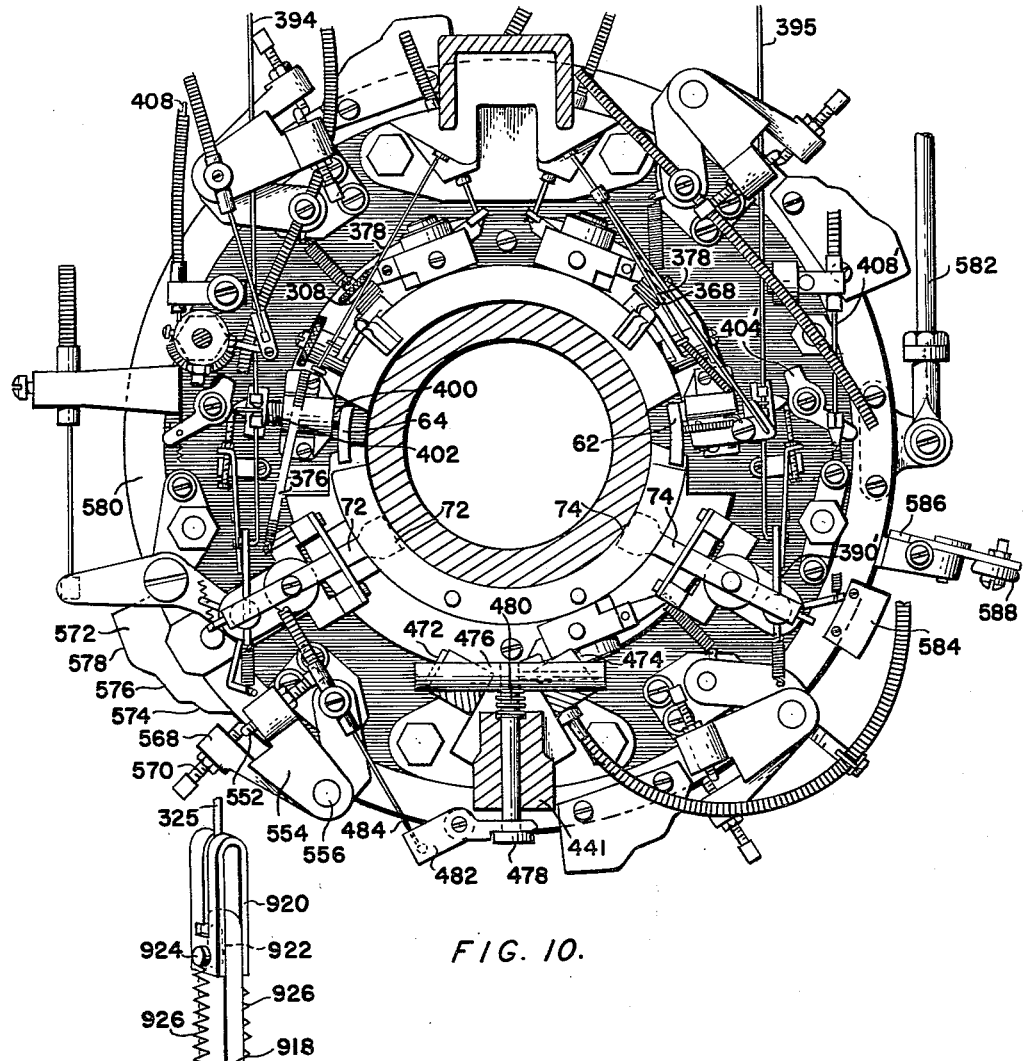
FIGURE 10 is a horizontal section taken on the plane indicated at 10—10 in FIGURE 2A.

Referring particularly to FIGURES 9 and 10, there are shown therein the devices which control oscillating movements of the sinker cam ring. The fixed member 441 is provided with surfaces 456 and 458 against which there may abut the adjustable stop screws 460 and 462 carried by the sinker cam ring 186. As will be evident from FIGURE 9 the clearances are such that when these surfaces are engaged by the screws the cam ring has a considerable extent of oscillatory movement. A limited oscillatory movement is provided by additional stop devices including the adjustable screws 464 and 466 which may be engaged respectively by the screws 460 and 462. The screws 464 and 466 are respectively carried by upwardly extending levers 468 and 470 which are pivoted at their lower ends at 472 and 474. A transverse pin 476 extends through openings in the levers 468 and 470 and is carried by a pin 478 slidably mounted in the frame of member 441 and is urged inwardly by a spring 480. By reason of this arrangement the levers 468 and 470 are normally positioned to bring their stop screws 464 and 466 into positions to limit the oscillatory movements of the sinker cam ring. The levers 468 and 470, however, may be withdrawn by the action of a lever 482 on the headed end of pin 478, the lever 482 being connected through a Bowden wire 484 for actuation by the main cam drum of the machine. When the levers 468 and 470 are withdrawn outwardly the stop screws 460 and 462 are arrested by the surfaces 456 and 458 thereby providing considerable oscillatory swing of the sinker cam ring.

The yarn feeding devices will now be described with particular reference to FIGURES 2A, 8, 10 and 20 to 26, inclusive. Each inelastic yarn Y passes from the supply cone through an eye 486, thence between tension discs 488, through an opening in an arm 490 and then through eyes 494 and 496. The arm 490 is pivoted and acted upon by a spring 492 to act as a takeup for the yarn. The purpose of this takeup action will become apparent hereafter. From an eye 496 the yarn passes through the eye 500 of a takeup sweep 502 pivoted at 504 and acted upon by an individual spring 506, the springs for the takeups at each feed being anchored to a lever 508 which may be clamped in an adjusted position by a screw 510 as indicated particularly in FIGURE 24. The tensions of the takeup sweep springs may thus be adjusted. From the takeup sweep each yarn passes through eyes 498 and 512 and thence through the feeding hole 514 of a yarn feeding finger. Each of these yarn feeding fingers comprises an end portion 516 which is pivoted at 518 to a lever 520 mounted upon a transverse pin 522. The purpose of the end 516 is to provide proper location of the yarn feed in the throat of the latch ring 34 during reciprocatory knitting. As reciprocation in one direction takes place the portion 516 of the yarn feeding finger may move in the direction of run of the yarn while during reverse reciprocation it may move in the opposite direction and in either case will occupy a definite and proper position irrespective of the particular yarn finger which is active. As will be noted from the cam development there are at each feed four inelastic yarn fingers with the exception of feed number 4 where there are three yarn fingers handling inelastic yarn and there is one finger handling the rubber yarn. While the inelastic yarn fingers are thus made free to move irrespective of their positions to proper location, said yarn fingers when inactive may be closely arranged side by side and for this purpose each of the ends 516 is provided with an extension 524 provided with a wedge-shaped end so that as the yarn finger rises to inactive position the movable end 516 having a wedge-shaped lower edge will be properly located in the assembly. The yarn fingers are urged in a downward direction by individual springs 526 and are provided with upward extensions 528 adjacent to the pivot pin 522, which extensions 528 are arranged to engage the lower ends of the sweep levers 502 below their pivot pin 504. As illustrated particularly in FIGURE 25 the lower end of each sweep lever is curved as indicated at 529 to prevent jamming in the event that a yarn breaks and the corresponding feed finger is raised to inactive position, the curved end 529 serving to cooperate with the extension 528 so that as each yarn feeding finger is rendered inactive its corresponding takeup sweep is also rendered inactive being brought to substantially a vertical position against the action of its spring 506.

The yarn feed levers 520 have projections 530 engageable by levers 532 of which there is one for each yarn lever. Each of the levers 532 is provided with a follower portion 533 engageable by butts 536 on elements 538 mounted in slots in a trick wheel 540. Secured to the trickwheel is a ratchet 542 arranged to be advanced step by step by a pawl 544 pivoted at 546 to an arm 547 and urged by a spring 548 into engagement with the ratchet. The arm 547 is urged clockwise as viewed in FIGURE 25 by a spring 550. Movements are imparted to the lever 547 by an adjustable screw 552 secured in a member 554 which is mounted on a vertical pin 556 and has a portion 568 in which is located a follower screw 570 adapted to be engaged by a cam 572 provided with three steps 574, 576 and 578 (FIGURE 10). The cam 572 is secured to a ring 580 which is arranged to be oscillated by a link 582 the operation of which will be described later. It may at this time be pointed out that the link 582 is urged by a spring in a downward direction as viewed in FIGURE 10. By reason of this spring action it may be at times latched against movement and to this end the ring 580 is provided with an ear 584 which is engageable by a latch member 586 (FIGURE 10) taking the form of a lever connected by a link 588 to controlling devices hereafter described.

Figure 26:
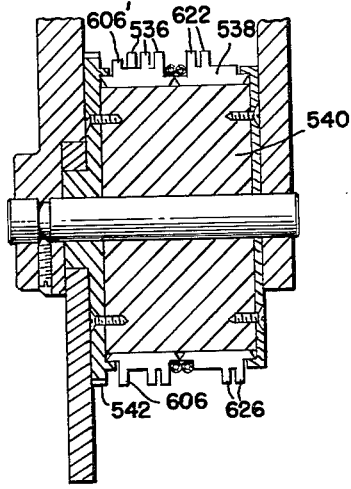
FIGURE 26 is a vertical section through a trick wheel for control of feeding fingers.
Figure 25:
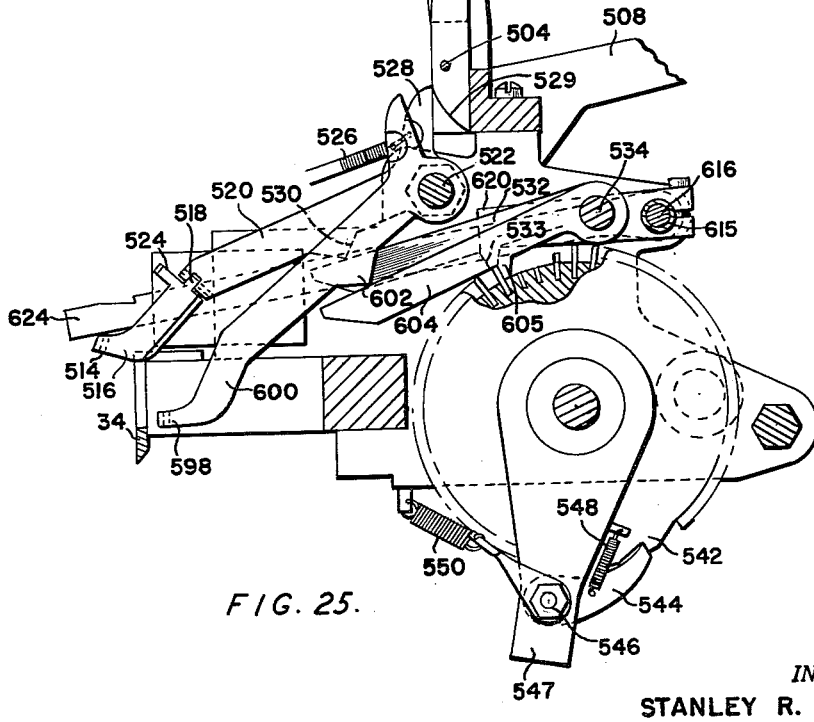
FIGURE 25 is a vertical section taken on the broken surface generally indicated at 25—25 in FIGURE 21.
Figure 30:
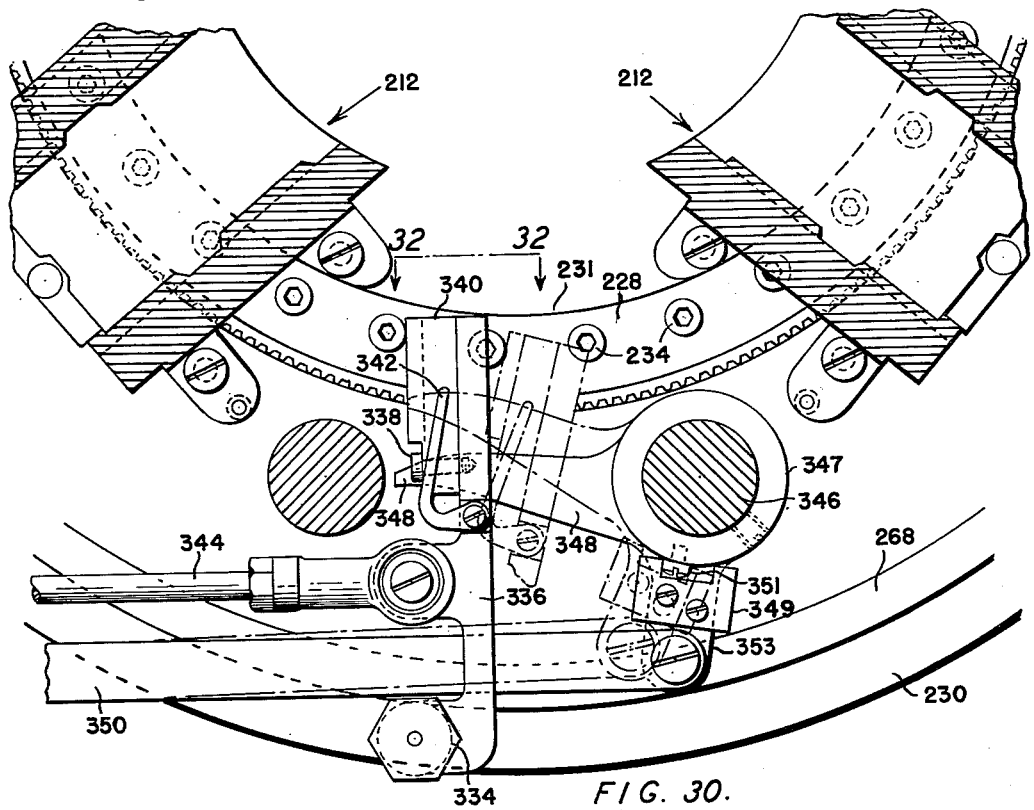
FIGURE 30 is a horizontal section taken at the level indicated at 30—30 in FIGURES 2A and 31.
Figure 31:
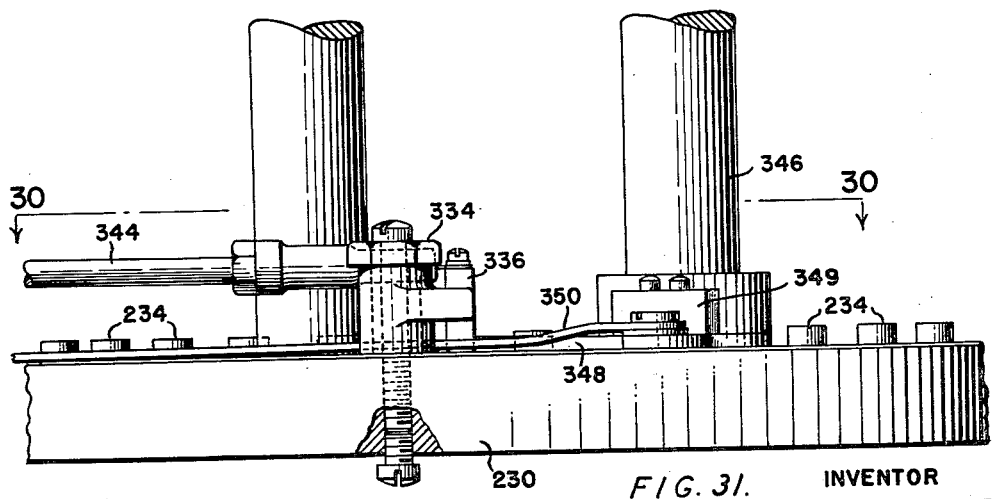
FIGURE 31 is a fragmentary elevation of the parts shown particularly in FIGURE 30.

As has already been indicated an elastic covered rubber yarn is fed at feed number 4 which is the one particularly illustrated and now under detailed discussion. The elastic yarn passes from its supply through an eye 590 and then between the tension discs 594. From these it passes through an eye 592 and a second eye 596 to the feeding hole 598 in a lever 600 similar to the levers 520 but without a pivoted outer end. The lever 600 is mounted on the pin 522 and provided with a portion 602 engaging a lever 604 mounted on pin 534 and provided with a follower portion 605 engageable by butts 606 carried by the elements 538 mounted in the trickwheel 540. The butts 606 are all of the normal height of butts 536 with the exception of one butt 606' which is of less length as indicated in FIGURE 26. The purpose of this special butt will be described hereafter in connection with the operation.

Figure 8:
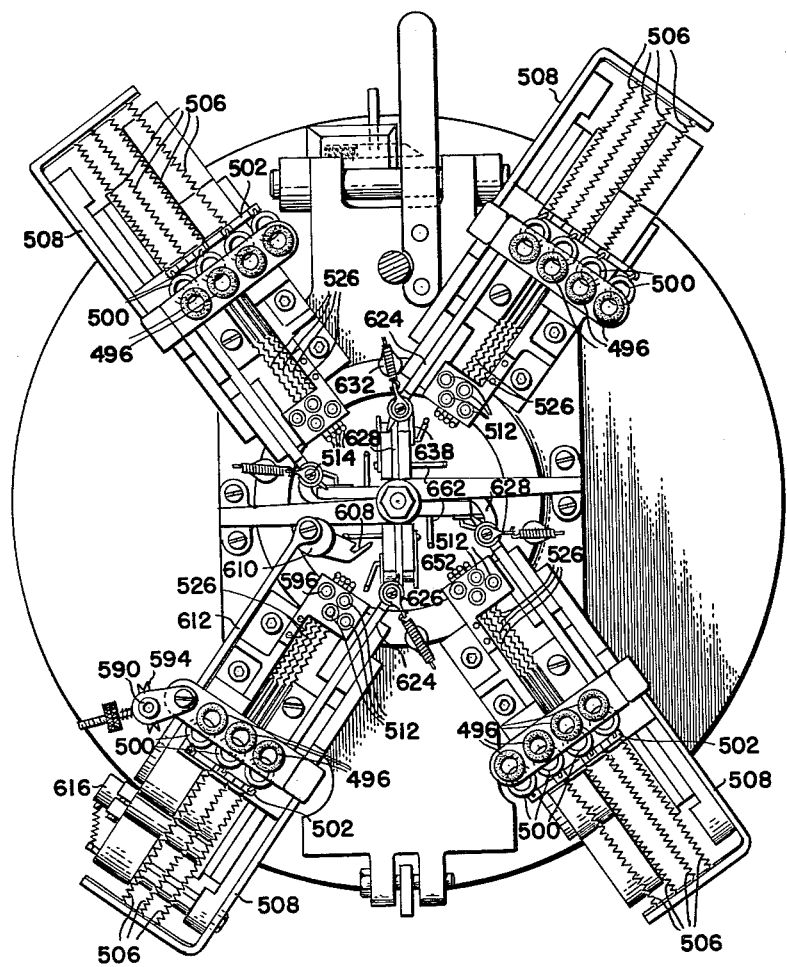
FIGURE 8 is a plan view of the machine looking from the plane 8—8 in FIGURE 2A.

As will hereafter appear the elastic yarn is not cut during the continuous operation of the machine but trails from stocking to stocking. It is, however, engageable by a lever 608 provided with a hook-shaped end as indicated in FIGURE 8, which lever is mounted to swing about a vertical axis under the action of a link 612 which is connected to the lower end of a lever 614 secured to a sleeve 615 journalled on a shaft 616 and urged in a counterclockwise direction as viewed in FIGURE 22 by a spring 618. A follower lever 620 connected to sleeve 615 is engageable by butts in the position 622 on the elements of the trickwheel 540.

Journalled on the shaft 616 for free movement about the same is a lever 624 which has a follower portion engageable by butts in the locations 626 of the elements mounted in trickwheel 540. The inner end of lever 624 is adapted to operate a yarn clamping and cutting device.

The foregoing specific description of the yarn feeding assembly is directed to the assembly at feed number 4 where an elastic yarn is fed as well as three inelastic yarns. At each of the other feeds a similar assembly is provided with the exception that at these other feeds there are four inelastic yarn feeding fingers and there is omitted the assembly of devices specially associated with the elastic yarn, i.e. there will be no special finger such as 600 nor will there be the special leastic yarn tensioning means 594 nor the elastic yarn guarding lever 608, etc. The fourth inelastic yarn feeding finger will take the position of the finger 600 and butts on the trick wheel elements at the position corresponding to 606 will control this inelastic yarn feeding finger. Butts at position 622 will be inactive even if present. It will be evident that all of the yarn feeding assemblies are simultaneously operated by the stepping of their trickwheels under control of the ring 580.

Figure 28:
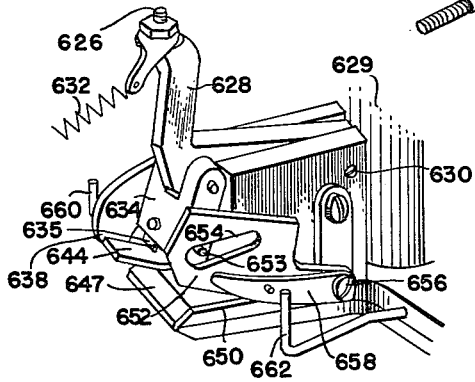
FIGURE 28 is a perspective view looking at the right-hand side of the clamp and cutter assembly.
Figure 29:
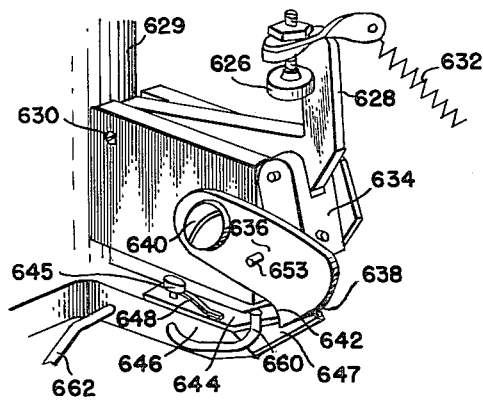
FIGURE 29 is a perspective view looking at the left-hand side of the clamp and cutter assembly.
Figure 27:
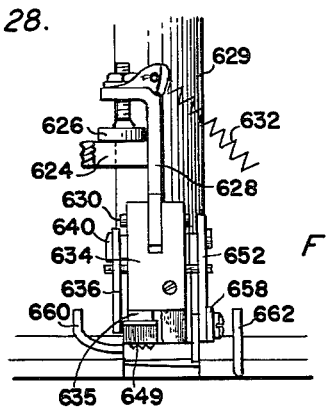
FIGURE 27 is an elevation looking radially inwardly at a yarn clamp and cutter assembly.
Figure 23:
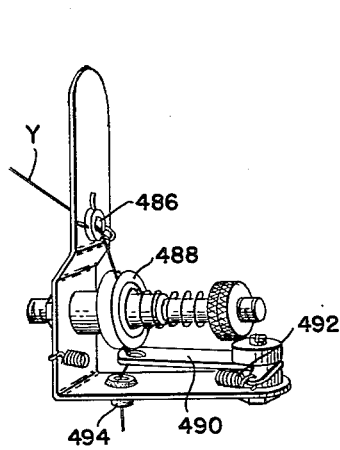
FIGURE 23 is a perspective view showing a tensioning and takeup device for control of a yarn.

Reference will now be made to the inelastic yarn clamping and cutting means with particular reference to FIGURES 27, 28 and 29. The lever 624 engages the lower end of an adjustable screw 626 carried by a lever 628 pivoted at 630 to a frame assembly supported by a central post 629, it being understood that there is a clamping and cutting assembly associated with each of the feeds. A spring 632 normally urges the lever 628 downwardly. The lever 628 is connected by a link 634 to a yarn trapping lever 636 pivoted at 640 and provided with a nose portion 642 which in particular is adapted to engage and guide a yarn. A curved edge portion 638 of the trapping lever also serves to guide a yarn. A clamping member 644 is provided with an upturned outer end and is mounted on a pin 645 being pressed downwardly by a spring 648 against a base member 646. This base member is provided with a downwardly beveled outer edge as indicated at 647 to provide with the upwardly extending portion of member 644 for the reception of a yarn. For the better clamping of the yarns the cooperating surfaces of members 644 and 646 are desirably provided with interengaging flutes as indicated at 649 in FIGURE 27.

Secured to the member 646 is a fixed cutting blade 650. A movable cutting blade cooperating therewith is provided at 652 and is pivoted at 656 being urged into cutting relationship with the fixed blade by a leaf spring 658. A slot 654 in the movable blade receives the pin 653 carried by the link 634 so that as the link is depressed the movable blade overlaps the fixed blade to cut the yarn. In order to insure better clamping action than is provided by spring 648, the link 634 is provided with an extension 635 which presses against the member 644 when clamping is to occur. To provide further controls for the yarns, wire guides 660 and 662 are provided as illustrated in the figures.

The yarn changing operations including clamping and cutting are described in detail hereafter.

Referring now particularly to FIGURES 1, 2A, 2B, 3, 4 and 12, the driving devices for the machine will be described. The power input is through shaft 664 which is associated with the conventional speed change pulleys with speed control devices (not shown). A pinion 665 on shaft 664 meshes with a gear 666 connected through a stub shaft 668 to a gear 670. This gear 670 in turn meshes with a pinion 672 to which is affixed a clutch element 674 arranged to be engaged by a movable clutch member 676 which is splined to a shaft 682 on which the pinion 672 is journalled. On its other side the clutch member 676 is engageable with a clutch element 677 which is secured to a pinion 678 also journalled on shaft 682. The pinion 678 meshes with a gear segment 680 which is journalled on a shaft 708.

To the shaft 682 there is secured the bevel gear 684 which meshes with the bevel gear 686 which imparts rotation or oscillation to the needle cylinder through conventional connections. The needle cylinder is arranged to be raised and lowered for stitch control through the conventional bearing arrangement at 688 and vertically movable sleeve 690 which is held downwardly by a spring 691 to bring a lug 693 into engagement with an adjustable pad member carried by a lever 692 provided with a group of followers 693a, 693b and 693c acted upon by cams on the main cam drum of the machine.

The clutch member 676 is movable selectively to engage the elements 674 or 677 by means of a slidable member 694 which is provided with a pin acted upon by cams 696 on a clutch drum 698. This clutch drum is secured to a shaft 699 which through gears 700 and 702 drives the main cam drum 704. The cams on this drum are omitted from FIGURES 2B and 3 for the sake of clarity but are shown in detail in FIGURE 43 to which reference will be made hereafter.

A link 706 connected to a crank pin on gear 670 has its lower end connected to the gear segment 680 to impart oscillations thereto.

A pawl 710 pivoted on a pin carried by the gear segment is arranged to advance a ratchet 711 to which is secured a sprocket 712 over which there is trained the main chain 713 of the machine. The ratchet 711 and sprocket 712 are journalled on the shaft 699. It may be here noted that the gearing is such that the main chain is advanced the length of one link for every four revolutions of the needle cylinder during rotary knitting or for one complete reciprocation of the needle cylinder during reciprocatory knitting. During reciprocatory knitting the main chain advances when the cylinder is moving clockwise.

The chain 713 is provided with three kinds of links: plain links which represent idle moves, links provided with laterally extending pins 715, and links provided with radially extending lugs 714. The pins 715 are arranged to engage a follower 716 carried by a lever 717 pivoted to the frame, which lever is connected to the upwardly extending link 588 referred to previously. The lugs 714 are arranged to engage a follower 718 which is carried by a pivoted pawl guard 719, engagement between the follower 718 and the lugs 714 being under spring action.

A pawl 720 is arranged to engage teeth of a ratchet 721 which is secured to the shaft 699. The pawl 720 is pivoted to an arm 722 of gear segment 680 journalled on the shaft 708 on which there is also journalled a bell crank 723 the upwardly extending arm 724 of which is acted upon by a cam 725 secured to gear 666. To the forwardly extending arm of the bell crank 723 there is pivoted an auxiliary pawl 726 which is arranged to engage a ratchet 727 provided with only a single tooth-forming notch 728. As will appear hereafter the purpose of the auxiliary pawl is to provide a special step of the main cam drum. The auxiliary pawl 726 is held in engagement with ratchet 727 by a spring 729. The guard 719 when not lowered by lugs on the main chain is arranged to lift pawl 720 out of engagement with the teeth of ratchet 721 and also to lift the auxiliary pawl 726 away from engagement with ratchet 727. The last action is effected by its end 730 which underlies a laterally extending pin 731 which also serves as a pivot for the auxiliary pawl 726. As will hereafter appear, a low lug on the chain 713 will locate the guard 719 and its end 730 in position to prevent action of pawl 726 but permit action of pawl 720. Except for the arrangement for actuation of the operating link 588, the various devices just described for control of the main cam drum and for drive of the needle cylinder are conventional. Briefly stated, the main control of the machine is by the chain 713 the links of which are advanced without interruption as above indicated. Under control of this chain, through the pawl 720 primarily, and through the auxiliary pawl 726 for one step, the main cam drum is advanced at proper times to secure controlling actions which will be detailed hereafter. Additionally changes are controlled from rotary knitting to reciprocatory knitting and vice versa through the clutch control drum 698.

In the present machine additional controlling operations are required and for this purpose mechanism is provided across the rear of the machine.

Figure 1:
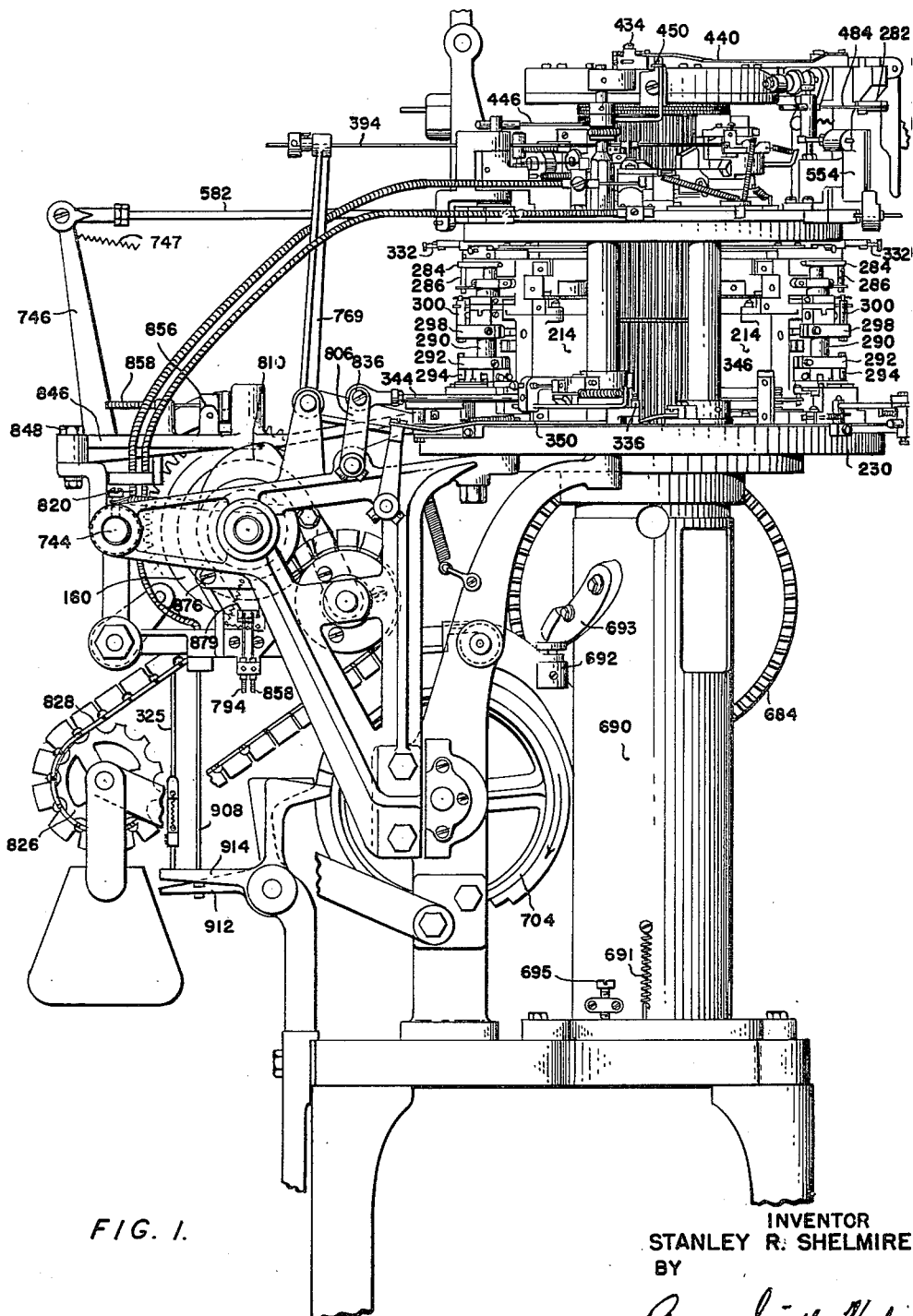
FIGURE 1 is an elevation of the left hand side of a machine constructed in accordance with the invention, various parts, particularly the yarn feeding devices being omitted.

Gear 670 meshes with a pinion 732 which in turn meshes with a gear 734 secured to a shaft 736 extending across the rear of the machine. A cam 738 is secured to shaft 736 and is provided with successive steps 738a, 738b and 738c and a fall 738d arranged to act upon a follower roller 740 carried by a lever 742 which is journalled upon a fixed transverse shaft 744. The lever 742 is provided with an upwardly extending arm 746 which, as shown in FIGURE 1, is connected to the link 582 which controls ring 580 (FIGURE 10), the lever 746 being urged forwardly by a spring 747.

Figure 7:
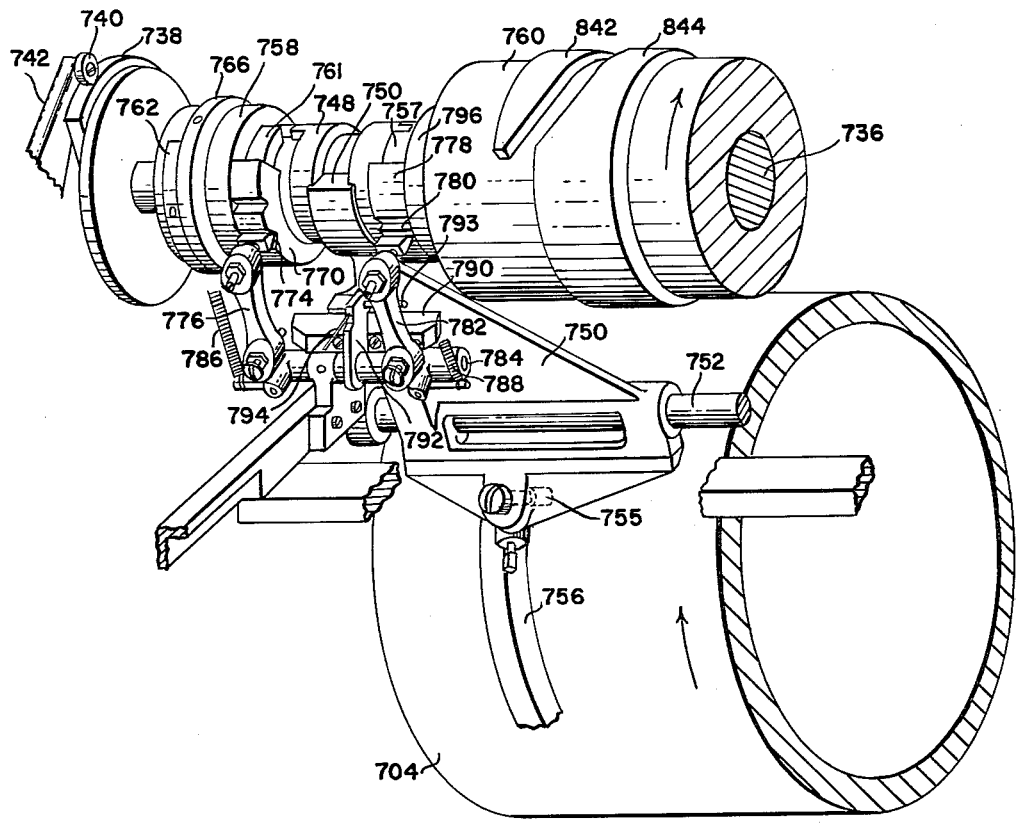
FIGURE 7 is a perspective view, partly in section, showing particularly various auxiliary drum controls.

A clutch member 748 is splined to the shaft 736 and is movable selectively to a left-hand position, a central position or a right-hand position by a slide member 750 guided on a rod 752 and provided with a follower roller 755 arranged to be acted upon by clutch controlling cams generally indicated at 756 in FIGURE 7, and detailed in FIGURE 43, these cams being carried by the main cam drum 704. In its left-hand position, as seen in FIGURE 12, the clutch member 748 engages an element 757 which is secured to a drum 760 which is journalled on the shaft 736. In its right-hand position it engages the clutch element 761 carried by a drum 758 which carries cams 762 and 766 respectively acting upon pivoted levers 764 and 768 for the control of the pull wire 394 previously described in connection with FIGURE 19 and the pull wire 395 corresponding to this on the other side of the machine. The pull wire 394 is connected to the upper end of an arm 769 which is connected to lever 764.

To the drum 758 there is secured the member 770 provided with a notch 774. Arranged to engage in this notch is the wedge-shaped end of a lever 776 which constitutes a detent. Secured to the drum 760 is a member 778 which is provided with a notch 780 arranged to be engaged by the wedge-shaped end of a second detent lever 782. The detent levers 776 and 782 are journalled upon a pin 784 and are respectively urged toward engaging positions by springs 786 and 788. A double end cam 790 carried by the member 750 is adapted to engage follower screws carried by the detent levers 776 and 782 to remove them from action. This removal occurs to free the corresponding drum 758 or 760 for rotation when the clutch is shifted. The detent lever 782 is also removable from action through the medium of an arm 792 pivoted on pin 784 and provided with a laterally extending pin 793 engageable with the detent. A Bowden wire 794 is operated from mechanism shown in FIGURES 5 and 6 for control of the arm 792.

Figure 16:
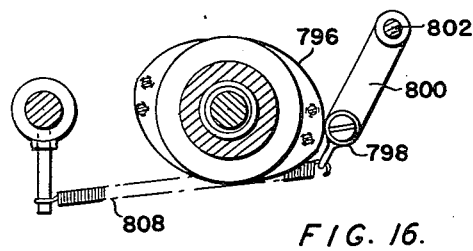
FIGURE 16 is a vertical section taken on the plane indicated at 16—16 in FIGURE 12.

Referring particularly to FIGURE 16 there is a double lobed cam 796 secured to the drum 760 and arranged to act upon the follower roller 798 carried by a lever 800 which is secured to a transverse shaft 802, engagement of the follower with the cam being maintained by a spring 808. The shaft 802 is provided with arms 804 and 806 which respectively are connected to the links 354 and 344 serving for actuation of the respective pawls 352 and 340.

Figures 13, 14:
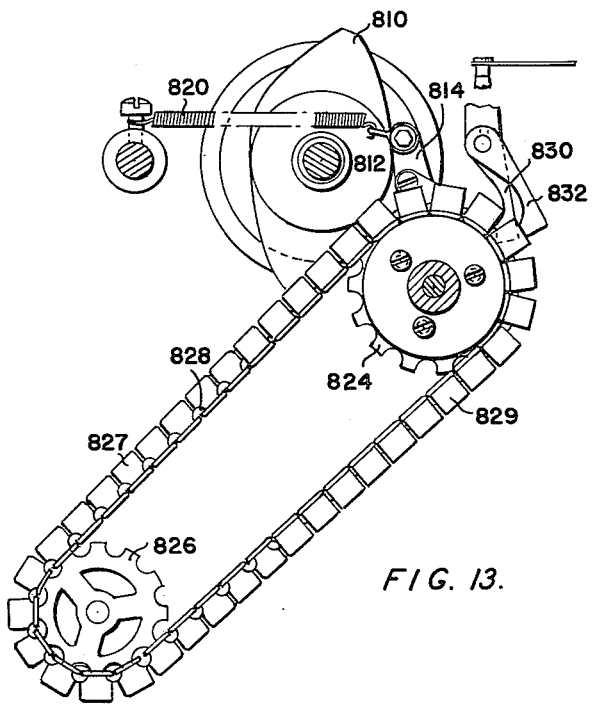
FIGURE 13 is a vertical section taken on the plane indicated at 13—13 in FIGURE 12.
FIGURE 14 is a fragmentary elevation looking at the right-hand side of FIGURE 13 and showing, in particular, an auxiliary driving chain and its followers.

A double lobed cam 810 is carried by drum 760 and is arranged to act upon the follower roller 812 of an arm 814 journalled at 818 and carrying a pawl 819 pulled into engagement with the teeth of a ratchet 822 by a spring 816, the arm 814 being held in engagement with the cam 810 by a spring 820. Inasmuch as the shaft 736 makes one revolution for each four revolutions or for each complete reciprocation of the needle cylinder, it will be evident that the ratchet 822 will be advanced on each stroke of the needle cylinder, i.e. twice during each complete reciprocation, whenever drum 760 is rotating. The ratchet 822 is secured adjustably to a sprocket 824, over which and an idle sprocket 826 there passes a chain 828 half the links of which carry lugs 827 on one side and half the links of which carry lugs 829 on the other side. As will be noted from FIGURE 13 the lugs 827 and 829 complement each other so that during a complete cycle of the chain the followers 830 and 832 are alternately raised, one for each half cycle. The followers 830 and 832 are carried by rock shafts 834 and 836, respectively, to which in turn are secured arms 838 and 840 respectively operating the links 360 and 350 which control the pawl guards 356 and 348. The result is that during one half cycle of the chain 828 the ring gear 228 is advanced step by step in one direction and then during the other half cycle step by step in the opposite direction.

The drum 760 carries a pair of cam members 842 and 844 which define a race engageable with a pin 852 to produce oscillations of lever 846 pivoted at 848 and connected at 850 to the ring 268. The cam race is shaped to impart steps of movement to the ring as hereafter described through the pin 852 which is mounted for vertical sliding movement in the lever 846, being urged downwardly by a spring 854. The pin 852 is movable upwardly against the action of the spring to disengage it from the cam race by a lever 856 which is controlled through a Bowden wire 858. When lever 856 is rocked to release the pin 852 from the cam race it enters a slot 855 in a fixed member 857 to lock the lever 846 in a central idle position.

In order to provide for retiming of the pattern mechanism there is provided the arrangement particularly illustrated in FIGURES 5 and 6. A horizontal lever having arms 860 and 862 is pivoted at 861 and concentrically there is pivoted vertical arm 864 which is connected to the arm 862 by a spring 863, the arm 864 being drawn by the spring to a position relative to arm 862 determined by an adjustable stop screw 865. A pull wire 866 connected to arm 862 and controlled from the main cam drum serves to pull arm 862 downwardly at proper times and with it, yieldingly, the arm 864 through the action of spring 863, and at the same time arm 860 rises and pulls upwardly the Bowden wires 794 and 858 heretofore referred to.

A latch 868 is pivoted at 870 to the frame and is provided with a ledge 872 underlying the arm 860. The latch 868 is urged into engaging position by a spring 874. Pivoted to the frame at 876 is a lever 878 which is urged downwardly by a spring 879. A slot 880 in the lever 878 embraces the fixed pivot pin 870 for the latch 868. The end of lever 878 is provided with a follower 882 which is engageable to be lifted by a side lug 884 carried by one link of the chain 828. The latch 868 is provided with an arm 886 in which there is slidably mounted a bar 888 carrying a laterally projecting pin 890 which extends rearwardly, as viewed in FIGURE 5, and engages within an arcuate slot 892 formed in the lever 878. The arrangement is such that as the lever 878 is rocked by the action of side lug 884 of the chain the bar 888 will be moved upwardly into position to be engaged by a lug 894 carried by a clutch member 897 which is splined to shaft 736 and is arranged to be shifted by pins 896 of the arm 864 to be selectively engaged or disengaged from the clutch element 898 secured to the drum 760.

The mechanism just described has the following operation:

During operation of the drum 760 to oscillate the lever 846 the clutch 897, 898 is disengaged, there being no pull exerted on the wire 866. Under these conditions the arm 860 occupies a lowered position below the shoulder 872 of latch 868 which is held by it in a counterclockwise position as viewed in FIGURE 5. At this time detent lever 782 is held in its inactive position by cam 790 and Bowden wires 794 and 858 are both in released condition, the latter permitting pin 852 to engage in the cam race on drum 760. Bar 888 is, under these conditions, rocked downwardly and towards the left as viewed in FIGURE 5 so that even if it is raised by engagement of lug 884 with follower 882 of lever 878 it will not be engaged by lug 894. When patterning is to end just prior to disengagement of clutch 748 from member 757 of drum 760, a pull is exerted from the main cam drum on wire 866, rocking lever 862 downwardly and the arm 860 upwardly and with them under the yielding action of spring 863, the arm 864. The clutch 897, 898 is engaged as soon as the notch in 898 is in position to be entered by the tooth on 897. As arm 860 rises, pulls are exerted on Bowden wires 794 and 858. The former through lever 792 and pin 793 retains the detent lever 782 in its inactive position. The latter disengaged pin 852 from the cam race. As arm 860 rises the latch shoulder 872 will move below it so that the parts assume the position illustrated in FIGURE 5. Bar 888 is thus rocked clockwise into position such that, when later raised, it will be engaged by lug 894. Wire 866 is then released, but because of the latching action the clutch will remain engaged and the pulls will remain on Bowden wires 794 and 858.

When this action occurs the lug 884 will not be beneath the follower 882. Rotation of drum 760 will then continue with concurrent rotation of cams 810 and 796 to continue the advance of the chain 828 and also to continue the advance of ring gear 228. The result is continued advance of the pattern mechanism driven through clutch 897 even though clutch 748 is disengaged. When lug 884 passes beneath follower 882 bar 888 is raised. No further action occurs however until lug 894 engages bar 888 rocking the latch 868 from beneath arm 860. When this occurs the clutch 897, 898 is disengaged and simultaneously the detent 782 engages the notch 780 to arrest the drum 760 in a predetermined position in which the cam race is directly below the pin 852. This pin is also released and drops into the race. The parts are thus brought to an initial position with the patterning mechanism brought to a retimed condition for subsequent operation.

Figure 42:
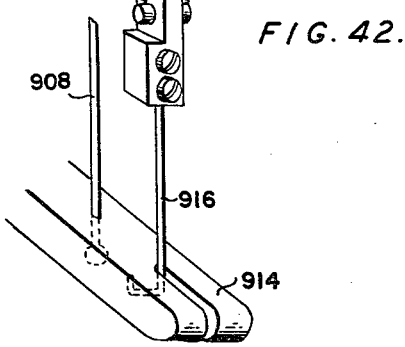
FIGURE 42 is a perspective view showing a yielding control arrangement.

Referring now particularly to FIGURES 12 and 42, there has been described the lever 321 operated by a Bowden wire 325. At the other feeds there are similar arrangements comprising the Bowden wire 900, controlling lever 902, Bowden wire 904 controlling lever 906 and Bowden wire 908 controlling lever 910. These Bowden wires have special controlling means illustrated in FIGURE 42 as applied to the Bowden wires 908 and 325. A follower 914 acted upon by cams on the main cam drum is connected directly to Bowden wire 908 to provide for its positive actuation but is connected only through a yielding arrangement to Bowden wire 325. For control of the latter the follower 914 is connected to a wire 916 which is secured in a block 918. A clip 920 embraces the upper end of this block which is provided with an elongated slot 922 for the reception of a pin 924 secured in the clip. A pair of springs 926 react between the clip and the block to pull the clip downwardly relatively to the block. The Bowden wire 325 is connected to the clip 920. As will be evident the arrangement is such that a positive pull is imparted to Bowden wire 908 but only a yielding pull is applied to Bowden wire 325. A similar arrangement which is not illustrated in detail but is indicated in FIGURE 1 connects a follower 912 similar to follower 914 to Bowden wires 900 and 904, the former being positively pulled while the latter is yieldingly pulled upon operation of the follower 912.

Referring to FIGURE 12 a bell crank 928 acted upon by a Bowden wire 930, controlled from the main cam drum, and by a spring 932, is provided for the operation of cam 176.

A lever 934 operated by Bowden wire 938 from the main cam drum and by a spring 936 controls cam 159.

Reference will now be made to FIGURE 43 which shows the cams on the main cam drum in developed condition. To facilitate understanding of this development the cams which have radial action, i.e. acting on followers such as 912 and 914 in FIGURE 1 are shown, in effect, laid on their sides in the circumferential and axial positions which they occupy. Rotation is in the direction of the arrow at the top of this figure. The numerals across the top of the figure represent drum positions 1 to 16, inclusive, and consistently with the positions of the cam followers, as will be described, it may be considered that there are shown in FIGURE 43 the conditions existing prior to step number 1 of the cam drum 704. The rows of cams on the cam drum may be described as follows:

The follower 693a is acted upon by a cam 940 for control of the stitch formation during the knitting of the foot of a stocking. This end is accomplished by change of height of the needle cylinder and is generally referred to as stitch tensioning. Follower 693b is controlled by a cam 942 for adjustment of the stitch tension during the knitting of the stocking top. Cams 944 and 946 act on follower 693c for controlling stitch tension during the formation of the heel, advance toe, toe and loopers rounds.

It will be noted from FIGURE 43 that the followers 693a, 693b and 693c are shown in a position corresponding to step 9, but this is because they are on the opposite side of the cam drum from the principal followers. The position relative to their cams which is illustrated is that preceding what will be designated step number 1 of the drum.

Cam members 756 previously mentioned define a race which has the component portions 948, 950, 952, 954 and 956 in which there extends the roller 755 (FIGURE 7). This roller is also somewhat displaced from the circumferential position of the lever followers. All of the lever followers such as 912 and 914 of FIGURE 1 occupy the same circumferential position which is indicated at 958 in FIGURE 43. All of the remaining cams to be described act on such followers. Step number 1 of the main cam drum corresponds to a single step movement to the right from the position illustrated in FIGURE 43.

The cams or steps 960, 962, 964 and 966 control the Bowden wires 408 and 408' (see FIGURES 10 and 19). The high cam portions 960 and 964 result in movements of full extent of cam levers 404 and 404' serving not only to push the switch cams 64 and 62 inwardly but also to engage the follower screws exemplified by 414 to effect downward movement of the lowering pickers 72 and 74. The lower step portions 962 and 966 of these cams release the pickers but hold the switch cams 64 and 62 in inner positions.

The next cams 968 and 970 control the clearing cam 50.

The next row of cams or steps comprising 972, 974, 976, 978, 980, 982 and 986 control the clearing cam 44. The steps are provided as will be described hereafter for the purpose of securing proper action of this cam, it being understood that, as in the case of all the radially movable needle cams, the cams are pushed inwardly by the usual spring arrangement and are pulled outwardly by the cams on the main cam drum. The section of the cam indicated at 976 may be removed if it is desired to knit the top using feed number 1.

The cams of the next row, namely, 988, 990, 992 and 994 control the pickers 68 and 70, the steps being provided to effect single or double needle picking as previously indicated.

The cam 996 of the next row controls the cam 159.

The cams or steps of the next row 1000, 1002, 1004, 1006, 1008 and 1010 control the follower 912 which has actions similar to those later described for the follower 914 of FIGURE 42. The cam and step indicated in construction lines at 1004 and 1006 are used only if it is desired to knit the top using feed number 2, as will hereafter appear.

The long cam 1012 controls the Bowden wire 484 (FIGURE 10) which removes from action the stop screws 464 and 466 for the sinker cam ring.

The cams or steps 1014, 1016, 1018 and 1020 control the lever 914 (FIGURE 42).

Cams or steps 1022, 1024, 1026, 1028 and 1030 control clearing cam 56.

The next cam 1034 controls cam 176.

The next cam 1036 controls the latch openers 428 and 430.

Cams 1038 and 1040 control radial movements of stitch cam 60.

Cam 1042 controls lever 862 (FIGURE 6) through wire 866.

FIGURE 45 shows a typical setup of jack butts as viewed from the inside of the cylinder looking outwardly so that clockwise rotation in the case of this setup would be toward the right as indicated by the arrow at the top of FIGURE 45. The presence of butts is indicated by shading and hereafter particular reference will be made to a jack designated J the butts of which are shown in black. The various butts are indicated by the same reference characters as in FIGURE 44 and, in particular, four levels 6, 7, 16 and 17 are indicated for the butts 22. These particular levels will be discussed hereafter.

The association of the jacks with long and short butt needles is indicated. From this it will be noted that the ends of the figure correspond to the center of the front of a stocking, knit on short butt needles, while the center of the figure represents the center of the back of a stocking. In the several regions delimited by vertical lines there are the notations "Knit at feed 4 or 1", etc. These notations relate to the production of leg patterns as will hereafter appear.

It will be noted that all butts are present at the level 14. Additionally all of the jacks have butts 24 though these are not indicated in FIGURE 45.

Referring now to FIGURES 46 to 49, inclusive, these show the yarn controlling trick wheel setups at the respective feeds as indicated at the tops of these figures. The four yarn fingers at each feed are numbered and it will be understood that these fingers carry inelastic yarn except in the case of feed number 4 where the fourth finger carries elastic yarn as already described. In the case of production of the stocking which will be detailed hereafter, the third and fourth fingers at feed number 3 are not used. The diagrams show the setups of the butts 536 and 626 and of the particular butts 606 and 622 at the fourth feed. The position of the half length butt 606′ is indicated in FIGURE 49. At the left-hand sides of the figures there are indicated by numerals the steps of the trick wheels which are active (rather than the steps of the ratchets which are engaged by the driving pawls). It will be noted that each step of the trick wheel involves three rows of butts. As will appear in a description of the yarn change sequence each step of a trick wheel involves three successive operations defined by these rows of butts.

The chart constituting FIGURE 50 shows numbers of links, types of links, main drum moves, trick wheel moves, the active yarn fingers at the various feeds put into operation by these moves, and the salient events which result. It will be understood, since only one yarn at any feed is feeding at the same time, that the entry of yarn fingers involves coincidentally the removal of the yarn finger previously in action. Plain links of the pattern chain having no lugs are indicated by O. Links which have pins 715 to initiate yarn changes are indicated by P. Links which carry lugs 714 to start the main drum rack are designated L. One of the links is indicated as having a low lug and the purpose of this will become apparent hereafter. Rubber yarn fed from number 4 finger at feed number 4 is specially indicated by R. Drum moves are numbered to correspond with the numbers in FIGURE 43 while trick wheel moves are numbered to correspond with FIGURES 46 to 49 inclusive. The absence of a yarn finger in active position at any feed is indicated by zero.

Where the finger numbers in FIGURE 50 are enclosed in parentheses there is indicated the fact that while the fingers are in active position the yarns fed thereby are not being knitted.

FIGURE 51 indicates a stocking knit on the described mechine consistently with the setups of elements previously described and the operation which follows. This stocking comprises the makeup course m, the elastic top e, the leg l, the heel h, the foot f, the ring toe r, the toe t and the loopers rounds or waste courses w. The yarns and feeds used in the formation of the various portions of this stocking are indicated in the figure, the number of the feed being first given then the number of the finger. The dotted lead lines indicate the feeds and fingers which are used for the formation of the side diamonds on the opposite side of the stocking from that illustrated.

Before discussing the cycle of operation involved in the formation of a stocking a typical yarn changing sequence may be described as it takes place for the change of one inelastic yarn for another. For consistency of description it will be assumed that the yarn change occurs at feed number 4 corresponding to step number 7 of the trick wheel which, as will appear from FIGURE 49, involves the substitution of the yarn from finger number 1 for that previously running from finger number 2.

Figure 22:
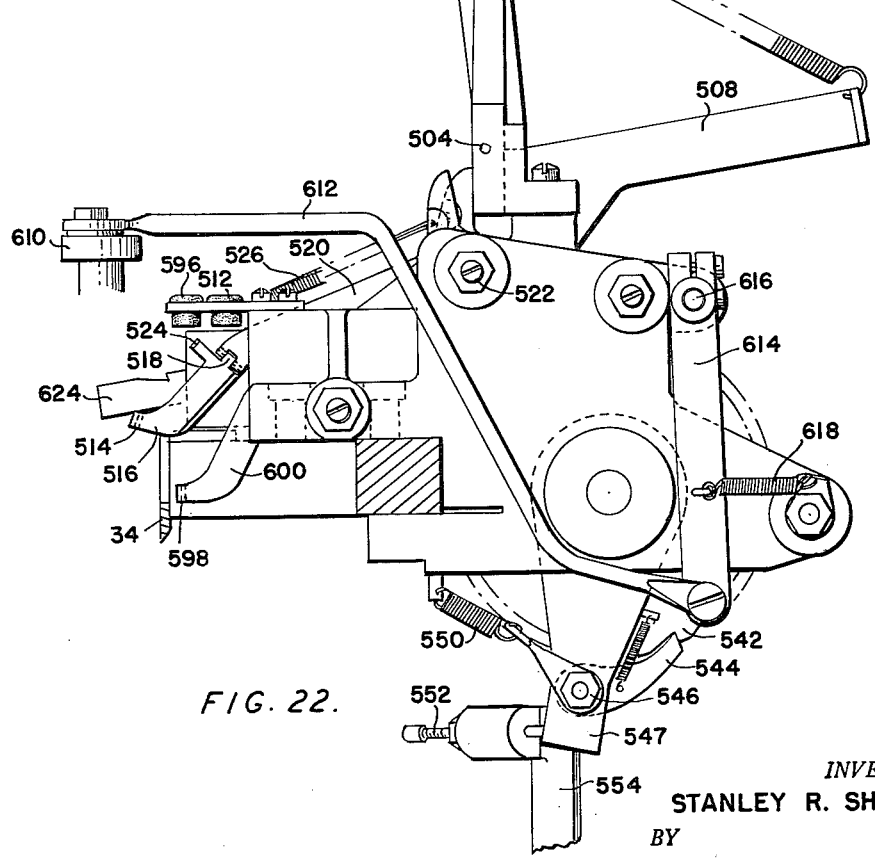
FIGURE 22 is an elevation looking at the left-hand sides of FIGURES 20 and 21, with the latch ring shown in section.

Referring particularly to FIGURES 1, 3, 4, 10, 12 and 20 to 29 inclusive, it may be first noted that during reciprocatory knitting the main chain 713 advances while the needle cylinder is moving in a clockwise direction. As a chain pin 715 moves under and lifts lever 717 through pin 716, rod 588 is correspondingly raised, lowering the latch 586. As will appear from the reference to the restoration of parts hereafter, the lug 584 will have been positioned counterclockwise from the position shown in FIGURE 10 beyond the latch 586. During previous operation, therefore, the roller 740 following the cam 738 will have engaged only the high step 738c, with the result that the lug 584 will oscillate from a position in engagement with latch 586 to a position just slightly counterclockwise of this latch, the roller being thus held from moving inwardly substantially beyond the outermost portion of step 738c of the cam. The timing of the pattern chain advance relative to the timing of cam 738 is such that as the latch 586 is lowered to release the lug 584 the roller 740 is on the surface 738c of the cam. As the drum then revolves, and the roller 740 moves down the slope 738d of the cam the ring 580 will move clockwise as viewed in FIGURE 10 under the action of spring 747 and link 582. Referring to FIGURES 10 and 22 it will be evident that this movement releasing follower screw 570 from the cam steps 578, 576 and 574 of cam 572 will result in retraction of pawl 544 in a clockwise direction as viewed in FIGURE 22 to bring it into position to engage a next following tooth of the ratchet 542. What has just been described takes place during a clockwise stroke of the needle cylinder. As the cam 738 continues to rotate, the needle cylinder reverses its direction so that when cam step 738a moves roller 740 to begin the yarn change the cylinder is travelling in a counterclockwise direction.

When cam surface 738a moves under roller 740, the ring 580 is moved far enough to cause surface 574 of cam 572 to pass under the follower screw 570 which in turn causes screw 552 to engage and move arm 547 and its pawl 544 a distance sufficient to advance the trick wheel 540 through the spacing of one trick, i.e. one-third of the total step involved in effecting the complete change.

Prior to the occurrence of this step, yarn was feeding only from finger number 2, and this yarn continues to feed after this first step occurs. On the occurrence of this first step a trick butt will pass from under the follower of finger lever number 1 and through the action of a spring 526 finger number 1 will be lowered into yarn feeding position.

Yarns from both fingers number 1 and number 2 will now be taken and knit by the needles elevated at this feed number 4, which needles during patterning may be only two alternate needles as will appear hereafter in discussion of the yarn changes occurring at the end of one diamond and the beginning of the next.

The length of the cam surface 738a determines the distance the needles travel before the yarn fed from finger number 2 is taken out of action by the raising of its finger.

When cam surface 738b further lifts roller 740, cam surface 576 will engage screw 570 to give a further advance to pawl 544 which still engages the same tooth. The trickwheel thus advances a second step and a trick butt 536 passes under the follower of a lever 532 to lift finger number 2. At the same time a butt 626 passes under the follower of lever 624 which, as it rises, contacts screw 626 (FIGURE 27) and through lever 628 and link 634 opens the clamp and cutter. During the travel of the needles to which the yarn has been presented the end of the newly introduced yarn, which has been held by the clamp, is drawn free and the yarn being taken out of action passes into the open clamp and cutter. The clamping and cutting operations will be shortly described in greater detail.

The length of cam surface 738b is sufficient to permit the needles to which the old yarn is connected to travel far enough to safely draw the yarn into the open clamp and cutter and when cam surface 738c further lifts roller 740 the final move of the trick wheel is taken to move butt 626 from under the follower of lever 624 permitting the lever to drop under the action of spring 632.

At this time ring 580 has completed its cycle and has moved in a counterclockwise direction sufficiently far that, as seen in FIGURE 10, screw 570 is resting on surface 578 of cam 572 and the trailing edge of lug 584 has passed beyond the latch 586 which is still lowered. As pin 715 of the chain passes from under the pin 716 of arm 717 the latch 586 will be released and moved into position to hold the lug and its ring 580 against the action of spring 747 as cam surface 738c moves from under roller 740.

The trickwheel pawl 544 will accordingly remain in its advanced position until another chain link pin 715 moves into position to release the ring 580 with the result, described above, that the pawl under the action of spring 550 may be withdrawn to engage the next tooth of the trick wheel ratchet.

Considering the clamping and cutting actions, when a yarn is out of action its end is held between clamp 644 and the base 646 by the action of spring 643. For better clamping action the clamp and base have the matching longitudinal flutes 649 and the extension 635 on the lower end of link 634 rests on the clamp as previously described.

The yarn extends from the clamp to the yarn finger, and when it is lowered into action the yarn is laid over the guide wire 660. After the needles have seized the yarn and knit it, it is carried in a counterclockwise direction and slides on the guide wire 660 beneath the same to a point near where the guide enters the base 646, and as the needles continue to move the yarn passes under the edge 647 withdrawing the free end of the yarn approximately at a right angle to the clamp, which is desirable to prevent other inactive yarns from being swept out of the clamp.

When a yarn is taken out of action its finger is raised as is the lever 628 and link 634 which, due to the linkage, swings trapper 636 upwards and opens shear blade 652. In this case the yarn extending from the needles to the finger is carried also in a counterclockwise direction but, since its finger is raised, it is guided into the clamp by surface 638 of trapper 636 and passes over the bevel 647 and between shear blades 652 and 650. The abutment 662 prevents the yarn from being drawn back into the V of the shears so that scraping off of excessive lint may be avoided.

When lever 628 is released spring 632 through link 634 causes trapper 636 to swing inwardly and hook edge 642 engages the yarn which is above the end of guide 660 and moves it safely back into the clamp. Due to the arrangement of the linkage the trapper 636 swings inwardly before the pin in link 634, due to lost motion provided by slot 654, causes shear blade 652 to cut the yarn. At the end of the operation the extension 635 of link 634 will be again resting on clamp 644 to hold the yarns securely in the clamp.

Since leg pattern knitting takes place while the needle is reciprocating each yarn when in action must be under control of a takeup sweep to retrieve the slack produced between reversal of the needle cylinder and beginning of knitting in each direction. The paths of the yarns have already been described. When a yarn is out of action the sweep should also be inactive since the continual pull of the spring might draw the yarn from the clamp and, therefore, when the yarn finger is raised the projection 528 engages the extension 529 of its sweep moving the sweep to, and holding it in, an upright inactive position. Under normal conditions the sweep is nearly upright when the finger rises and projection 528 moves it only slightly. However the main takeup sweep 502 does normally receive a slight movement from the finger when it rises which would cause slack in the yarn at the time when it was being guided into the clamp and cutter and might allow the yarn to get out of control. The auxiliary sweep 490, under the action of spring 492, is ready at all times to take up any small amount of slack which may develop.

The foregoing indicates the fashion in which the inelastic yarns are handled. The special handling of the rubber will be described in connection with the overall operation.

The operation of the machine through the cycle of knitting a stocking will now be described. There should be borne in mind the fact that, as the chain pawl advances, the drum pawl is withdrawing. The advance of the chain pawl 710 occurs during reciprocatory knitting when the needle cylinder is travelling clockwise. The movement of the main cam drum 704 then occurs during the next counterclockwise stroke of the cylinder if the guard 719 has been lowered by a lug 714 during advance of the chain. In the present machine all movements controlled by the main drum occur while the cylinder travels in the counterclockwise direction which is the direction of its movement in rotary knitting, the only exception being in the case of movement by the auxiliary racking pawl 726 referred to hereafter.

Reference may now be made particularly to FIGURES 43 to 51 inclusive. At the start of the cycle which will be considered as the time preceding the first step of the main cam drum the following conditions exist:

All yarn fingers are out of action, and, with exception of the elastic yarn in finger 38, their yarns have been cut and are held in their associated clamps. Since when the elastic yarn is out of action it trails down inside of the needle cylinder to the previously knit stocking, it leads from the finger over the guard 608 (FIGURE 20) and to permit its seizure by the needles, the guard has now been moved clockwise by the action of trick butts 622. The cylinder is rotating.

Follower 693b is on cam 942 setting the cylinder for proper stitch control for the top.

Follower roller 755 is in its mid position so that clutch elements 761 and 796 are disengaged by the clutch member 748. Drums 758 and 760 and the parts which they carry are consequently stationary. Shaft 736, however, is rotating so that cam 738 is ready to provide a yarn change.

Follower 882 is held up by lug 884 on auxiliary chain 828. Lever 862 is released, clutch 897, 898 is disengaged, pin 852 is in the race of cams 842 and 844, and detent 782 is released. Detent 776 is also released to hold the drum 758.

The retiming of the pattern mechanism will have located the reading cams in their uppermost positions. They will at this time be inactive.

Switch cams 62 and 64 will be out in inactive position and will be raised. Clearing cam 50 will be out of action. Clearing cam 44 will be in active position at this time.

Pickers 68 and 70 will be in their raised inactive positions. Cam 159 is out of action. Followers 912 and 914 are both released so that the lower blanking cams are in action and cam 296 holds the upper blanking cams in action.

The sinker cam stop screws 464 and 466 are out of position to engage the screws 460 and 462.

Clearing cam 56 is out of action.

Makeup cam 176 is in action due to cam 1034 on the main cam drum.

The latch openers 428 and 430 are in their active positions under the action of cam 1036.

Stitch cam 60 is in action.

Ring 268 being in its mid position, all of the blanking cams are in active positions and it will therefore be seen that the needles pass through the cams at their lowest positions, passing below all of the stitch cams.

The main cam drum now receives its first step to makeup position and the yarn controlling trick wheels are advanced through their first steps causing fingers numbered 1 at feeds numbers 1, 2, and 3 to be lowered and finger number 4 carrying the elastic yarn at feed number 4 is lowered and its hook 608 returned to the position shown in FIGURES 8 and 20. As will appear while the yarns at feeds numbers 1 and 2 are lowered, these yarns are not taken by the needles which fail to rise at these feeds.

The first step of the main cam drum gives rise to the following conditions:

Clearing cams 50 and 44 remain out of action, as do also the pickers 68 and 70. Cam 159 remains out of action.

Assuming that inelastic yarn is to be fed only at feed number 3, consistently with the assumed stocking being knitted, cam 1004 will be absent and consequently blanking cam 178 will remain active, blanking cam 180 also remaining in active position but having no function. However, due to the action of cam 1014 blanking cams 182 and 184 will be out of action. Cam 176 will therefore be effective for control preceding cam 124.

Clearing cam 56 is moved into action in steps, the step 1024 causing it to move in as short butts are passing, so that it will engage long butts, and it is then dropped in all the way at the end of the drum stroke while long butts are passing so that it will thereafter engage short butts. The latch openers still remain active.

Cam 60 which was in active position is now withdrawn in steps, the first step, controlled by cam 1038, taking place at the beginning of the drum move. This withdraws cam 60 so that it will miss short butts but engage long butts. At the end of the drum move it is fully withdrawn to miss both long and short butts.

Due to the above the makeup occurs as follows:

As short butt needles are passing the positions of cams 60 and 176, these needles riding low as previously indicated, cam 60 is first moved out to miss short butts and immediately thereafter blanking cam 182 is removed, along with blanking cam 184, the removal of which is only for clearance. As soon as cam 182 is removed, cam 176 effects selection of alternate needles by reason of the butt series at 20'. Those jacks which have butts 20' are pressed inwardly and pass cam 124 without rising. However, those jacks from which butts 20' are missing will engage cam 124 and will rise thereover, lifting their intermediate jacks for rise over cam 84, and causing the corresponding needles to rise to a level at which they could be engaged by cam 60. However, as just noted, cam 60 has been withdrawn to miss short butts and consequently the selected short butt needles will miss this cam, engaging cam 61 and rising to tuck height, being thereafter depressed by stitch cam 58. They will then pass cam 56 which will still be out sufficiently far to miss short butts. While the rubber finger 38 is lowered, the rise of the needles over cam 61 is not sufficient to cause them to seize the rubber.

The first long butt needle associated with a jack from which butt 20' is missing will be similarly raised by the actions of cams 124 and 84 but since cam 60 is sufficiently inwardly to engage long butts this needle and the following alternate long butt needles will rise upwardly over cam 60 and will then be depressed by cam 58, the rise of the needles being sufficient to cause them to seize the rubber yarn. Complete withdrawal of cam 60 takes place only after long butts have passed it, during the subsequent passage of short butts. When the long butt needles which have seized the rubber yarn reach cam 56 they will rise thereover along with the long butt needles which have not taken the rubber yarn, since cam 56 is at this time sufficiently far inwardly to engage long butts but miss short butts. During the passage of the long butt needles this cam moves fully inwardly so as to engage short butt needles following the long butt needles. The result is that the long butt needles take yarn at feed number 3 and draw stitches under the action of stitch cam 52.

The short butt needles following the long butt needles which have taken the rubber yarn at feed number 4 will undergo alternate selection by the action of cam 176 and those which are selected for upward movement will be raised by their intermediate jacks under the action of cam 84 but will then rise only to tuck height under the action of cam 61. The rubber yarn having been initially seized, the rise to tuck height is sufficient to cause the selected needles to take the yarn in passing down cam 58. Before the long butt needles again reach the position of cam 60 this cam will have fully withdrawn so that the alternate long butt needles have the same action as just described for the short butt needles.

The results of the foregoing may be summarized as follows:

Alternate long butt needles are raised over cam 60 to take the rubber yarn, while alternate short butt needles and alternate long butt needles in subsequent passages rise over cam 61 to take the rubber yarn. The latches of these needles are cleared by cam 56, over which all needles then rise to take the inelastic yarn at feed number 3, drawing stitches by passing under cam 52 whereupon they remain at low lever until selection again takes place due to the action of cam 176, alternate needles being raised by reason of its actions while intermediate needles remain low until they again engage cam 56. The result is knitting by all of the needles of yarn at feed number 3 while the rubber yarn is interlaced on alternate needles. This action continues throughout the formation of the top.

The next two moves of the main cam drum are essentially idle ones except that in move number 2 the latch openers are removed from active position, being no longer necessary since all needles now carry yarn.

The next, fourth, move of the main cam drum effects transition to knitting of the leg. The clutch drum initiates a reciprocatory phase of the machine. The following events occur in the counterclockwise movement of the cylinder preceding the first reverse stroke.

Follower 693b drops off cam 942 to provide normal leg tension. Clutch controlling roller 755 moves into race 950 which results in disengagement of detent 782 from notch 780 and engagement of clutch member 748 with the element 757 secured to drum 760, which drum accordingly starts revolving to impart movements to ring 268. Cams 50 and 44 and pickers 68 and 70 remain out of action.

Sinker cam ring stop screws 464 and 466 are permitted to move into stopping position to limit movements of the sinker cam ring for the purpose of causing loops to be drawn in back of sinker nebs rather than in front of them over the usual sinker platform. This results in positioning of the stitches along the junctions of the differently colored areas in well defined diagonal lines, avoiding pairing of stitches of the same color, formed in consecutive courses, side by side. The last condition gives an irregular boundary of objectionable appearance.

The step of cam 1016 permits a partial movement of follower 914 which allows Bowden wire 908 (FIGURES 12 and 42) to move sufficiently to permit spring 911 to swing lever 910 so that through spring 324 a cam, similar to 318 (FIGURE 38) but having a reverse action, slides into active position, thereby moving blanking cam 182 into operation. While the movement of follower 914 is sufficient to permit Bowden wire 908 to cause blanking cam 182 to become active, the corresponding movement of wire 916 does not permit movement of Bowden wire 325 since the loaded tension of springs 926 is sufficient to overcome spring 319 and associated spring 324, thus preventing introduction of blanking cam 184. As the drum continues its present movement, follower 914 drops from the stop 1016 which permits springs 926 to move pin 924 to the bottom of slot 922 nullifying the action of the springs, and Bowden wire 325 is permitted to move under the action of spring 319 as it swings lever 321 to allow cam 318 to slide into position (clockwise as viewed in FIGURE 38) and move blanking cam 184 into action. The reason for delaying the action of blanking cam 184 in respect to blanking cam 182 is due to the fact that butts 24 of jacks 10 are moving over cam 124 from the right, as seen in FIGURE 44, and blanking cam 184 must not move in until, through the action of blanking cam 182, all jacks have been cleared from cam 124, since otherwise a jack being lowered by cam 88 would be wedged on top of cam 184. During patterning, the four sliding cams 318 are completely under control of ring 268 which will oscillate in timed relation with reciprocating strokes of the needle cylinder, reaching its mid position prior to the end of each cylinder stroke and continuing its movement as the cylinder reverses its direction. The action of follower 914, just described, will be repeated later, as will similar actions of follower 912 to introduce blanking cams 178 and 180. At all such times the needle cylinder will be traveling in a counterclockwise direction and ring 268 will be stationary and in its mid position.

Clearing cam 56 is removed from action in steps, first being moved outwardly to miss short butts during the passage of long butts and then moving fully outwardly during the passage of short butts. The result, it may be noted, is to leave clearing of needles solely to the selection of the pattern devices, all three cams 44, 50 and 56 being now out of action. Cam 176 is moved out of action by the termination of extent of cam 1034. Stitch cam 60 is dropped into action so that it will be in position to engage needles to cause them to draw stitches during reciprocatory reverse strokes of the needle cylinder.

At the end of the last counterclockwise movement preceding the first reverse stroke, since cam 56 is out, all of the needles will be in low position. Step number 3 of the trickwheels does not effect any action at feeds numbers 1, 2 and 3 but at feed number 4 actions take place to remove the rubber yarn and insert the inelastic yarn from finger number 3. It will be noted from FIGURE 49 that no clamping and cutting action takes place in this step. The finger is taken out in two steps, it being raised partway by the half length butt 696' in the second step of the third trick wheel movement and then all the way by the full length butt in the third step of this movement. The partial rise initially of the rubber finger is to insure that it passes beneath the plate of the clamp and cutter. The rubber guard 608 is swung outwardly by the action of the butts 622 at the beginning of trickwheel step 3 and is not restored until the beginning of trick wheel step 4 when it engages the rubber yarn to carry it inwardly, the rubber yarn passing it as it is withdrawn on the first reverse stroke and being engaged and swept inwardly by it on the next forward (counterclockwise) stroke.

In the last counterclockwise movement before the first clockwise stroke the yarns at feeds numbers 1 and 2 are not taken by the needles but are first taken during the first pattern stroke in reverse direction. Introduction of the yarn at the end of trick wheel movement number 3 from finger number 3 at feed number 4 is to prevent a streak of diamond color at the top of the stocking. As will be evident from FIGURE 49 on the fourth move of the trick wheels this yarn is replaced by a yarn from finger number 2 at feed number 4, which last yarn knits the front upper diamond of the stocking. The yarn from the third finger at feed number 4 is the same color as the yarn carried by number 1 finger of feed number 3.

The yarns at feeds number 1 and number 2 are first taken during the reverse stroke following step number 3 of the trick wheel. These yarns are taken due to the action of the pattern mechanism in the fashion which will hereafter be described. These yarns are pulled out of their respective clamps and cutters in reverse direction. From this point on yarn changes take place in accordance with the description previously given.

The fourth trick wheel move takes place after the first complete reciprocation, and as will be clear from FIGURES 46 to 49, yarn changes are made to provide at feeds numbers 2 and 4 the yarns for the formation respectively of the upper rear and front diamonds. The yarns at feeds numbers 1 and 3 are already those which are proper for the formation of the uppermost side half diamonds.

Movements of the ring 268 are now imparted by the cam arrangement on the drum 760, the ring 268 occupying an extreme counterclockwise position during counterclockwise movements of the needle cylinder and an extreme clockwise position during clockwise movements, the ring being restored momentarily to its mid-position at the ends of each of the needle cylinder strokes.

Stepping of ring gear 228 now takes place first for a series of steps in one direction and then for a series of steps in the opposite direction, the directions of step movements being controlled from the auxiliary chain 828 through the pawl guards 348 and 356 which are alternately active. In the beginning of the patterning the reading cams will be in their uppermost position and will move downwardly step by step and then again upwardly, occupying the extreme upper and lower positions only during single strokes.

The patterning takes place during the drum positions attained by move 4 and idle moves 5 and 6. During the patterning the trick wheels have their moves 3 to 10 inclusive. The yarn changes will be clear from FIGURES 46 to 50 inclusive and with reference to FIGURE 51.

The formation of the solid figure patterns may now be described with particular reference to FIGURES 44 and 45. During this figure formation cams 44, 50 and 56 are withdrawn and cams 62 and 64 are inactive. The upper blanking cams 160, 162, 164 and 166 and the lower blanking cams 178, 180, 182 and 184 will be momentarily located in active position at the ends of the needle cylinder strokes but will be inactive during the operating portions of the strokes.

Cams 144, 146, 148 and 150 which act upon the upper butts 18 of the jacks are active at all times and take part in the figure formation. Cam 176 is now inactive, this being the cam which operates on the lowermost butts 20' of the jacks in the makeup operations.

Of the upper key cams, cams 152 and 156 are active during counterclockwise strokes while cams 154 and 158 are active during clockwise strokes. Of the lower key cams, cams 168 and 172 are active during clockwise strokes and cams 170 and 174 are active during counterclockwise strokes.

Of the reading cams, cams 130, 134, 138 and 142 are active during counterclockwise strokes and cams 140, 136, 132 and 128 are active during clockwise strokes.

For the purpose of specific description there may be considered first a clockwise and then a counterclockwise stroke of the jack specifically indicated at J in FIGURE 45. It will be noted that this jack has butts missing at 20a and 20b but is provided with butts 20c and 20d. It will also be noted that in the lower group of reading butts 22 the even numbered butts are present and the odd numbered butts are absent while in the upper part of this series of butts the even numbered butts are absent and the odd numbered butts are present. There will be first considered a clockwise stroke with the reading cams at the level numbered 6 and then a counterclockwise stroke with the reading cams at the level numbered 7.

It will also be noted that the jack J has butts missing at 16a and 16b but has butts present at 16c and 16d. At this point it may be noted that all of the jacks have butts present at 14.

Assume now that jack J starts its clockwise stroke, its starting position, as will be evident from FIGURES 44 and 45, will be to the left of cams 170 and 178 in FIGURE 44. As will appear hereafter, its lower end will initially be inward. The reading cams will be at level 6.

Jack J will pass cams 170 and 178 which are inactive during a clockwise stroke and will have its upper end rocked inwardly by cam 144, and then rocked outwardly by cam 128 engaging the butt 22 present at level number 6. The upper end is again rocked inwardly by cam 158 engaging the butt present at 16d, so that butt 18 passes without engaging cam 110. Cam 156 is inactive and in any event the upper end of the jack is already in inner position so that this cam will be passed without engagement. Cam 142 is inactive and while it is at the level of an existing butt the jack will pass it without being acted on. The top butt 18 being already in inner position it will pass the cam 150 without action. The butt of the jack at number 6 level will, however, be engaged by active cam 140 with the result that the lower end of the jack will be rocked inwardly. Key cam 168 is in active position but produces no movement of the jack because it has no key butt at 20a. Due to the inward position of the lower end of the jack it will pass without engaging cam 124.

Cams 174 and 138 are inactive and no rocking of the jack occurs until it reaches cam 148 which acts on butt 18 to rock its upper end inwardly. The jack then passes the position of active cam 136 which engages the butt at number 6 level rocking the lower end of the jack inwardly and the upper end outwardly. Cam 154 is in active position but as above noted the jack has butt 16b at the level of this cam missing. The result is that the upper end of the jack remains in outer position to engage cam 104 by which it is raised, being then depressed by the action of cam 108.

The jack then passes inactive key cam 152 and inactive reading cam 134 and is then acted upon by cam 146 which presses its upper end inwardly. Reading cam 132 which is active then engages the butt at number 6 level rocking the lower end of the jack inwardly. The jack then passes the active cam 172 without action and due to the inner position of its lower end it passes without engaging the cam 126. Key cam 170 and reading cam 130 are both inactive and hence the next action is that of the cam 114 on its butt 18 to effect inward rocking of the upper end of the jack. Cam 128 engages the butt at level number 6 to rock the upper end of the jack outwardly. However, the jack is immediately rocked in the reverse direction by active key cam 158 which engages butt 16d. The result is the rocking inwardly of the upper end of the jack to cause it to miss cam 110. The jack J ends its clockwise stroke in a position in the vicinity of cam 156.

It will be noted from the above that the jack has moved at a constant level except for its rise over cam 104 and its subsequent depression by cam 108. The corresponding intermediate jack 8 will move beneath cam 82 and will enter from the left of FIGURE 44 at a level below the cam 78 and will pass beneath cam 84. However as the jack J rises over cam 104 the associated intermediate jack will be raised, the cam 80 rocking slightly as indicated by the construction line position in FIGURE 44 to permit rise and the intermediate jack will thereafter rise over cam 76 and will be depressed to its original level by cam 100, passing outward from the right of FIGURE 44 at this last level.

The corresponding needle starts at a level corresponding to the passage of its butt below the stitch cams and the needle will remain at this level until it is raised by the rise of the intermediate jack 8 over cam 76. The rise of the needle thus effected is to clearing level and it will then engage stitch cam 48 after being slightly depressed by the cam point 41 and will take yarn and draw a stitch at the number 2 feed, the yarn being fed from the throat at 30. Following full depression by the stitch cam 48 it will remain at this depressed level as it passes from the right-hand side of FIGURE 44.

At the end of the clockwise stroke there will occur a shifting of the various cams acting upon the jacks and the reading cams will be raised to the number 7 level at which as noted above the jack J has its butt missing. At the ends of the strokes the reading cams are withdrawn so that the changes of their levels take place without engagement with butts 22. After change of level the reading cams corresponding to the next stroke move into action. Of the upper key cams, cams 152 and 156 will now become active while cams 154 and 158 become inactive. Of the lower key cams, 170 and 174 become active while 168 and 172 become inactive. Reading cams 130, 134, 138 and 142 are now active while the other associated reading cams are inactive. There may now be described the sequence of operations involved as the same jack J moves in its counterclockwise stroke entering the right-hand side of FIGURE 44.

The jack J moves counterclockwise past the cam 110 with its upper end in inner position and will pass the inactive key cam 158 and the inactive reading cam 128 and also the cam 144 which will be without action thereon. Cam 130 is active but since it is now in position number 7, where the jack butt is missing, it is without action on the jack. Key cam 170 is active but as has been noted the butt at level 20b corresponding to this key cam is missing from the jack with the result that the lower end of the jack remains in outer position to engage and rise over the cam 126. The result of this rise is to cause the butt 9 of the intermediate jack 8 to engage and rise over cam 86 and then to be depressed by cam 92 which also depresses the jack J to its normal level.

Cams 172 and 132 are inactive and the jack accordingly passes these cams and also cam 146 without action its upper end being in inner position. Cam 134 is active but since the butt 22 at its level is missing the jack passes this cam without being acted upon. The jack also passes the active cam 152 which would have no effect because the upper end of the jack is already in inner position but in any event this cam 152 could have no effect since the butt at level 16a is missing. The jack accordingly passes cam 104 without engagement and then passes the inactive cams 154 and 136 and also the cam 148. It then passes without engagement the cam 138 which is at the level of the missing butt but active cam 174 engages the butt 20d to rock the lower end of the jack inwardly. The result is that the jack misses the cam 124 and then passes inactive cams 168 and 140. Cam 150 will rock its upper end to inner position. The jack then passes cam 142 which though active is without action in view of the missing butt at level number 7. The jack then passes active cam 156 which has no effect since the upper end of the jack is in inner position and the jack then passes without engaging the cams 110 and 144.

Jack J reaches its final position only after passing cams 130, 170 and 178. As it reaches cam 130 its lower end is in outer position, and cam 130, though active, is at the level of a missing butt so no action on the jack occurs. Cam 170 is also active, but, as will be noted from FIGURE 45, there is no butt at level 20b so this cam is also without action. In the absence of blanking cam 178, therefore, the lower end of the jack would engage cam 126 and would be lifted thereby, in turn raising its intermediate jack and needle. To avoid such occurrence the blanking cam 178 is provided which, becoming active toward the end of the stroke, rocks the lower end of the jack inwardly to miss cam 126. This action is typical of the blanking cams which prevent second selections of the jacks as they reach for a second time the feeds into which they were originally selected.

It will be noted that the path of the jack in this counterclockwise stroke has been at a constant level except for the rise over cam 126 which as already mentioned serves to produce a rise of the intermediate jack 8 over cam 86 and then its depression by cam 92. Otherwise the intermediate jack also moved at a constant low level.

The rise of the intermediate jack over cam 86 produced a corresponding rise of the needle, the butt of which then engaged the stitch cam 48 to rise thereover to a clearing level, the needle being then slightly depressed by the cam point 41 and then fully depressed by cam 46 to take the yarn at feed number 2 from the throat 30 to draw a stitch therefrom. After passing down to the lower end of cam 46 the needle moved at a constant low level from the left-hand side of FIGURE 44.

It will be noted that the result of the foregoing was to cause the needle associated with the jack under discussion to take yarn at the same feed during strokes in both directions and to take yarn at that feed only. Inasmuch as the operations of jack J and its associated intermediate jack and needle are typical of operations of all of the jacks and their corresponding intermediate jacks and needles the operation may be briefly and generally summarized as follows:

A jack will effect the taking of yarn by its needle in a counterclockwise stroke at feed number 1 or feed number 3 or in a clockwise stroke at feed number 2 or feed number 4 when (a) the corresponding reading cam engages a butt 22 to rock the upper end of the jack outwardly and (b) the corresponding upper key cam fails to engage a butt 16 to move the upper end of the jack inwardly with the result that the jack rises over cam 104 or 110.

A jack also causes its needle to take yarn in a clockwise stroke at feed number 1 or feed number 3 or in a counterclockwise stroke at feed number 2 or feed number 4 when (a) the corresponding reading cam fails to engage a butt 22 leaving the lower end of a jack in outer position and (b) the corresponding lower key cam fails to engage a butt 20 to rock the lower end inwardly with the result that the jack rises over either cam 124 or 126.

Any other existing conditions at any of the feeds will cause a needle to fail to take yarn.

Reference may now be made to FIGURE 45 in which as previously noted the particular jack under discussion is indicated at J. It will be noted that, in the case of this jack J, in the lower region of butts 22 the butts are present at the even numbered levels and absent at the odd numbered levels. As has been previously indicated the even numbered levels correspond to clockwise strokes of the needle cylinder and the odd numbered levels correspond to counterclockwise strokes.

The result of what has been described is that so long as the reading cams engage or are at the level of the lower butts 22 of jack J the jack will cause its corresponding needle to take yarn at feed number 2.

It will be noted, however, that the butts at the upper portion of the series 22 are arranged so as to be present in the odd numbered positions but absent at the even numbered positions. Consequently when the reading cams are at the levels of these upper butts a different action of the needles occurs and as may be determined from following out the general considerations given above it will be found that the needle corresponding to jack J will then take yarn at feed number 1 in both directions of reciprocation.

As will appear from FIGURE 45 there is a transition point for the jack J. In the clockwise stroke when the reading cams are at the level numbered 10 the needle corresponding to jack J will take yarn at feed number 2. In the counterclockwise stroke with the reading cams at level number 11 the corresponding needle will take yarn at feed number 1. However, in the next clockwise stroke the needle corresponding to jack J will take yarn at feed number 2 due to the jack butt at level 12. In the next counterclockwise stroke with the reading cams at the level number 13 the needle corresponding to jack J will again take yarn at feed number 1. Then in the next clockwise stroke with the reading cams at level number 14 yarn will be taken by the corresponding needle at feed number 1. Thereafter at the subsequent higher levels of the reading cams yarn will be taken in every stroke at feed number 1.

The result of what has just been mentioned is to produce a junction of the colored areas produced at the various feeds in which in the finished product there will appear, for example, a diamond of solid color bounded by a diagonal line of stitches of the next adjacent color, then a second diagonal line of stitches of the first color followed by a solid area of the second color.

The particular selections involved will become apparent from consideration particularly of the butts at the levels 16 and 20a, 20b, 20c and 20d of FIGURE 45 which butts are controlled by the key cams. As will be evident the jacks may be considered as divided up into four segments each of which has a particular arrangement of butts at levels 16 and 20a, 20b, 20c and 20d in each segment, there being two butts of each group present and two butts of each group absent. Each segment then corresponds to the formation of stitches at two adjacent feeds as indicated in the figure. The lower groupings of butts 22 effect the taking of yarn at one feed of the pair and the upper groupings of butts 22 at the other feed of the pair with the transition conditions described above.

In view of the complete description of typical operations and the statement of the general conditions involved it is believed unnecessary to detail the specific jack movements for every possible combination exhibited in FIGURE 45.

So far it has been assumed that during the formation of a single diamond corresponding to a single complete cycle of rise and fall of the reading cams there has been fed at each feed only a single yarn. It will be evident however that variegated effects may be produced by yarn changes.

FIGURE 52 is a view of the inside of the patterned portion of a fabric, the progress of knitting being from the bottom toward the top of the figure, the directions of the strokes in the formation of the various courses being indicated by the arrows at the right of this figure. In this figure the number of courses and wales constituting the extent of a diamond is reduced as contrasted with the designs produced by the setup of FIGURE 45 and the other mechanical controls which have been described, but the sequences of formation of loops are clearly and typically shown. This figure shows the nature of the junctions between the diamonds and particularly the diagonal lines of stitches at the junctions. It will be noted that (except for yarn change overlaps) no stitch contains more than one yarn. It will also be noted that each yarn is knit only once in the wale at which reversal of knitting direction occurs, i.e. a yarn is not knit into a terminal wale in one stroke and then linked with itself through formation of a loop in the same wale formed in the next stroke.

Of particular significance is the matter of yarn change between contiguous ends of diamonds. As previously pointed out each yarn change is completed during a counterclockwise stroke of the needle cylinder. It will be evident, from the needle selections indicated and the yarn changing sequence, that the present machine produces a yarn change involving the knitting of both the outgoing and ingoing yarns in the same stitches by two non-adjacent needles as indicated at 1050 and 1052. The result is that the yarn ends are securely engaged in the fabric without a possibility that they will work loose when the product is worn. This is in contrast with prior devices in which ingoing and outgoing yarns at the junction points of diamonds were knit in separate strokes with the result that stretching of the fabric could easily disengage loops and produce openings and runs unless the yarn ends were later tied to insure that they could not slip.

The stitch 1054 intervening between stitches 1050 and 1052 belongs to one of the diamonds at the side of the two diamonds involved in the yarn change and, as will be evident, provides a stitch belonging to the two diagonal groups of stitches joining the meeting diamonds.

It will be evident that variations of the junctions at the ends of diamonds may be provided having the common characteristic that ingoing and outgoing yarns are knit together in at least one stitch to insure that their ends are properly held, there being preferably two stitches involving this knitting together of the two yarns.

The knitting of the heel is started with number 7 step of the main cam drum and step number 11 of the trick wheels. The trick wheel move effects changes to put in action the fourth fingers at each of feeds number 1 and number 2 and puts into action feed finger number 3 at feed number 4. No yarn change is made at feed number 3. While fingers are in active positions at feeds number 3 and number 4, yarn is not taken by the needles during heel formation at these feeds and as will be evident hereafter the yarns extending from these feeds wrap about the shanks of picked needles and their takeup sweeps act to achieve proper control of the yarns.

The main drum move brings cam 944 into engagement with follower 693c to position the needle cylinder for proper tension of the stitches. The cylinder height is changed to enlarge stitches for heavier yarn in the heel or, at any rate, even if heel stitches are drawn from the same weight yarn as the leg, it may be desirable to raise the cylinder to draw at least the same size stitches as in the leg due to the fact that in formation of the heel the stitches are not drawn over the sinker nebs as they were during leg formation.

As will be noted by considering the portions 950 and 952 of the cam race for roller 755, this roller is moved substantially throughout the main cam drum move to effect disengagement of drum 760 and engagement of drum 758 by clutch 748. Detent 782 is released by cam 790 but is held out for retiming as described, while detent 776 is moved outwardly by cam 790 to disengage notch 774 releasing drum 758. The rotation of drum 758 thus initiated effects rotation of cams 762 and 766 which, through levers 764 and 768, provide swinging of cams 62 and 64. Cam 390 at the same time reciprocates but as will presently appear it has no action in this phase of the operation since pin 388 will be otherwise lifted.

At the end of move number 7 cam 960 effects movement of levers 404 and 404′ to move cams 64 and 62 inwardly to engage long butts of needles and also sufficiently to act upon follower screw 414 and the corresponding screw on the other side of the machine to hold the associated pins which have been raised by cams 390 and 390′ to lower the dropping pickers 72 and 74 to inactive positions.

Clearing cam 50 is put into action by release of the follower from cam 968. This cam moves inwardly sufficiently far to engage long butts only. Clearing cam 44 is also moved inwardly to engage long butts by the dropping of its follower on step 980.

Pickers 68 and 70 are fully released to positions to engage and raise two needles on each stroke.

It will be noted that cam 996 is arranged to act on its follower only during the initial portion of move number 7 of the main cam drum. Cam 159 moves into action to cause the jacks associated with approximately the trailing quarter of the long butt needles to rise over cam 126 so that the intermediate jacks rise over cam 86 and the needles rise over cam 48 to take yarn at the second feed. It may be noted that the jacks associated with heel needles have their butts missing at the position of key cam 170 and that ring 268 has not reached its mid position to operate blanking cams 178 and 180 so that these cams do not prevent the rocking of a pattern jack by cam 159. Blanking cam 178 will be inactive at this time since the drum 760 is not declutched until near the end of the main cam drum move. The reason for the use of cam 159 is to insure that the trailing long butt needles will take yarn at number 2 feed before cam 62 goes in, the inward movement of cam 62 taking place during the passage of short butt needles following the long butt needles. At least three of the trailing long butt needles must knit at feed 2 since otherwise the active yarn which would have changed to a heel yarn at the back of the heel would trail from this point to the yarn finger, and since on the next stroke (clockwise) of the needle cylinder this yarn would trap about and slide up the shanks of the leading two long butt needles elevated by the picker and be missed by some of the succeeding heel needles. By knitting the yarn on a few needles during the counterclockwise stroke, as described, the yarn is connected to the leading stitches to which it is to be joined and, therefore, is held down in the proper position to be taken by the active needles. Cam 44 must go in to cause the needles beginning with the long butt series to take yarn at feed number 1 but this cam may be controlled from the main cam drum in sufficient time for this to occur. Cam 159 must go out as soon as the long butts have passed in the same move ot he main drum, being particularly required to be out of action before the reverse stroke occurs because otherwise it would clash with the jacks.

Cam 1012 acts to withdraw the sinker cap stop screws 464 and 466, freeing the sinker cams for normal oscillation so that the yarns will feed under the nebs of the sinkers in the usual fashions as contrasted with the action during patterning when, with the stop screws in position, the sinker cam movements were limited to cause the yarn to be drawn over the nebs of the sinkers.

Withdrawal of clutch 748 from the drum 760 would produce stopping of this drum except for the fact that just prior to this withdrawal clutch 897 is engaged by the action of cam 1042 which initiates retiming of the chain 828. This retiming action has been described. Pin 852 is withdrawn from the race provided by cams 842 and 844 while lever 846 is in its central position and the lever 946 is latched in that position while at the same time pin 793 is moved out to prevent detent 782 from engaging notch 780. As a consequence, rotation of drum 760 continues but only for the purpose of rotating cams 796 and 810 for retiming as described.

After clutch 748 disengages the drum member 757, roller 755 continues to move until at the end of the main drum move it is in the race 952 and has caused the clutch to engage member 761 of drum 758, and through cam 790 has lifted detent 776 from notch 774. The drum 758 now begins to revolve and through its cams 762 and 766, levers 764 and 768, wires 395 and 394, reciprocates switch cams 62 and 64 in proper timing with the movement of the needle cylinder in each direction as previously described.

The various actions just described provide for narrowing in the formation of the heel as follows:

In the counterclockwise move of the needle cylinder corresponding to move number 7 of the main cam drum the trailing long butt needles are controlled by the action of cam 159 to clear their stitches over cam 48, and they can then draw yarn at feed number 2 in passing down stitch cam 46 while long butt needles are cleared by cam 44 and take yarn at feed number 1 knitting it at stitch cam 40. They then pass under cam 64 and under cams 60, 61 and 58, missing cam 56 which is held out during heel and toe knitting. Some of the leading long butt needles at the end of the stroke would pass the location of cam 62 and to prevent their being raised thereby this cam is swung upwardly before they reach it as described previously. The short butt needles are missed by all of the cams and ride low.

On the reverse stroke the long butt needles are raised by cam 64 and then by cam 40, knit yarn at feed number 1 by passing down stitch cam 42, are cleared by cam 50, and take and knit yarn at feed number 2 as they pass down cam 48. They then pass under cam 62 and, passing under or by the other cams, pass under cam 64 which is raised as they approach. In this stroke, however, the first two long butt needles are picked upwardly by picker 68. In the next forward stroke the two leading long butt needles are picked by picker 70 and thus narrowing occurs in usual fashion.

During the continuation of narrowing, moves 12 to 16, inclusive, of the trick wheels occur but these are essentially idle moves, there being no yarn changes effected thereby.

Figure 4:
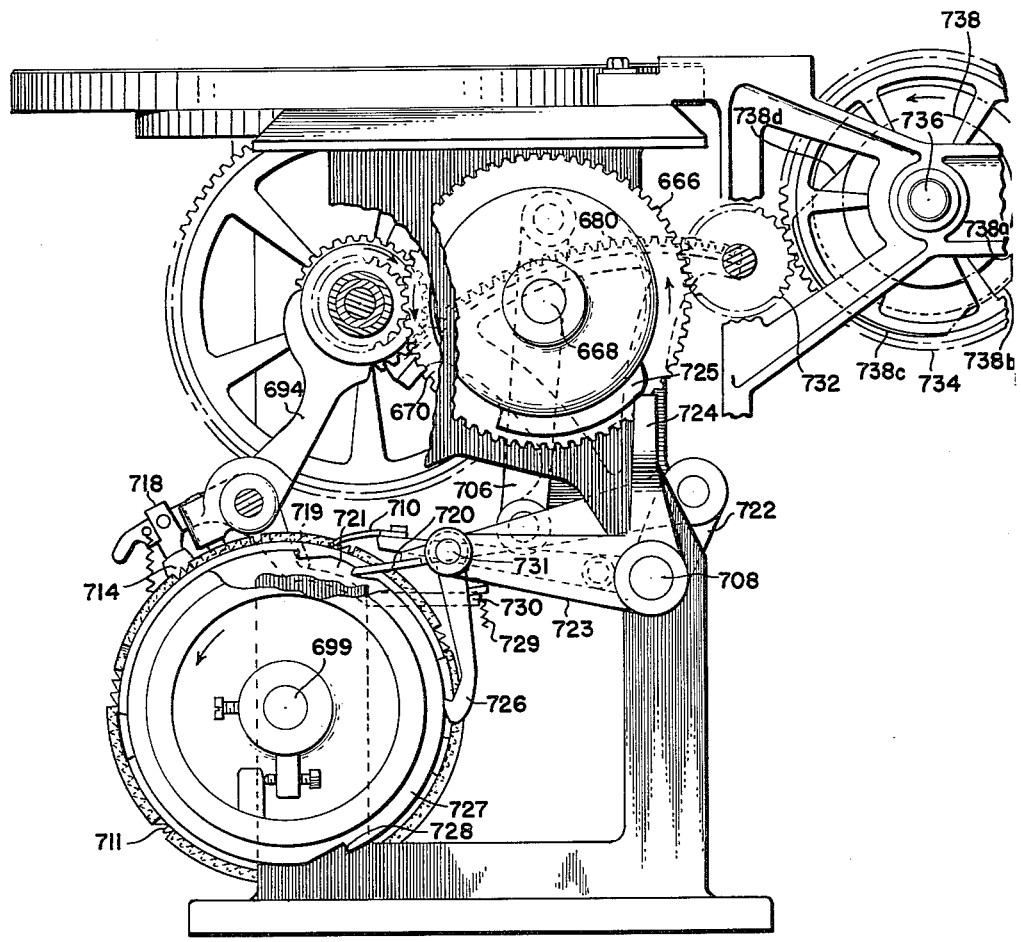
FIGURE 4 is an elevation, with parts broken away and sectioned, of the drive and control elements shown in FIGURE 3.

Widening is begun by move 8 of the main drum. It will be noted from FIGURE 50 that the pattern chain link initiating this move is indicated as having a low lug. Referring to FIGURE 4, it will be noted that auxiliary pawl 726 has been oscillating on the circular portion of ratchet 727 having only a single tooth 728. Up to the present time, even when the auxiliary pawl was released against the ratchet, it was without action since it could not engage the tooth. The low lug of the pattern chain lowers guard 719 and its end 730 sufficiently to permit the pawl 720 to engage its ratchet 721 but insufficiently to permit pawl 726 to engage its ratchet tooth 728 which, at the end of its drum move, would be in position for engagement by pawl 726 if the guard was fully lowered by a chain lug at normal height and, being caught in the tooth, would advance the drum on the next passage of cam 725. On this move the levers 404 and 404' are swung partially toward their inactive positions by the dropping of the follower on the lower step 962 of its cam. By reason of this action cam 411 releases pin 388 and the corresponding action occurs on the other side of the machine so that the dropping pickers 72 and 74 are solely under control of the cams 390.

The pickers 68 and 70 are now raised to their positions for single needle picking by the action of cam 990. No other changes are effected by the main cam drum. Needle movements now occur as in the case of narrowing with the exception that the dropper picks 72 and 74 lower three needles on each stroke and the narrowing picks 68 and 70 raise a single needle on each stroke. Due to the action of cam 390, lowering picker 72, during a clockwise stroke, is rendered inactive until the leading group of elevated needles is passing, at which time the picker is released to ride under this group until after its passage, when the picker rises into position to engage and lower the first three needles of the elevated group following the active needles and after passage of this group the picker is again renderd inactive. During a counterclockwise stroke, cam 390' controls lowering picker 74 in a similar manner. Cams 62 and 64 vibrate for the same reason as in narrowing to avoid raising of leading long butt needles as they reach these cams a second time in each stroke.

Move number 9 of the main cam drum initiates the knitting of the four-feed foot.

At this time the tooth 728 is in position to be engaged by pawl 726 which is released by a full height lug on the main chain and accordingly move number 9 of the main drum is initially imparted by the action of cam 725 moving this auxiliary pawl while the balance of the move is by the main pawl 720. As will shortly appear this early move is to insure withdrawal of blanking cams 182 and 178 before the short and long butt needles respectively reach them in this counterclockwise stroke.

Trick wheel move number 18 provides yarn changes at the first and second feeds to finger number 1 of each. No change is effected at the third and fourth feeds but the yarns fed by the active fingers at these feeds will now be taken by the needles.

The advance of the main cam drum also involves movement of the clutch drum to provide rotation of the needle cylinder.

Cam 940 now acts on follower 693a to provide a proper setting of the needle cylinder for the desired stitches in the foot.

Roller 755 now enters portion 954 of its race to move the auxiliary clutch to neutral position to stop the oscillation of cams 62 and 64. At this time detent 776 engages notch 774 to hold drum 758 stationary. If retiming has been completed detent 782 will engage notch 780; but if retiming continues this action will not occur until retiming is completed. By the dropping of the follower from cam 962 cams 62 and 64 are withdrawn from action.

Clearing cam 50 is taken out of action by cam 970.

Cam 44 is moved fully inwardly by the dropping of the follower from step 980.

Pickers 68 and 70 are moved to their highest inactive positions by cam 992.

Blanking cams 178 and 182 are moved out of action by cams 1008 and 1018, cams 184 and 180 being concurrently moved out of action though this is merely for clearance as jack butts move downwardly.

Cam 56 moves into action as the follower leaves cam 1028.

In the knitting of the foot the long butt needles first knit at feed number 2 and the short butt needles at feed number 4. The movements of the needles for this purpose are controlled by the blanking cams 178 and 182 being out of action, and it is for this reason that it is necessary to have the drum move removing these blanking cams completed prior to the beginning of the last counterclockwise stroke. The needles during the knitting of the foot enter the right-hand side of FIGURE 44 below the cam 54, 58, are cleared by cam 56 and take yarn at feed number 3 going down cam 52. The reading cams and key cams being inactive, and also the blanking cams 178 and 182, the pattern jacks will rise over cam 126 causing the intermediate jacks to rise over cam 86 lifting the needles to engage and ride over cam 48 where clearing occurs. The needles then take yarn at the second feed in passing down stitch cam 46 and are cleared by cam 44. They then take yarn at the first feed in passing down stitch cam 40 and are selected upwardly to engage cam 60 by the action of cam 124 on the pattern jacks and cam 84 on the intermediate jacks. After clearing by cam 60 they take yarn at the fourth feed in passing down stitch cam 58.

It will thus be seen that four feed knitting takes place giving rise to very rapid production of the foot of the stocking. The active yarns at this time are desirably of the same color to avoid the appearance of striping in the foot.

Moves 10 and 11 of the main cam drum are idle ones as are also moves 19 and 20 of the trick wheels.

The formation of the ring toe is begun by move number 12 of the main drum and move number 21 of the trick wheels. The yarn change is to finger number 4 at each of the first and second feeds with withdrawal of the fingers at the third and fourth feeds. The main cam drum move provides restoration to action of blanking cams 182 and 184 by drop of the follower from cam 1018 and step 1020. This drop, however, occurs in two steps, there being first a drop from cam 1018 to step 1020 sufficient to move cam 182 into action, as previously described.

Cam 56 is removed from action in steps, first partway to miss short butt needles while continuing engagement with long butt needles due to step 1030 and then, due to step 1022, moving cam 56 fully outwardly to miss long butt needles. The removal of yarn at number 3 feed occurs as short butt needles fail to rise at the position of cam 56. Withdrawal of yarn at feed number 4 takes place after needles fail to clear over cam 60 due to the action of blanking cam 182. It will be evident that the result of the foregoing is two feed knitting at the first and second feeds only, this being preparatory to the knitting of the toe at these feeds.

Move 13 of the main cam drum initiates narrowing of the toe. As will be evident from FIGURE 43 this move results in positions of the machine elements corresponding to those involved in the narrowing of the heel with the additional introduction of blanking cams 178 and 180 by the movement of follower 912 from cam 1008 and step 1010 as described similarly for cams 182 and 184 and consequently the narrowing of the toe need not be described in detail.

The widening of the toe proceeds upon step number 14 of the main drum. An idle advance of the trick wheels, move number 23, occurs. The move of the main drum results in the same conditions as existed for the widening of the heel, and the widening of the toe need therefore not be described in detail.

The formation of the loopers rounds is initiated by move 15 of the main cam drum, there being no attendant yarn change. This move effects somewhat different conditions than those involved in coming out of the heel, since the loopers rounds are to be knit only at the first and second feeds. The clutch drum produces rotation of the needle cylinder. The auxiliary clutch moves to neutral position to stop the action of cams 762 and 766, detents 782 and 776 engaging respective notches 780 and 774 to hold drums 760 and 758 stationary. Cams 62 and 64 are moved out of action by the dropping of the follower from cam 966. Cam 50 is withdrawn by the action of cam 968. Cam 44 which was already in position to engage long butts only is now released by cam 986 for movement to engage short butts, the cam dropping in during the passage of long butts.

Pickers 68 and 70 are moved to their inactive positions by cam 988. Blanking cams 178 and 180 are withdrawn.

It will be noted that cam 56 is already out of action while cam 182 is already in action.

The result of the foregoing is rotary knitting at the first and second feeds, the needles being caused to rise by reason of the withdrawal of cam 178, through the actions of cams 126 and 86 so that they clear over cam 48 and take yarn at the second feed, being then cleared by cam 44 and taking yarn at the first feed. By reason of the active condition of cam 182 they remain low at the fourth feed and by reason of withdrawal of cam 56 they also move low at the third feed.

The rotary knitting thus continues with the toe yarns and with the toe tension adjustment.

The next event is move number 24 of the trick wheels. This move removes from action the yarns at the first and second feeds with the resulting occurrence of a press-off, leaving the needles bare.

Move 16 of the main cam drum then takes place resulting in the stepwise removal of cam 44 by cams 972 and 974, and a restoration to action of blanking cams 178 and 180 which as will be evident prevents any clearing of needles and results in their moving at low welt level. In this same move cam 176 is put into action in preparation for the following makeup and the latch openers are also put into active position. The cycle then automatically repeats.

It is sometimes desirable to carry the leg pattern into the instep to the extent, for example, of the formation of an instep diamond. A stocking in which this occurs is illustrated in FIGURE 54 which, in comparison with that shown in FIGURE 51 involves the formation of a colored diamond $d$ after completion of the heel. The formation of such a diamond is carried out by reciprocatory knitting as in the formation of the leg. Such knitting requires the formation of side half diamonds $d_1$ which are in effect continuations of the half side diamonds above the heel, a back diamond $d_2$, and concurrently with the second halves of the diamonds $d$ and $d_2$, half side diamonds $d_3$. As ordinarily desired, the diamond portions $d_1$, $d_2$ and $d_3$ would be formed of the same color yarn as the side half diamonds preceding the heel and the foot $f$. Except upon close examination, revealing the diamond junctions, the portion of the stocking beyond the heel will then be uniform in color with the foot except for the front diamond $d$.

Various changes are involved in the mechanism for the formation of the stocking of FIGURE 54. FIGURE 53 shows the changes of cams on the main cam drum, and may be compared with FIGURE 43 already described. The trick wheels at the first, second and third feeds may be the same as before, but at the fourth feed the trick wheel set-up is as illustrated in FIGURE 56 which may be compared with FIGURE 49. The various moves are the same as illustrated in FIGURE 50 to move number 7 of the main drum. Moves 7 to 11 are then different, while thereafter the moves 12 to 16, inclusive, are the same as before. The moves which are different are indicated in FIGURE 55 which may be considered as representing substitutions for the corresponding portions of FIGURE 50.

Referring to FIGURE 53 and comparing it with FIGURE 43, it will be noted that cam 940' is substituted for cam 940 to give a delay of one step in action upon the follower 693a.

The cam race acting on follower 755 is the same as in FIGURE 43 with the exception of the race portion 954' and the effective shortening of race 954 to the race 954". As will appear the race at 954' is provided for the purpose of pattern control during the formation of the diamond $d$ and its associated diamonds.

Previous cam 980 is changed to include the addition of an elevated step 983 and a trailing ledge 985.

Cam 1008 is shortened to the extent indicated at 1008' in FIGURE 53.

The single cam 1012 is replaced by cam 1012' and 1013.

Cam 1018 is replaced by a shorter cam 1018'.

Cam 1028 is extended and terminates in a step 1029.

The cam 1042 which controls retiming is placed in a later position at 1042', since retiming cannot begin until after the completion of the instep diamond.

Comparing FIGURE 56 with FIGURE 49 it will be noted that the controls for the first and fourth fingers at number 4 feed are the same as before. In the case of the third finger at this feed the control is the same up to step number 11, and then remains different through step number 19. In the case of the second finger at this feed there is a difference beginning with step number 11 and continuing through step number 20. Butts at 626 are added in step number 20. It may be pointed out that the general result is to cause yarn from the second finger at number 4 feed to knit the instep diamond $d$ as contrasted with the feeding of yarn from the third finger of feed number 4 during the knitting of the foot of the stocking of FIGURE 51.

Referring now particularly to FIGURES 55 and 50, it will be noted that the main drum moves number 7 and 8 correspond in the two figures with the sole exception that at feed number 4 at the start of the heel the yarn from the third finger is lowered into active position as compared with the yarn from the second finger at this feed. However, as already noted, while yarn at number 4 feed is thus placed in position in preparation for later knitting it is not taken during heel formation.

Upon the occurrence of main cam drum move number 9, change of the needle cylinder operation to rotation does not occur, but rather reciprocation continues. The pattern drum starts due to the formation of the raceway 954', and then reciprocatory diamond pattern formation occurs as previously described with concurrent events corresponding to those involved in the formation of the leg. Move number 10 of the main cam drum is an idle one.

Move number 11 of the main cam drum, indicated as idle in FIGURE 50, now effects the resumption of rotation and the termination of the pattern with substitution of yarn from the third finger at number 4 feed for the yarn from the second finger at this feed. The subsequent moves are then the same as before.

As will be evident from the brief description just given, there will be produced the stocking of FIGURE 54 and it is unnecessary to describe the actions of the various parts of the machine in detail since they are the same as already fully described.

It will be clear from the foregoing description that stockings of various pattern formations either in the leg alone or continuing from the leg into the foot portions of the stockings may be produced, the machine not being limited to the formation of diamonds but being equally adaptable to the formation of other figures depending solely upon the set-ups of the various pattern controlling elements. Yarn changes involving stripe formations or the like may also be provided, and it will be evident that, if desired, larger numbers of fingers than those described may be provided at the various feeds.

What is claimed is:

1. In a circular knitting machine comprising a needle cylinder, needles carried by said cylinder, yarn feeding means at each of a plurality of yarn feeding stations, and means for producing relative reciprocatory movements between said cylinder and said yarn feeding means; means for controlling needles so that different groups of needles take yarn at each feed during successive reciprocatory strokes to produce at least one diagonal junction between areas knit primarily from yarns fed at different feeding stations, and means producing a yarn change effecting knitting of outgoing and incoming yarns together in at least one loop during a single reciprocatory stroke of the last mentioned knitting with removal of the outgoing yarn during said stroke.

2. In a circular knitting machine comprising a needle cylinder, needles carried by said cylinder, yarn feeding means at each of a plurality of yarn feeding stations, and means for producing relative reciprocatory movements between said cylinder and said yarn feeding means; means for controlling needles so that different groups of needles take yarn at each feed during successive reciprocatory strokes to produce at least one diagonal junction between areas knit primarily from yarns fed at different feeding stations, and means producing a yarn change effecting knitting of outgoing and incoming yarns together in a plurality of loops during a single reciprocatory stroke of the last mentioned knitting with removal of the outgoing yarn during said stroke.

3. In a circular knitting machine comprising a needle cylinder, needles carried by said cylinder, yarn feeding means at each of a plurality of yarn feeding stations, and means for producing relative reciprocatory movements between said cylinder and said yarn feeding means; means for controlling needles to cause any needle to take yarn at only one feeding station during a single reciprocatory stroke, with a selected group of needles taking yarn at each of a plurality of said feeding stations during said reciprocatory stroke, and means producing a yarn change effecting knitting of outgoing and incoming yarns at one feeding station together in at least two loops during a single reciprocatory stroke with said two loops having interposed between them a loop formed of yarn fed at another feeding station.

4. In a circular knitting machine comprising a needle cylinder, needles carried by said cylinder, yarn feeding means at each of a plurality of yarn feeding stations, and means for producing relative reciprocatory movements between said cylinder and said yarn feeding means; means for controlling needles so that different groups of needles take yarn at each feed during successive reciprocatory strokes to produce at least one diagonal junction between areas knit primarily from yarns fed at different feeding stations, and means producing a yarn change effecting knitting of outgoing and incoming yarns at one feeding station together in at least two loops during a single reciprocatory stroke with said two loops having interposed between them a loop formed of yarn fed at another feeding station.

5. In a circular knitting machine comprising a needle cylinder, needles carried by said cylinder, yarn feeding means at each of a plurality of yarn feeding stations, and means for producing relative reciprocatory movements between said cylinder and said yarn feeding means; means for controlling needles so that different groups of needles take yarn at each feed during successive reciprocatory strokes to produce at least one diagonal junction between areas knit primarily from yarns fed at different feeding stations, with said junction comprising, in a single course, a pair of loops formed of yarn fed at one feeding station separated by a loop formed of yarn fed at another feeding station, and means producing a yarn change effecting knitting of outgoing and incoming yarns together in at least one loop during a single reciprocatory stroke.

6. In a circular knitting machine comprising a needle cylinder, needles carried by said cylinder, yarn feeding means at each of a plurality of yarn feeding stations, and means for producing relative reciprocatory movements between said cylinder and said yarn feeding means; means for controlling needles so that different groups of needles take yarn at each feed during successive reciprocatory strokes to produce at least one diagonal junction between areas knit primarily from yarns fed at different feeding stations, with said junction comprising, in a single course, a pair of loops formed of yarn fed at one feeding station separated by a loop formed of yarn fed at another feeding station, and means producing a yarn change effecting knitting of outgoing and incoming yarns together in a plurality of loops during a single reciprocatory stroke.

7. In a circular knitting machine comprising a needle cylinder, needles carried by said cylinder, yarn feeding means at each of a plurality of yarn feeding stations, and means for producing relative reciprocatory movements between said cylinder and said yarn feeding means; means for controlling needles so that different groups of needles take yarn at each feed during successive reciprocatory strokes to produce at least one diagonal junction between areas knit primarily from yarns fed at different feeding stations, with said junction comprising, in a single course, a pair of loops formed of yarn fed at one feeding station separated by a loop formed of yarn fed at another feeding station, and means producing a yarn change effecting knitting of outgoing and incoming yarns at one feeding station together in at least two loops during a single reciprocatory stroke with said two loops having interposed between them a loop formed of yarn fed at another feeding station.

8. In a circular knitting machine comprising a needle cylinder, needles carried by said cylinder, yarn feeding means at each of a plurality of yarn feeding stations, and means for producing relative reciprocatory movements between said cylinder and said yarn feeding means; means for controlling needles so that different groups of needles take yarn at each feed during successive reciprocatory strokes to produce diamond-shaped areas knit primarily from yarns at different feeds with diagonal junctions between such areas, and means producing a yarn change at the meeting vertices of such areas and effecting knitting of outgoing and incoming yarns together in at least one loop during a single reciprocatory stroke with removal of the outgoing yarn during said stroke.

9. In a circular knitting machine comprising a needle cylinder, needles carried by said cylinder, yarn feeding means at each of a plurality of yarn feeding stations, and means for producing relative reciprocatory movements between said cylinder and said yarn feeding means; means for controlling needles so that different groups of needles take yarn at each feed during successive reciprocatory strokes to produce diamond-shaped areas knit primarily from yarns at different feeds with diagonal junctions between such areas, and means producing a yarn change at the meeting vertices of such areas and effecting knitting of outgoing and incoming yarns together in a plurality of loops during a single reciprocatory stroke with removal of the outgoing yarn during said stroke.

10. In a circular knitting machine comprising a needle cylinder, needles carried by said cylinder, yarn feeding means at each of a plurality of yarn feeding stations, and means for producing relative reciprocatory movements between said cylinder and said yarn feeding means; means for controlling needles so that different groups of needles take yarn at each feed during successive reciprocatory strokes to produce diamond-shaped areas knit primarily from yarns at different feeds with diagonal junctions between such areas, and means producing a yarn change at the meeting vertices of such areas and effecting knitting of outgoing and incoming yarns at one feeding station together in at least two loops during a single reciprocatory stroke with said two loops having interposed between them a loop formed of yarn fed at another feeding station.

11. In a circular knitting machine comprising a needle cylinder, needles carried by said cylinder, yarn feeding means at each of a plurality of yarn feeding stations, and means for producing relative reciprocatory movements between said cylinder and said yarn feeding means; means for controlling needles to cause any needle to take yarn at only one feeding station during a single reciprocatory stroke and to produce a junction between areas knit primarily from yarns fed at different feeding stations, which junction comprises, in a single course, a pair of loops of yarn fed at one feeding station separated by a loop formed of yarn fed at another feeding station, and means producing a yarn change effecting knitting of outgoing and incoming yarns together in at least one loop during a single reciprocatory stroke.

12. In a circular knitting machine comprising a needle cylinder, needles carried by said cylinder, yarn feeding means at each of a plurality of yarn feeding stations, and means for producing relative reciprocatory movements between said cylinder and said yarn feeding means; means for controlling needles to cause any needle to take yarn at only one feeding station during a single reciprocatory stroke and to produce a junction between areas knit primarily from yarns fed at different feeding stations, which junction comprises, in a single course, a pair of loops formed of yarn fed at one feeding station separated by a loop formed of yarn fed at another feeding station, and means producing a yarn change effecting knitting of outgoing and incoming yarns together in a plurality of loops during a single reciprocatory stroke.

13. In a circular knitting machine comprising a needle cylinder, needles carried by said cylinder, yarn feeding means at each of a plurality of yarn feeding stations, and means for producing relative reciprocatory movements between said cylinder and said yarn feeding means; means for controlling needles to cause a selected group of needles to take yarn at each of a plurality of said feeding stations during each of a series of successive reciprocatory strokes in opposite directions, the last named means comprising jacks having selectively located butts and individually associated with the needles, and vertically movable reading cams for acting on said butts at different levels.

14. In a circular knitting machine comprising a needle cylinder, needles carried by said cylinder, yarn feeding means at each of a plurality of yarn feeding stations, and means for producing relative reciprocatory movements between said cylinder and said yarn feeding means; means for controlling needles to cause a selected group of needles to take yarn at each of a plurality of said feeding stations during each of a series of successive reciprocatory strokes in opposite directions, the last named means comprising jacks having selectively located butts and individually associated with the needles, vertically movable reading cams for acting on said butts at different levels, and means for imparting vertical step by step movements to said reading cams.

15. In a circular knitting machine comprising a needle cylinder, needles carried by said cylinder, yarn feeding means at each of a plurality of yarn feeding stations, and means for producing relative reciprocatory movements between said cylinder and said yarn feeding means; means for controlling needles to cause a selected group of needles to take yarn at each of a plurality of said feeding stations during each of a series of successive reciprocatory strokes in opposite directions, the last named means comprising jacks having selectively located butts and individually associated with the needles, vertically movable reading cams for acting on said butts at different levels, and means for imparting vertical step by step movements to said reading cams between strokes of reciprocation.

16. In a circular knitting machine comprising a needle cylinder, needles carried by said cylinder, yarn feeding means at each of a plurality of yarn feeding stations, and means for producing relative reciprocatory movements between said cylinder and said yarn feeding means; means for controlling needles to cause a selected group of needles to take yarn at each of a plurality of said feeding stations during each of a series of successive reciprocatory strokes in opposite directions, the last named means comprising jacks having selectively located butts and individually associated with the needles, vertically movable reading cams for acting on said butts at different levels, and means for imparting a series of vertical step by step movements to said reading cams in one direction and then a series of vertical step by step movements to said reading cams in the opposite direction.

17. In a circular knitting machine comprising a needle cylinder, needles carried by said cylinder, yarn feeding means at each of a plurality of yarn feeding stations, and means for producing relative reciprocatory movements between said cylinder and said yarn feeding means; means for controlling needles to cause a selected group of needles to take yarn at each of a plurality of said feeding stations during each of a series of successive reciprocatory strokes in opposite directions, the last named means comprising jacks having selectively located butts and individually associated with the needles, vertically movable reading cams for acting on said butts at different levels, and means for imparting a series of vertical step by step movements to said reading cams in one direction and then a series of vertical step by step movements to said reading cams in the opposite direction, said step-imparting means including an annular member extending about the axis of the needle cylinder and means for imparting rotational movements to said member.

18. In a circular knitting machine comprising a needle cylinder, needles carried by said cylinder, yarn feeding means, and means for producing relative reciprocatory movements between said cylinder and yarn feeding means; means for controlling the formation of stitches including an annular member extending about the axis of the needle cylinder and means for imparting reciprocatory movements to said member about said axis.

19. In a circular knitting machine comprising a needle cylinder, needles carried by said cylinder, yarn feeding means at each of a plurality of yarn feeding stations, and means for producing relative reciprocatory movements between said cylinder and yarn feeding means; means for controlling the formation of stitches at each of said yarn feeding stations including an annular member extending about the axis of the needle cylinder and means for imparting reciprocatory movements to said member about said axis.

20. In a circular knitting machine comprising a needle cylinder, needles carried by said cylinder, yarn feeding means at each of a plurality of yarn feeding stations, and means for producing relative reciprocatory movements between said cylinder and said yarn feeding means; means for controlling needles to cause a selected group of needles to take yarn at each of a plurality of said feeding stations during each of a series of successive reciprocatory strokes in opposite directions, the last named means comprising jacks having selectively located butts and individually associated with the needles, and vertically movable reading cams for acting on said butts at different levels, said reading cams comprising two sets each movable inwardly and outwardly relatively to the axis of the needle cylinder, the cams of one set being active during reciprocatory strokes in one direction, and the cams of the other set being active during reciprocatory strokes in the opposite direction.

21. In a circular knitting machine comprising a needle cylinder, needles carried by said cylinder, yarn feeding means at each of a plurality of yarn feeding stations, and means for producing relative reciprocatory movements between said cylinder and said yarn feeding means; means for controlling needles to cause a selected group of needles to take yarn at each of a plurality of said feeding stations during each of a series of successive reciprocatory strokes in opposite directions, the last named means comprising jacks having selectively located butts and individually associated with the needles, and vertically movable reading cams for acting on said butts at different levels, said reading cams comprising two sets each movable inwardly and outwardly relatively to the axis of the needle cylinder, the cams of one set being active at one set of alternate levels during reciprocatory strokes in one direction, and the cams of the other set being active at another set of intermediate levels during reciprocatory strokes in the opposite direction.

22. In a circular knitting machine comprising a needle cylinder, needles carried by said cylinder, yarn feeding means at each of a plurality of yarn feeding stations, and means for producing relative reciprocatory movements between said cylinder and said yarn feeding means; means for controlling needles to cause a selected group of needles to take yarn at each of a plurality of said feeding stations during each of a series of successive reciprocatory strokes in opposite directions, the last named means comprising jacks having selectively located butts and individually associated with the needles, vertically movable reading cams for acting on said butts at different levels, said reading cams comprising two sets each movable inwardly and outwardly relatively to the axis of the needle cylinder, the cams of one set being active during reciprocatory strokes in one direction, and the cams of the other set being active during reciprocatory strokes in the opposite direction, and means for imparting inward and outward movements to said cams comprising an annular member extending about the axis of the needle cylinder and means for imparting rotational movements to said member.

23. In a circular knitting machine comprising a needle cylinder, needles carried by said cylinder, yarn feeding means at each of a plurality of yarn feeding stations, and means for producing relative reciprocatory movements between said cylinder and said yarn feeding means; means for controlling needles to cause a selected group of needles to take yarn at each of a plurality of said feeding stations during each of a series of successive reciprocatory strokes in opposite directions, the last named means comprising jacks having selectively located butts and individually associated with the needles, vertically movable reading cams for acting on said butts at different levels, said reading cams comprising two sets each movable inwardly and outwardly relatively to the axis of the needle cylinder, the cams of one set being active during reciprocatory strokes in one direction, and the cams of the other set being active during reciprocatory strokes in the opposite direction, and means for imparting inward and outward movements to said cams comprising an annular member extending about the axis of the needle cylinder and means for imparting rotational movements to said member between strokes of reciprocation.

24. In a circular knitting machine comprising a needle cylinder, needles carried by said cylinder, yarn feeding means at each of a plurality of yarn feeding stations, and means for producing relative reciprocatory movements between said cylinder and said yarn feeding means; means for controlling needles to cause a selected group of needles to take yarn at each of a plurality of said feeding stations during each of a series of successive reciprocatory strokes in opposite directions, the last named means comprising jacks having selectively located butts and individually associated with the needles, vertically movable reading cams for acting on said butts at different levels, and a pattern control device determining the levels of said reading cams.

25. In a circular knitting machine comprising a needle cylinder, needles carried by said cylinder, yarn feeding means at each of a plurality of yarn feeding stations, and means for producing relative reciprocatory movements between said cylinder and said yarn feeding means; means for controlling needles to cause a selected group of needles to take yarn at each of a plurality of said feeding stations during each of a series of successive reciprocatory strokes in opposite directions, the last named means comprising jacks having selectively located butts and individually associated with the needles, vertically movable reading cams for acting on said butts at different levels, a pattern control device determining the levels of said reading cams, means for rendering all of said reading cams inactive, and means for retiming said pattern control device during a period of inaction of said reading cams.

26. In a circular knitting machine comprising a needle cylinder, needles carried by said cylinder, yarn feeding means at each of a plurality of yarn feeding stations, and means for producing relative reciprocatory movements between said cylinder and said yarn feeding means; means for controlling needles to cause a selected group of needles to take yarn at each of a plurality of said feeding stations during each of a series of successive reciprocatory strokes in opposite directions, the last named means comprising jacks having selectively located butts and individually associated with the needles, reading cams for acting on said butts at different levels, there being one reading cam preceding each feeding station from the standpoint of a reciprocatory stroke in one direction, and one reading cam preceding each feeding station from the standpoint of a reciprocatory stroke in the opposite direction, and a key cam corresponding to each of said reading cams for selective nullification of a jack selection provided by the relationship of its corresponding reading cam to the butt arrangement of the jack.

27. In a circular knitting machine comprising a needle cylinder, needles carried by said cylinder, yarn feeding means at each of a plurality of yarn feeding stations, and means for producing relative reciprocatory movements between said cylinder and said yarn feeding means; means for controlling needles to cause a selected group of needles to take yarn at each of a plurality of said feeding stations during each of a series of successive reciprocatory strokes in opposite directions, the last named means comprising jacks having selectively located butts and individually associated with needles in cylinder slots and rockable in said slots, reading cams for acting on said butts at different levels to produce rocking of the jacks, there being one reading cam preceding each feeding station from the standpoint of a reciprocatory stroke in one direction, and one reading cam preceding each feeding station from the standpoint of a reciprocatory stroke in the opposite direction, and a key cam corresponding to each of said reading cams for selective nullification, by the rocking of a jack, of a jack selection provided by the relationship of its corresponding reading cam to the butt arrangement of the jack.

28. In a circular knitting machine comprising a needle cylinder, needles carried by said cylinder, yarn feeding means at each of a plurality of yarn feeding stations, and means for producing relative reciprocatory movements between said cylinder and said yarn feeding means; means for controlling needles to cause a selected group of needles to take yarn at each of a plurality of said feeding stations during each of a series of successive reciprocatory strokes in opposite directions, the last named means comprising jacks having selectively located butts and individually associated with needles in cylinder slots and rockable in said slots, reading cams for acting on said butts at different levels to produce rocking of the jacks, there being one reading cam preceding each feeding station from the standpoint of a reciprocatory stroke in one direction, and one reading cam preceding each feeding station from the standpoint of a reciprocatory stroke in the opposite direction, a key cam corresponding to each of said reading cams for selective nullification, by the rocking of a jack, of a jack selection provided by the relationship of its corresponding reading cam to the butt arrangement of the jack, and a cam corresponding to each pair of reading and key cams arranged to act on jacks having predetermined rocked positions resulting from passage by the corresponding pair of reading and key cams to effect positioning of associated needles to take yarn at the following feeding station.

29. In a circular knitting machine comprising a needle cylinder, needles carried by said cylinder, yarn feeding means at each of a plurality of yarn feeding stations, and means for producing relative reciprocatory movements between said cylinder and said yarn feeding means; means for controlling needles to cause a selected group of needles to take yarn at each of a plurality of said feeding stations during each of a series of successive reciprocatory strokes in opposite directions, the last named means comprising jacks having selectively located butts and individually associated with needles in cylinder slots and rockable in said slots, reading cams for acting on said butts at different levels to produce rocking outwardly of the upper ends of the jacks and rocking inwardly of the lower ends of the jacks, there being one reading cam preceding each feeding station from the standpoint of a reciprocatory stroke in one direction, and one reading cam preceding each feeding station from the standpoint of a reciprocatory stroke in the opposite direction, means for rocking outwardly the lower ends of the jacks prior to their reaching each reading cam, a key cam corresponding to each of said reading cams for selective nullification of a jack selection provided by the relationship of its corresponding reading cam to the butt arrangement of the jack, one of the key cams preceding each feeding station being arranged to rock the lower ends of jacks inwardly and the other of the key cams preceding each feeding station being arranged to rock the lower ends of jacks outwardly, a cam following each of the first of the last mentioned key cams arranged to engage and raise a jack reaching it with its lower end in outward position, and a cam following each of the second of the last mentioned key cams arranged to engage and raise a jack reaching it with its lower end in inward position, said raising cams effecting positioning of needles to take yarn at the following feeding station.

30. In a circular knitting machine comprising a needle cylinder, needles carried by said cylinder, yarn feeding means at each of a plurality of yarn feeding stations, and means for producing relative reciprocatory movements between said cylinder and said yarn feeding means; means for controlling needles to cause a selected group of needles to take yarn at each of a plurality of said feeding stations during each of a series of successive reciprocatory strokes in opposite directions, the last named means comprising jacks having selectively located butts and individually associated with needles in cylinder slots and rockable in said slots, reading cams for acting on said butts at different levels to produce rocking outwardly of the upper ends of the jacks and rocking inwardly of the lower ends of the jacks, there being one reading cam preceding each feeding station from the standpoint of a reciprocatory stroke in one direction, and one reading cam preceding each feeding station from the standpoint of a reciprocatory stroke in the opposite direction, means for rocking outwardly the lower ends of the jacks prior to their reaching each reading cam, a key cam corresponding to each of said reading cams for selective nullification of a jack selection provided by the relationship of its corresponding reading cam to the butt arrangement of the jack, one of the key cams preceding each feeding station being arranged to rock the lower ends of jacks inwardly and the other of the key cams preceding each feeding station being arranged to rock the lower ends of jacks outwardly, a cam following each of the first of the last mentioned key cams arranged to engage the lower end of, and raise, a jack reaching it with its lower end in outward position, and a cam following each of the second of the last mentioned key cams arranged to engage the upper end of, and raise, a jack reaching it with its lower end in inward position, said raising cams effecting positioning of needles to take yarn at the following feeding station.

31. In a circular knitting machine comprising a needle cylinder, needles carried by said cylinder, yarn feeding means at each of a plurality of yarn feeding stations, and means for producing relative reciprocatory movements between said cylinder and said yarn feeding means; means for controlling needles to cause a selected group of needles to take yarn at each of a plurality of said feeding stations during each of a series of successive reciprocatory strokes in opposite directions, the last named means comprising jacks having selectively located butts and individually associated with the needles, vertically movable reading cams for acting on said butts at different levels, there being one reading cam preceding each feeding station from the standpoint of a reciprocatory stroke in one direction, and one reading cam preceding each feeding station from the standpoint of a reciprocating stroke in the opposite direction, means for imparting vertical step by step movements to said reading cams, and a key cam corresponding to each of said reading cams for selective nullification of a jack selection provided by the relationship of its corresponding reading cam to the butt arrangement of the jack.

32. In a circular knitting machine comprising a needle cylinder, needles carried by said cylinder, yarn feeding means at each of a plurality of yarn feeding stations, and means for producing relative reciprocatory movements between said cylinder and said yarn feeding means; means for controlling needles to cause a selected group of needles to take yarn at each of a plurality of said feeding stations during each of a series of successive reciprocatory strokes in opposite directions, the last named means comprising jacks having selectively located butts and individually associated with needles in cylinder slots and rockable in said slots, vertically movable reading cams for acting on said butts at different levels to produce rocking of the jacks, there being one reading cam preceding each feeding station from the standpoint of a reciprocatory stroke in one direction, and one reading cam preceding each feeding station from the standpoint of a reciprocating stroke in the opposite direction, means for imparting vertical step by movements to said reading cams, and a key cam corresponding to each of said reading cams for selective nullification, by the rocking of a jack, of a jack selection provided by the relationship of its corresponding reading cam to the butt arrangement of the jack.

33. In a circular knitting machine comprising a needle cylinder, needles carried by said cylinder, yarn feeding means at each of a plurality of yarn feeding stations, and means for producing relative reciprocatory movements between said cylinder and said yarn feeding means; means for controlling needles to cause a selected group of needles to take yarn at each of a plurality of said feeding stations during each of a series of successive reciprocatory strokes in opposite directions, the last named means comprising jacks having selectively located butts and individually associated with needles in cylinder slots and rockable in said slots, vertically movable reading cams for acting on said butts at different levels to produce rocking of the jacks, there being one reading cam preceding each feeding station from the standpoint of a reciprocatory stroke in one direction, and one reading cam preceding each feeding station from the standpoint of a reciprocating stroke in the opposite direction, means for imparting vertical step by step movements to said reading cams, a key cam corresponding to each of said reading cams for selective nullification, by the rocking of a jack, of a jack selection provided by the relationship of its corresponding reading cam to the butt arrangement of the jack, and a cam corresponding to each pair of reading and key cams arranged to act on jacks having predetermined rocked positions resulting from passage by the corresponding pair of reading and key cams to effect positioning of associated needles to take yarn at the following feeding station.

34. In a circular knitting machine comprising a needle cylinder, needles carried by said cylinder, yarn feeding means at each of a plurality of yarn feeding stations, and means for producing relative reciprocatory movements between said cylinder and said yarn feeding means; means for controlling needles to cause a selected group of needles to take yarn at each of a plurality of said feeding stations during each of a series of successive reciprocatory strokes in opposite directions, the last named means comprising jacks having selectively located butts and individually associated with needles in cylinder slots and rockable in said slots, vertically movable reading cams for acting on said butts at different levels to produce rocking outwardly of the upper ends of the jacks and rocking inwardly of the lower ends of the jacks, there being one reading cam preceding each feeding station from the standpoint of a reciprocatory stroke in one direction, and one reading cam preceding each feeding station from the standpoint of a reciprocatory stroke in the opposite direction, means for imparting vertical step by step movements to said reading cams, means for rocking outwardly the lower ends of the jacks prior to their reaching each reading cam, a key cam corresponding to each of said reading cams for selective nullification of a jack selection provided by the relationship of its corresponding reading cam to the butt arrangement of the jack, one of the key cams preceding each feeding station being arranged to rock the lower ends of jacks inwardly and the other of the key cams preceding each feeding station being arranged to rock the lower ends of jacks outwardly, a cam following each of the first of the last mentioned key cams arranged to engage and raise a jack reaching it with its lower end in outward position, and a cam following each of the second of the last mentioned key cams arranged to engage and raise a jack reaching it with its lower end in inward position, said raising cams effecting positioning of needles to take yarn at the followng feeding station.

35. In a circular knitting machine comprising a needle cylinder, needles carried by said cylinder, yarn feeding means at each of a plurality of yarn feeding stations, and means for producing relative reciprocatory movements between said cylinder and said yarn feeding means; means for controlling needles to cause a selected group of needles to take yarn at each of a plurality of said feeding stations during each of a series of successive reciprocatory strokes in opposite directions, the last named means comprising jacks having selectively located butts and individually associated with needles in cylinder slots and rockable in said slots, vertically movable reading cams for acting on said butts at different levels to produce rocking outwardly of the upper ends of the jacks and rocking inwardly of the lower ends of the jacks, there being one reading cam preceding each feeding station from the standpoint of a reciprocatory stroke in one direction, and one reading cam preceding each feeding station from the standpoint of a reciprocatory stroke in the opposite direction, means for imparting vertical step by step movements to said reading cams, means for rocking outwardly the lower ends of the jacks prior to their reaching each reading cam, a key cam corresponding to each of said reading cams for selective nullification of a jack selection provided by the relationship of its corresponding reading cam to the butt arrangement of the jack, one of the key cams preceding each feeding station being arranged to rock the lower ends of jacks inwardly and the other of the key cams preceding each feeding station being arranged to rock the lower ends of jacks outwardly, a cam following each of the first of the last mentioned key cams arranged to engage the lower end of, and raise, a jack reaching it with its lower end in outward position, and a cam following each of the second of the last mentioned key cams arranged to engage the upper end of, and raise, a jack reaching it with its lower end in inward position, said raising cams effecting positioning of needles to take yarn at the following feeding station.

36. In a circular knitting machine comprising a needle cylinder, needles carried by said cylinder, yarn feeding means at each of a plurality of yarn feeding stations, and means for producing relative reciprocatory movements between said cylinder and said yarn feeding means; means for controlling needles to cause a selected group of needles to take yarn at each of a plurality of said feeding stations during each of a series of successive reciprocatory strokes in opposite directions, the last named means comprising jacks having selectively located butts and individually associated with the needles, reading cams for acting on said butts at different levels, there being one reading cam preceding each feeding station from the standpoint of a reciprocatory stroke in one direction, and one reading cam preceding each feeding station from the standpoint of a reciprocatory stroke in the opposite direction, a key cam corresponding to each of said reading cams for selective nullification of a jack selection provided by the relationship of its corresponding reading cam to the butt arrangement of the jack, and a blanking cam corresponding to each of said reading cams for nullification of all jack selections provided by the relationship of its corresponding reading cam to the butt arrangements of the jacks.

37. In a circular knitting machine comprising a needle cylinder, needles carried by said cylinder, yarn feeding means at each of a plurality of yarn feeding stations, and means for producing relative reciprocatory movements between said cylinder and said yarn feeding means; means for controlling needles to cause a selected group of needles to take yarn at each of a pluraliy of said feeding stations during each of a series of successive reciprocatory strokes in opposite directions, the last named means comprising jacks having selectively located butts and individually associated with needles in cylinder slots and rockable in said slots, reading cams for acting on said butts at different levels to produce rocking of the jacks, there being one reading cam preceding each feeding station from the standpoint of a reciprocatory stroke in one direction, and one reading cam preceding each feeding station from the standpoint of a reciprocating stroke in the opposite direction, a key cam corresponding to each of said reading cams for selective nullification, by the rocking of a jack, of a jack selection provided by the relationship of its corresponding reading cam to the butt arrangement of the jack, and a blanking cam corresponding to each of said reading cams for nullification, by rocking of the jacks, of all jack selections provided by the relationship of its corresponding reading cam to the butt arrangements of the jacks.

38. In a circular knitting machine comprising a needle cylinder, needles carried by said cylinder, yarn feeding means at each of a plurality of yarn feeding stations, and means for producing relative reciprocatory movements between said cylinder and said yarn feeding means; means for controlling needles to cause a selected group of needles to take yarn at each of a plurality of said feeding stations during each of a series of successive reciprocatory strokes in opposite directions, the last named means comprising jacks having selectively located butts and individually associated with needles in cylinder slots and rockable in said slots, reading cams for acting on said butts at different levels to produce rocking of the jacks, there being one reading cam preceding each feeding station from the standpoint of a reciprocatory stroke in one direction, and one reading cam preceding each feeding station from the standpoint of a reciprocating stroke in the opposite direction, a key cam corresponding to each of said reading cams for selective nullification, by the rocking of a jack, of a jack selection provided by the relationship of its corresponding reading cam to the butt arrangement of the jack, a cam corresponding to each pair of reading and key cams arranged to act on jacks having predetermined rocked positions resulting from passage by the corresponding pair of reading and key cams to effect positioning of associated needles to take yarn at the following feeding station, and a blanking cam corresponding to each of said reading cams for nullification, by rocking of the jacks, of all jack selections provided by the relationship of its corresponding reading cam to the butt arrangement of the jacks.

39. In a circular knitting machine comprising a needle cylinder, needles carried by said cylinder, yarn feeding means at each of a plurality of yarn feeding stations, and means for producing relative reciprocatory movements between said cylinder and said yarn feeding means; means for controlling needles to cause a selected group of needles to take yarn at each of a plurality of said feeding stations during each of a series of successive reciprocatory strokes in opposite directions, the last named means comprising jacks having selectively located butts and individually associated with needles in cylinder slots and rockable in said slots, reading cams for acting on said butts at different levels to produce rocking outwardly of the upper ends of the jacks and rocking inwardly of the lower ends of the jacks, there being one reading cam preceding each feeding station from the standpoint of a reciprocatory stroke in one direction, and one reading cam preceding each feeding station from the standpoint of a reciprocatory stroke in the opposite direction, means of rocking outwardly the lower ends of the jacks prior to their reaching each reading cam, a key cam corresponding to each of said reading cams for selective nullification of a jack selection provided by the relationship of its corresponding reading cam to the butt arrangement of the jack, one of the key cams preceding each feeding station being arranged to rock the lower ends of jacks inwardly and the other of the key cams preceding each feeding station being arranged to rock the lower ends of jacks outwardly, a blanking cam corresponding to each of said reading cams for nullification of all jack selections provided by the relationship of its corresponding reading cam to the butt arrangements of the jacks, one of the blanking cams preceding each feeding station being arranged to rock the lower ends of jacks inwardly and the other of the blanking cams preceding each feeding station being arranged to rock the lower ends of jacks outwardly, a cam following each of the first of the last mentioned key and blanking cams arranged to engage and raise a jack reaching it with its lower end in outward position, and a cam following each of the second of the last mentioned key and blanking cams arranged to engage and raise a jack reaching it with its lower end in inward position, said raising cams effecting positioning of needles to take yarn at the following feeding station.

40. In a circular knitting machine comprising a needle cylinder, needles carried by said cylinder, yarn feeding means at each of a plurality of yarn feeding stations, and means for producing relative reciprocatory movements between said cylinder and said yarn feeding means; means for controlling needles to cause a selected group of needles to take yarn at each of a plurality of said feeding stations during each of a series of successive reciprocatory strokes in opposite directions, the last named means comprising jacks having selectively located butts and individually associated with the needles, reading cams for acting on said butts at different levels, there being one reading cam preceding each feeding station from the standpoint of a reciprocatory stroke in one direction, and one reading cam preceding each feeding station from the standpoint of a reciprocatory stroke in the opposite direction, and a key cam corresponding to each of said reading cams for selective nullification of a jack selection provided by the relationship of its corresponding reading cam to the butt arrangement of the jack, the butts on said jacks cooperating with said reading and key cams being so arranged that each needle takes yarn at only one feeding station during a single reciprocatory stroke.

41. In a circular knitting machine comprising a needle cylinder, needles carried by said cylinder, yarn feeding means at each of a plurality of yarn feeding stations, and means for producing relative reciprocatory movements between said cylinder and said yarn feeding means; means for controlling needles to cause a selected group of needles to take yarn at each of a plurality of said feeding stations during each of a series of successive reciprocatory strokes in opposite directions, the last named means comprising jacks having selectively located butts and individually associated with needles in cylinder slots and rockable in said slots, reading cams for acting on said butts at different levels to produce rocking of the jacks, there being one reading cam preceding each feeding station from the standpoint of a reciprocatory stroke in one direction, and one reading cam preceding each feeding station from the standpoint of a reciprocating stroke in the opposite direction, a key cam corresponding to each of said reading cams for selective nullification, by the rocking of a jack, of a jack selection provided by the relationship of its corresponding reading cam to the butt arrangement of the jack, and a cam corresponding to each pair of reading and key cams arranged to act on jacks having predetermined rocked positions resulting from passage by the corresponding pair of reading and key cams to effect positioning of associated needles to take yarn at the following feeding station, the butts on said jacks cooperating with said reading and key cams being so arranged that each needle takes yarn at only one feeding station during a single reciprocatory stroke.

42. In a circular knitting machine comprising a needle cylinder, needles carried by said cylinder, yarn feeding means at each of a plurality of yarn feeding stations, and means for producing relative reciprocatory movements between said cylinder and said yarn feeding means; means for controlling needles to cause a selected group of needles to take yarn at each of a plurality of said feeding stations during each of a series of successive reciprocatory strokes in opposite directions, the last named means comprising jacks having selectively located butts and individually associated with needles in cylinder slots and rockable in said slots, reading cams for acting on said butts at different levels to produce rocking outwardly of the upper ends of the jacks and rocking inwardly of the lower ends of the jacks, there being one reading cam preceding each feeding station from the standpoint of a reciprocatory stroke in one direction, and one reading cam preceding each feeding station from the standpoint of a reciprocatory stroke in the opposite direction, means for rocking outwardly the lower ends of the jacks prior to their reaching each reading cam, a key cam corresponding to each of said reading cams for selective nullification of a jack selection provided by the relationship of its corresponding reading cam to the butt arrangement of the jack, one of the key cams preceding each feeding station being arranged to rock the lower ends of jacks inwardly and the other of the key cams preceding each feeding station being arranged to rock the lower ends of jacks outwardly, a cam following each of the first of the last mentioned key cams arranged to engage and raise a jack reaching it with its lower end in outward position, and a cam following each of the second of the last mentioned key cams arranged to engage and raise a jack reaching it with its lower end in inward position, said raising cams effecting positioning of needles to take yarn at the following feeding station, the butts on said jacks cooperating with said reading and key cams being so arranged that each needle takes yarn at only one feeding station during a single reciprocatory stroke.

43. In a circular knitting machine comprising a needle cylinder, needles carried by said cylinder, yarn feeding means at each of a plurality of yarn feeding stations, and means for producing relative reciprocatory movements between said cylinder and said yarn feeding means; means for controlling needles to cause a selected group of needles to take yarn at each of a plurality of said feeding stations during each of a series of successive reciprocatory strokes in opposite directions, the last named means comprising jacks having selectively located butts and individually associated with the needles, reading cams for acting on said butts at different levels, there being one reading cam preceding each feeding station from the standpoint of a reciprocatory stroke in one direction, and one reading cam preceding each feeding station from the standpoint of a reciprocating stroke in the opposite direction, and a key cam corresponding to each of said reading cams for selective nullification of a jack selection provided by the relationship of its corresponding reading cam to the butt arrangement of the jack, the butts on said jacks cooperating with said reading and key cams being so arranged that different groups of needles take yarns at each of a plurality of feeding stations during successive reciprocatory strokes to produce at least one diagonal junction between areas knit primarily from yarns fed at different feeding stations.

44. In a circular knitting machine comprising a needle cylinder, needles carried by said cylinder, yarn feeding means at each of a plurality of yarn feeding stations, and means for producing relative reciprocatory movements between said cylinder and said yarn feeding means; means for controlling needles to cause a selected group of needles to take yarn at each of a plurality of said feeding stations during each of a series of successive reciprocatory strokes in opposite directions, the last named means comprising jacks having selectively located butts and individually associated with the needles, reading cams for acting on said butts at different levels, there being one reading cam preceding each feeding station from the standpoint of a reciprocatory stroke in one direction, and one reading cam preceding each feeding station from the standpoint of a reciprocating stroke in the opposite direction, and a key cam corresponding to each of said reading cams for selective nullification of a jack selection provided by the relationship of its corresponding reading cam to the butt arrangement of the jack, the butts on said jacks cooperating with said reading and key cams being so arranged as to produce a junction between areas knit primarily from yarns fed at different feeding stations, which junctions comprise, in a single course, a pair of loops formed of yarn fed at one feeding station separated by a loop formed of yarn fed at another feeding station.

45. In a circular knitting machine comprising a needle cylinder, needles carried by said cylinder, yarn feeding means at each of a plurality of yarn feeding stations, and means for producing relative reciprocatory movements between said cylinder and said yarn feeding means; means for controlling needles to cause any needle to take yarn at only one of a pair of said feeding stations during a single reciprocatory stroke, and to form a junction of yarns fed at said two feeding stations during such stroke, which junction comprises, in a single course, a pair of loops formed at one of said two feeding stations separated by a loop formed at the other of said two feeding stations, and means producing a yarn change effecting knitting of outgoing and incoming yarns together in at least one loop during said stroke.

46. In a circular knitting machine comprising a needle cylinder, needles carried by said cylinder, yarn feeding means at each of a plurality of yarn feeding stations, and means for producing relative reciprocatory movements between said cylinder and said yarn feeding means; means for controlling needles to cause any needle to take yarn at only one of a pair of said feeding stations during a single reciprocatory stroke, and to form a junction of yarns fed at said two feeding stations during such stroke, which junction comprises, in a single course, a pair of loops formed at one of said two feeding stations separated by a loop formed at the other of said two feeding stations, and means producing a yarn change effecting knitting of outgoing and incoming yarns together in a plurality of loops during said stroke.

47. In a circular knitting machine comprising a needle cylinder, needles carried by said cylinder, yarn feeding means at each of a plurality of yarn feeding stations, and means for producing relative reciprocatory movements between said cylinder and said yarn feeding means; selecting means for controlling needles to cause said needles to take yarn selectively at the various feeding stations, and means preventing predetermined needles from taking yarn at at least one feeding station independently of a condition otherwise established by said selecting means which would, in the absence of action by said preventing means, cause said predetermined needles to take yarn at the last mentioned feeding station.

48. In a circular knitting machine comprising a needle cylinder, needles carried by said cylinder, yarn feeding means at each of a plurality of yarn feeding stations, and means for producing relative reciprocatory movements between said cylinder and said yarn feeding means; selecting means for controlling needles to cause said needles to take yarn selectively at the various feeding stations, and means preventing predetermined groups of adjacent needles from taking yarn at at least one feeding station independently of a condition otherwise established by said selecting means which would, in the absence of action by said preventing means, cause said predetermined groups of adjacent needles to take yarn at the last mentioned feeding station.

49. In a circular knitting machine comprising a needle cylinder, needles carried by said cylinder, yarn feeding means at each of more than two yarn feeding stations, and means for producing relative reciprocatory movements between said cylinder and said yarn feeding means; means for controlling needles to cause said needles to take yarn selectively at the various feeding stations, to produce knitting during each reciprocation at all of said feeding stations, and means preventing any needle from taking yarn at any except a predetermined two of said feeding stations during the last mentioned type of knitting.

50. In a circular knitting machine comprising a needle cylinder, needles carried by said cylinder, and yarn feeding means at each of more than two yarn feeding stations; means for controlling needles to cause said needles to take yarn selectively at the various feeding stations to produce knitting during the formation of each course at all of said feeding stations, and means preventing any needle from taking yarn at any except a predetermined two of said feeding stations during the last mentioned type of knitting.

51. In a circular knitting machine comprising a needle cylinder, needles carried by said cylinder, yarn feeding means at each of a plurality of yarn feeding stations, and means for producing relative movements between said cylinder and said yarn feeding means; means for controlling needles to cause selected groups of needles to take yarn at said various feeding stations comprising rockable jacks individually associated with said needles and having upper and lower butts, means for selectively rocking said jacks, and cams for acting on said butts to move the jacks longitudinally, one of said cams acting on upper butts in advance of one feeding station and another of said cams acting on lower butts in advance of another feeding station.

52. In a circular knitting machine comprising a needle cylinder, needles carried by said cylinder, yarn feeding means at each of a plurality of yarn feeding stations, and means for producing relative movements between said cylinder and said yarn feeding means; means for controlling needles to cause selected groups of needles to take yarn at said various feeding stations comprising rockable jacks individually associated with said needles and having upper and lower butts, means for selectively rocking said jacks, and cams for acting on said butts to move the jacks longitudinally, one of said cams acting on upper butts in advance of one feeding station and another of said cams acting on lower butts in advance of another feeding station, said cams acting on jacks located by selective action or inaction of said rocking means.

53. In a circular knitting machine comprising a needle cylinder, needles carried by said cylinder, yarn feeding means at each of a plurality of yarn feeding stations, and means for producing relative movements between said cylinder and said yarn feeding means; means for controlling needles to cause selected groups of needles to take yarn at said various feeding stations comprising rockable jacks individually associated with said needles and having upper and lower butts, means for selectively rocking said jacks, and cams for acting on said butts to move the jacks longitudinally, one of said cams acting on upper butts in advance of one feeding station and another of said cams acting on lower butts in advance of another feeding station, one of said cams acting on jacks rocked by said rocking means, and the other of said cams acting on jacks not rocked by said rocking means.

54. In a circular knitting machine comprising a needle cylinder, needles carried by said cylinder, yarn feeding means at each of a plurality of yarn feeding stations, and means for producing relative reciprocatory movements between said cylinder and said yarn feeding means; means for controlling needles to cause selected groups of needles to take yarn at said various feeding station during strokes in both directions comprising jacks individually associated with said needles and having upper and lower butts, selecting means for said jacks, and cams for acting on said butts to move the jacks longitudinally, one of said cams acting on upper butts, following jack selection, in advance of one feeding station and another of said cams acting on lower butts, following jack selection, in advance of another feeding station during strokes in both directions.

55. In a circular knitting machine comprising a needle cylinder, needles carried by said cylinder, yarn feeding means, and means for producing relative reciprocatory movements between said cylinder and said yarn feeding means; means for controlling needles comprising jacks having selectively located butts and individually associated with the needles, and a pair of vertically movable reading cams for acting on said butts at different levels, said reading cams being movable inwardly and outwardly relatively to the axis of the needle cylinder, one of the cams being active during reciprocatory strokes in one direction, and the other of said cams being active during reciprocatory strokes in the opposite direction.

56. In a circular knitting machine comprising a needle cylinder, needles carried by said cylinder, yarn feeding means, and means for producing relative reciprocatory movements between said cylinder and said yarn feeding means; means for controlling needles comprising jacks having selectively located butts and individually associated with the needles, a pair of vertically movable reading cams for acting on said butts at different levels, said reading cams being movable inwardly and outwardly relatively to the axis of the needle cylinder, one of the cams being active during reciprocatory strokes in one direction, and the other of said cams being active during reciprocatory strokes in the opposite direction, and a pair of key cams for acting upon said jacks, each of said key cams corresponding to one of said reading cams and being active and inactive with its corresponding reading cam.

57. In a circular knitting machine comprising a needle cylinder, needles carried by said cylinder, yarn feeding means comprising a group of yarn fingers at each of a plurality of yarn feeding stations, and means for producing relative reciprocatory movements between said cylinder and said yarn feeding means; means to cause any needle to take yarn at only one feeding station during a single reciprocatory stroke, with a selected group of needles taking yarn at each of a plurality of said feeding stations during said reciprocatory stroke, means for selectively moving yarn fingers into and out of action to produce a yarn change effecting knitting of outgoing and incoming yarns together in at least one loop during a single reciprocatory stroke, a take-up sweep cooperating with each yarn finger, and means for rendering each take-up sweep inactive as its corresponding yarn finger is moved out of action.

58. In a circular knitting machine comprising a needle cylinder, needles carried by said cylinder, yarn feeding means comprising a group of yarn fingers at each of a plurality of yarn feeding stations, and means for producing relative reciprocatory movements between said cylinder and said yarn feeding means; means for controlling needles so that different groups of needles take yarns at each feed during successive reciprocatory strokes to produce at least one diagonal junction between areas knit primarily from yarns fed at different feeding stations, means for selectively moving yarn fingers into and out of action to produce a yarn change effecting knitting of outgoing and incoming yarns together in at least one loop during a single reciprocatory stroke, a take-up sweep cooperating with each yarn finger, and means for rendering each take-up sweep inactive as its corresponding yarn finger is moved out of action.

59. In a circular knitting machine comprising a needle cylinder, needles carried by said cylinder, yarn feeding means at each of a plurality of yarn feeding stations, and means for producing relative reciprocatory movements between said cylinder and said yarn feeding means; means for controlling needles to cause any needle to take yarn at only one feeding station during a single reciprocatory stroke and to produce a junction between areas knit primarily from yarns fed at different feeding stations, which junction comprises, in a single course, a pair of loops formed of yarn fed at one feeding station separated by a loop formed of yarn fed at another feeding station, means for selectively moving yarn fingers into and out of action to produce a yarn change effecting knitting of outgoing and incoming yarns together in at least one loop during a single reciprocatory stroke, a take-up sweep cooperating with each yarn finger, and means for rendering each take-up sweep inactive as its corresponding yarn finger is moved out of action.

60. In a circular knitting machine comprising a needle cylinder, needles carried by said cylinder, yarn feeding means comprising a group of yarn fingers at each of at least four feeding stations, and means for producing relative reciprocatory movements between said cylinder and said yarn feeding means; means for controlling needles during a period of reciprocatory knitting to cause selected needles to take yarn at said four feeding stations to provide simultaneously formed and joined areas each of which is knit primarily from a single yarn, means for selectively moving yarn fingers into and out of action to produce a yarn change effecting knitting of outgoing and incoming yarns together in at least one loop during a single reciprocatory stroke, a take-up sweep cooperating with each yarn finger, and means for rendering each take-up sweep inactive as its corresponding yarn finger is moved out of action.

61. In a circular knitting machine comprising a needle cylinder, needles carried by said cylinder, yarn feeding means comprising a group of yarn fingers at each of at least four feeding stations, and means for producing relative reciprocatory movements between said cylinder and said yarn feeding means; means for controlling needles during a period of reciprocatory knitting to cause selected needles to take yarn at said four feeding stations to provide simultaneously formed and joined areas, means for selectively moving yarn fingers into and out of action to produce a yarn change effecting knitting of outgoing and incoming yarns together in at least one loop during a single reciprocatory stroke, a take-up sweep cooperating with each yarn finger, and means for rendering each take-up sweep inactive as its corresponding yarn finger is moved out of action.

62. In a circular knitting machine comprising a needle cylinder, needles carried by said cylinder, yarn feeding means at each of at least four feeding stations, and means for producing relative reciprocatory movements between said cylinder and said yarn feeding means; means for controlling needles during a period of reciprocatory knitting to cause selected needles to take yarn at said four feeding stations to provide simultaneously formed and joined areas, a cyclically operating pattern device and retiming means for said pattern device, said retiming means comprising an element controlled by said pattern device as it attains a predetermined position, and means for effecting movement of said element at a predetermined phase of a knitting cycle when said element is controlled as aforesaid by said pattern device.

63. In a circular knitting machine comprising a needle cylinder, needles carried by said cylinder, yarn feeding means at each of a plurality of yarn feeding stations, and means for producing relative reciprocatory movements between said cylinder and said yarn feeding means; means for controlling needles to cause any needle to take yarn at only one feeding station during a single reciprocatory stroke, with a selected group of needles taking yarn at each of a plurality of said feeding stations during said reciprocatory stroke, a cyclically operating pattern device and retiming means for said pattern device, said retiming means comprising an element controlled by said pattern device as it attains a predetermined position, and means for effecting movement of said element at a predetermined phase of a knitting cycle when said element is controlled as aforesaid by said pattern device.

64. In a circular knitting machine comprising a needle cylinder, needles carried by said cylinder, yarn feeding means at each of a plurality of yarn feeding stations, and means for producing relative reciprocatory movements between said cylinder and said yarn feeding means; means for controlling needles to cause any needle to take yarn at only one feeding station during a single reciprocatory stroke and to produce a junction between areas knit primarily from yarns fed at different feeding stations, which junction comprises, in a single course, a pair of loops formed of yarn fed at one feeding station separated by a loop formed of yarn fed at another feeding station, a cyclically operating pattern device and retiming means for said pattern device, said retiming means comprising an element controlled by said pattern device as it attains a predetermined position, and means for effecting movement of said element at a predetermined phase of a knitting cycle when said element is controlled as aforesaid by said pattern device.

65. In a circular knitting machine comprising a needle cylinder, needles carried by said cylinder, sinkers having nebs cooperating with said needles, yarn feeding means at each of a plurality of yarn feeding stations, and means for producing relative reciprocatory movements between said cylinder and said yarn feeding means; means for controlling needles so that different groups of needles take yarn at each feed during successive reciprocatory strokes to produce at least one junction between areas knit primarily from yarns fed at different feeding stations, and means effecting drawing of stitches forming at least said junction in back of sinker nebs.

66. In a circular knitting machine comprising a needle cylinder, needles carried by said cylinder, sinkers having nebs cooperating with said needles, yarn feeding means at each of a plurality of yarn feeding stations, and means for producing relative reciprocatory movements between said cylinder and said yarn feeding means; means for controlling needles so that different groups of needles take yarn at each feed during successive reciprocatory strokes to produce at least one diagonal junction between areas knit primarily from yarns fed at different feeding stations, and means effecting drawing of stitches forming at least said junction in back of sinker nebs.

67. In a circular knitting machine comprising a needle cylinder, needles carried by said cylinder, sinkers having nebs cooperating with said needles, yarn feeding means at each of a plurality of yarn feeding stations, and means for producing relative reciprocatory movements between said cylinder and said yarn feeding means; means for controlling needles so that different groups of needles take yarn at each feed during successive reciprocatory strokes to produce at least one junction between areas knit primarily from yarns fed at different feeding stations, which junction comprises, in a single course, a pair of loops formed of yarn fed at one feeding station separated by a loop formed of yarn fed at another feeding station, and means effecting drawing of stitches forming at least said junction in back of sinker nebs.

68. In a circular knitting machine comprising a needle cylinder, needles carried by said cylinder, sinkers having nebs cooperating with said needles, a yarn feeding means at each of a plurality of yarn feeding stations, and means for producing relative reciprocatory movements between said cylinder and said yarn feeding means; means for controlling needles so that different groups of needles take yarn at each feed during successive reciprocatory strokes to produce at least one diagonal junction between areas knit primarily from yarns fed at different feeding stations, which junction comprises, in a single course, a pair of loops formed of yarn fed at one feeding station separated by a loop formed of yarn fed at another feeding station, and means effecting drawing of stitches forming at least said junction in back of sinker nebs.

References Cited in the file of this patent

UNITED STATES PATENTS

| | | |
|---|---|---|
| 1,084,194 | Blackburn | Jan. 13, 1914 |
| 1,434,108 | Egan | Oct. 31, 1922 |
| 1,458,833 | Lawson | June 12, 1923 |
| 1,673,764 | Gagne | June 12, 1928 |
| 1,678,385 | Grothey | July 24, 1928 |
| 1,769,580 | Houseman | July 1, 1930 |
| 1,860,162 | Sutphen | May 24, 1932 |
| 1,907,409 | Sheppard | May 2, 1933 |
| 1,914,954 | Miller | June 20, 1933 |
| 2,006,414 | Shelmire | July 2, 1935 |
| 2,012,607 | Houseman | Aug. 27, 1935 |
| 2,101,006 | Lawson et al. | Nov. 30, 1937 |
| 2,158,189 | Lawson et al. | May 16, 1939 |
| 2,193,311 | Cloutier | Mar. 12, 1940 |
| 2,217,022 | Lawson et al. | Oct. 8, 1940 |
| 2,238,820 | Page | Apr. 15, 1941 |
| 2,400,628 | Cloutier | May 21, 1946 |
| 2,402,098 | St. Pierre | June 11, 1946 |
| 2,406,775 | Killian | Sept. 3, 1946 |
| 2,433,931 | St. Pierre | Jan. 6, 1948 |
| 2,473,944 | Fregeolle | June 21, 1949 |
| 2,545,081 | Green | Mar. 13, 1951 |
| 2,551,385 | Miller | May 1, 1951 |
| 2,626,513 | Lombardi | Jan. 27, 1953 |
| 2,676,474 | Bouthillette et al. | Apr. 27, 1954 |
| 2,680,961 | Thurston | June 15, 1954 |

FOREIGN PATENTS

| | | |
|---|---|---|
| 308,421 | Great Britain | Mar. 28, 1929 |